(12) United States Patent
Yoshino et al.

(10) Patent No.: US 11,766,848 B2
(45) Date of Patent: Sep. 26, 2023

(54) MOLDING PACKAGING MATERIAL, POWER STORAGE DEVICE PACKAGING CASE, AND POWER STORAGE DEVICE

(71) Applicant: SHOWA DENKO PACKAGING CO., LTD., Kanagawa (JP)

(72) Inventors: Kenji Yoshino, Kanagawa (JP); Makoto Karatsu, Kanagawa (JP); Takashi Nagaoka, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 591 days.

(21) Appl. No.: 16/644,569

(22) PCT Filed: Aug. 17, 2018

(86) PCT No.: PCT/JP2018/030478
§ 371 (c)(1),
(2) Date: Mar. 5, 2020

(87) PCT Pub. No.: WO2019/049630
PCT Pub. Date: Mar. 14, 2019

(65) Prior Publication Data
US 2021/0362473 A1 Nov. 25, 2021

(30) Foreign Application Priority Data

Sep. 6, 2017 (JP) .................. 2017-170957
Sep. 6, 2017 (JP) .................. 2017-170958
(Continued)

(51) Int. Cl.
*B23B 15/00* (2006.01)
*B32B 15/085* (2006.01)
(Continued)

(52) U.S. Cl.
CPC .......... *B32B 15/085* (2013.01); *B32B 7/12* (2013.01); *B32B 27/18* (2013.01); *B32B 37/12* (2013.01);
(Continued)

(58) Field of Classification Search
CPC ..... B32B 2307/31; B32B 15/18; B32B 27/00; B32B 2307/30; H01M 50/202; H01M 50/231
See application file for complete search history.

(56) References Cited

U.S. PATENT DOCUMENTS

| 11,242,469 B2 | 2/2022 | Schuh et al. |
| 2004/0029001 A1 | 2/2004 | Yamazaki et al. |

(Continued)

FOREIGN PATENT DOCUMENTS

| DE | 102016213840 A1 | 2/2018 |
| JP | 2002-50325 A | 2/2002 |

(Continued)

OTHER PUBLICATIONS

International Search Report dated Nov. 6, 2018 issued in corresponding PCT/JP2018/030478 application (2 pages).
(Continued)

*Primary Examiner* — Cynthia H Kelly
*Assistant Examiner* — Monique M Wills
(74) *Attorney, Agent, or Firm* — MILLEN, WHITE, ZELANO & BRANIGAN, P.C.; William Nixon; Wan-Ching Montfort

(57) ABSTRACT

Provided is a molding packaging material which is capable of ensuring good slipperiness to secure good formability when molding the molding packaging material and is less likely to cause white powder on a surface of the packaging material. The molding packaging material includes a substrate layer 2 as an outer layer, a heat fusible resin layer 3 as
(Continued)

an inner layer, and a metal foil layer 4 arranged between the two layers. The heat fusible resin layer 3 is composed of a single layer or a multi-layer. The innermost layer of the heat fusible resin layer 3 is made of a resin composition containing a heat fusible resin, an anti-blocking agent, a slip agent, and a fluoropolymer-based lubricant.

15 Claims, 4 Drawing Sheets

(30) Foreign Application Priority Data

| | | |
|---|---|---|
| Sep. 20, 2017 | (JP) | 2017-179875 |
| Sep. 20, 2017 | (JP) | 2017-180007 |

(51) Int. Cl.

| | |
|---|---|
| *H01M 50/231* | (2021.01) |
| *H01M 50/202* | (2021.01) |
| *B32B 7/12* | (2006.01) |
| *B32B 27/18* | (2006.01) |
| *B32B 37/12* | (2006.01) |
| *B32B 38/00* | (2006.01) |
| *B65D 65/40* | (2006.01) |
| *H01M 10/0525* | (2010.01) |
| *H01M 50/105* | (2021.01) |

(52) U.S. Cl.
CPC .......... *B32B 38/0036* (2013.01); *B65D 65/40* (2013.01); *H01M 10/0525* (2013.01); *H01M 50/105* (2021.01); *H01M 50/202* (2021.01); *H01M 50/231* (2021.01); *B32B 2307/30* (2013.01); *B32B 2457/10* (2013.01); *B32B 2553/00* (2013.01)

(56) References Cited

U.S. PATENT DOCUMENTS

| | | |
|---|---|---|
| 2011/0300430 A1 | 12/2011 | Usami et al. |
| 2012/0312366 A1 | 12/2012 | Starry et al. |
| 2015/0044564 A1 | 2/2015 | Wang et al. |
| 2016/0359147 A1* | 12/2016 | Kang ............... H01M 50/122 |
| 2017/0155101 A1 | 6/2017 | Mochizuki et al. |

FOREIGN PATENT DOCUMENTS

| | | | |
|---|---|---|---|
| JP | 2002216713 A | 8/2002 | |
| JP | 2004-327044 A | 11/2004 | |
| JP | 2005-32456 A | 2/2005 | |
| JP | 2011014526 A | 1/2011 | |
| JP | 5035495 B2 * | 9/2012 | |
| JP | 5089833 B2 * | 12/2012 | .......... H01M 2/0267 |
| JP | 2013-101764 A | 5/2013 | |
| JP | 2013-149397 A | 8/2013 | |
| JP | 2014-22080 A | 2/2014 | |
| JP | 2015-33828 A | 2/2015 | |
| JP | 2015-53289 A | 3/2015 | |
| JP | 5912214 B2 * | 4/2016 | |
| JP | 2017-112014 A | 6/2017 | |
| JP | 2018-73649 A | 5/2018 | |
| WO | WO-2007047133 A1 * | 4/2007 | ............. B32B 27/08 |

OTHER PUBLICATIONS

English Abstract of JP 2002-050325 A published Feb. 15, 2002.
English Abstract of JP 2004-327044 A published Nov. 18, 2004.
English Abstract of JP 2005-032456 A published Feb. 3, 2005.
English Abstract of JP 2013-101764 A published May 23, 2013.
English Abstract of JP 2013-149397 A published Aug. 1, 2013.
English Abstract of JP 2014-022080 A published Feb. 3, 2014.
English Abstract of JP 2015-033828 A published Feb. 19, 2015.
English Abstract of JP 2015-053289 A published Mar. 19, 2015.
English Abstract of JP 2017-112014 A published Jun. 22, 2017.
English Abstract of JP 2018-073649 A published May 10, 2018.
Office Action in corresponding Chinese patent application 201880053694.1 dated Nov. 30, 2021 (pp. 1-8).
See also office action in corresponding Korean application 2021-042427008 dated May 27, 2021 (pp. 1-8).
Office action dated Oct. 17, 2022 in corresponding German application 112018004914.0 (pp. 1-9).

* cited by examiner

MOLDING PACKAGING MATERIAL, POWER STORAGE DEVICE PACKAGING CASE, AND POWER STORAGE DEVICE

TECHNICAL FIELD

The present invention relates to a molding packaging material preferably used as a case for secondary batteries (lithium-ion secondary batteries) for notebook PCs, mobile phones, automobiles, or stationary equipment, and also preferably used as a packaging material for foods and pharmaceutical products.

BACKGROUND ART

In recent years, in accordance with thinning and weight reduction of mobile electrical equipment, such as, e.g., smartphones and tablet terminals, as a power storage device packaging material, such as, e.g., lithium-ion secondary batteries, lithium-polymer secondary batteries, lithium-ion ultracapacitors, and electric double-layer capacitors, to be mounted on the electrical equipment, in place of conventional metal cans, a laminated body composed of a heat-resistant resin layer/an adhesive layer/a metal foil layer/an adhesive layer/a thermoplastic resin layer (an inner sealant layer) is used. Further note that it is increasing that power sources for electric vehicles, large-scale power sources for power storage applications, etc., large power supplies for storing power, ultracapacitors, etc., are packaged with a laminated body (packaging material) of the above-mentioned configuration. Stretch forming or deep-drawing forming is performed on the laminated body to form a three-dimensional shape, such as, e.g., a generally rectangular parallelepiped shape. Molding into such a three-dimensional shape ensures a space for accommodating a power storage device main parts.

In order to mold the laminated body into such a three-dimensional shape in good condition without causing pinholes, fractures, etc., it is necessary to improve the slipperiness of the surface of the inner sealant layer. As a configuration for improving the slipperiness of the surface of the inner sealant layer to ensure good formability, a configuration in which the inner sealant layer contains fatty acid amide is known (See Patent Document 1).

Further, a packaging material for lithium-ion batteries improved in slipperiness to ensure good moldability has been proposed (see Patent Document 2). This packaging material is provided with an acid resistance imparting layer as an outermost layer on one side of the substrate material layer, and a first adhesive layer, an aluminum foil layer having a corrosion prevention treatment layer on at least one side, a second adhesive layer, and a sealant layer sequentially laminated. At least one of a slip agent (fatty acid amide, etc.) and an anti-blocking agent (silica particles, etc.) is applied to the outer surface of the sealant layer, or at least one of the slip agent (fatty acid amide, etc.) and an anti-blocking agent (silica particles, etc.) is blended.

In any of the above-described techniques, the slipperiness of the surface of the inner sealant layer can be improved to ensure good formability.

PRIOR ART DOCUMENTS

Patent Document

Patent Document 1: Japanese Unexamined Patent Application Publication No. 2013-101764
Patent Document 2: Japanese Unexamined Patent Application Publication No. 2015-53289

SUMMARY OF THE INVENTION

Problem to be Solved by the Invention

In the prior art, however, a sufficient amount of fatty acid amide must be added to ensure good formability. In this case, the fatty acid amide is excessively deposited on the surface, so that the fatty acid amide is adhered to and deposited on the molding surface of the molding die during the molding of the packaging material, causing white powder (white powder by fatty acid amide). When such white powder is adhered to and deposited on the molding surface, it becomes difficult to perform good molding and there is a possibility that white powder will adhere to a molded article. Therefore, it is necessary to clean to remove the white powder every time white powder is deposited. However, cleaning and removing such white powder reduces the productivity of the packaging material.

In addition, even when various adjustments are made for the additive amount of fatty acid amide, the aging temperature, and the aging time, the bleed amount of the fatty acid amide to the surface is likely to vary. As a result, the variation in the formability and the degree of presence or absence of white powder adhesion are likely to occur, so that it is difficult to ensure stable quality.

Of course, if the additive amount of fatty acid amide is reduced, the adhesive deposition of white powder can be suppressed. But in such a case, the amount of fatty acid amide deposited on the surface becomes insufficient, resulting in poor formability. Thus, conventionally, it was difficult to attain both excellent formability and suppression of causing white powder on a packaging material surface.

The present invention has been made in view of the aforementioned technical background, and aims to provide a molding packaging material, a packaging case for power storage devices, and a power storage device, capable of securing good slipperiness to ensure good moldability when molding the packaging material and suppressing causing of white powder on the surface of the packaging material.

Means for Solving the Problems

In order to achieve the aforementioned objects, the present invention provides the following means.
[1] A molding packaging material comprising:
a substrate layer as an outer layer;
a heat fusible resin layer as an inner layer; and
a metal foil layer arranged between the substrate layer and the heat fusible resin layer,
wherein the heat fusible resin layer is composed of a single layer or a multi-layer, and
wherein an innermost layer of the heat fusible resin layer is made of a resin composition containing a heat fusible resin, an anti-blocking agent, a slip agent, and a fluoropolymer-based lubricant.
[2] The molding packaging material as recited in the aforementioned Item [1], wherein a content rate of the fluoropolymer-based lubricant in the innermost layer is 5 ppm to 5,000 ppm.

[3] The molding packaging material as recited in the aforementioned Item [1] or [2], wherein a fluorine content rate in the fluoropolymer-based lubricant is 50 mass % or more.

[4] The molding packaging material as recited in any one of the aforementioned Items [1] to [3],
wherein the fluoropolymer-based lubricant is one or two fluoropolymer-based lubricants selected from the group consisting of a tetrafluoroethylene-hexafluoropropylene-vinylidene fluoride copolymer and a hexafluoropropylene-vinylidene fluoride copolymer.

[5] The molding packaging material as recited in any one of the aforementioned Items [1] to [4],
wherein a part of the slip agent and a part of the fluoropolymer-based lubricant are both adhered to the inner surface of the innermost layer.

[6] The molding packaging material as recited in any one of the aforementioned Items [1] to [5],
wherein a dynamic friction coefficient of an inner surface of the innermost layer is 0.5 or less.

[7] The molding packaging material as recited in any one of the aforementioned Items [1] to [6],
wherein the slip agent is adhered to an outer surface of the substrate layer.

[8] The molding packaging material as recited in any one of the aforementioned Items [1] to [7],
wherein a dynamic friction coefficient of an outer surface of the substrate layer is 0.5 or less.

[9] A power storage device packaging case composed of a molded article of the molding packaging material as recited in any one of the aforementioned Items [1] to [8].

[10] A power storage device comprising:
a power storage device main parts; and
an external material including at least the power storage device packaging case as recited in the aforementioned Item [9],
wherein the power storage device main parts is packaged with the external material.

[11] A molding packaging material comprising:
a substrate layer as an outer layer;
a heat fusible resin layer as an inner layer; and
a metal foil layer arranged between the substrate layer and the heat fusible resin layer,
wherein the heat fusible resin layer is composed of a single layer or a multi-layer,
wherein an innermost layer of the heat fusible resin layer is made of a resin composition containing a heat fusible resin, an anti-blocking agent, a slip agent, and a fluoropolymer-based lubricant, and
wherein a first lubricative layer containing a fluoropolymer-based lubricant in a content rate greater than 50 mass % is formed on an inner surface of the innermost layer.

[12] The molding packaging material as recited in the aforementioned Item [11],
wherein a second lubricative layer containing the slip agent in a content rate greater than 50 mass % is formed on an inner surface of the first lubricative layer.

[13] The molding packaging material as recited in the aforementioned Item [11] or [12],
wherein a content rate of the fluoropolymer-based lubricant in the innermost layer is 5 ppm to 5,000 ppm.

[14] The molding packaging material as recited in any one of the aforementioned Items [11] to [13],
wherein a fluorine content rate in the fluoropolymer-based lubricant is 50 mass % or more.

[15] The molding packaging material as recited in any one of the aforementioned Items [11] to [14],
wherein the fluoropolymer-based lubricant is one or two fluoropolymer-based lubricants selected from the group consisting of a tetrafluoroethylene-hexafluoropropylene-vinylidene fluoride copolymer and a hexafluoropropylene-vinylidene fluoride copolymer.

[16] The molding packaging material as recited in any one of the aforementioned Items [11] to [15],
wherein the slip agent is a fatty acid amide.

[17] The molding packaging material as recited in any one of the aforementioned Items [11] to [16],
wherein a third lubricative layer containing the slip agent is formed on an outer surface of the substrate layer.

[18] The molding packaging material as recited in the aforementioned Item [17],
wherein a dynamic friction coefficient of an outer surface of the packaging material is 0.5 or less.

[19] The molding packaging material as recited in any one of the aforementioned Items [11] to [18],
wherein a dynamic friction coefficient of an inner surface of the packaging material is 0.5 or less.

[20] A power storage device packaging case composed of a molded article of the molding packaging material as recited in any one of the aforementioned Items [11] to [19].

[21] A power storage device comprising:
a power storage device main parts; and
an external material including at least the power storage device packaging case as recited in the aforementioned Item [20],
wherein the power storage device main parts is packaged with the external material.

[22] A method of producing a molding packaging material, comprising:
a preparation process of preparing a laminated body in which a substrate layer is laminated on one side of a metal foil via an outer adhesive and a heat fusible resin layer is laminated on the other side of the metal foil via an inner adhesive, wherein the heat fusible resin layer is composed of a single layer or a multi-layer, and an innermost layer of the heat fusible resin layer is made of a resin composition containing a heat fusible resin, an anti-blocking agent, a slip agent, and a fluoropolymer-based lubricant; and
an aging process of obtaining a molding packaging material by subjecting the laminated body to a heat treatment.

[23] The method of producing a molding packaging material as recited in the aforementioned Item [22],
wherein a heating temperature of the heat treatment in the aging process is 30° C. to 50° C.

[24] The method of producing a molding packaging material as recited in the aforementioned Item [22] or [23],
wherein layer formation of the innermost layer is performed by melt extruding the resin composition to form a film in the preparation process.

[25] The method of producing a molding packaging material as recited in the aforementioned Item [22] or [23],
wherein the layer formation of the innermost layer is performed by applying a coating solution containing the resin composition and a solvent and drying it in the preparation process.

[26] A molding packaging material, comprising:
a substrate layer as an outer layer;
a heat fusible resin layer as an inner layer; and
a metal foil layer arranged between the substrate layer and the heat fusible resin layer,
wherein the heat fusible resin layer is composed of a single layer or a multi-layer, and an innermost layer of the heat fusible resin layer is made of a resin composition containing a heat fusible resin, a roughening material, a slip agent, and a fluoropolymer-based lubricant, and wherein the roughening material contains a thermoplastic resin.

[27] The molding packaging material as recited in the aforementioned Item [26], wherein a content rate of the fluoropolymer-based lubricant in the innermost layer is 5 ppm to 5,000 ppm.

[28] The molding packaging material as recited in the aforementioned Item [26] or [27], wherein a fluorine content rate in the fluoropolymer-based lubricant is 50 mass % or more.

[29] The molding packaging material as recited in any one the aforementioned Items [26] to [28], wherein the fluoropolymer-based lubricant is one or two fluoropolymer-based lubricants selected from the group consisting of a tetrafluoroethylene-hexafluoropropylene-vinylidene fluoride copolymer and a hexafluoropropylene-vinylidene fluoride copolymer.

[30] The molding packaging material as recited in any one of the aforementioned Items [26] to [29], wherein the thermoplastic resin composing the roughening material is a high density polyethylene resin.

[31] The molding packaging material as recited in any one of the aforementioned Items [26] to [30], wherein a part of the slip agent and a part of the fluoropolymer-based lubricant are adhered to an inner surface of the innermost layer.

[32] The molding packaging material as recited in any one of the aforementioned Items [26] to [31], wherein a dynamic friction coefficient of an inner surface of the innermost layer is 0.5 or less.

[33] The molding packaging material as recited in any one of the aforementioned Items [26] to [32], wherein the slip agent is adhered to an outer surface of the substrate layer.

[34] The molding packaging material as recited in any one of the aforementioned Items [26] to [33], wherein a dynamic friction coefficient of the outer surface of the substrate layer is 0.5 or less.

[35] A power storage device packaging case composed of a molded article of the molding packaging material as recited in any one of the aforementioned Items [26] to [34].

[36] A power storage device comprising:

a power storage device main parts; and an external material including at least a power storage device packaging case recited in the aforementioned Item [35].

[37] A molding packaging material comprising:

a substrate layer as an outer layer;

a heat fusible resin layer as an inner layer; and a metal foil layer arranged between the substrate layer and the heat fusible resin layer, wherein the heat fusible resin layer is composed of a single layer or a multi-layer, and an innermost layer of the heat fusible resin layer is made of a resin composition containing a heat fusible resin, a roughening material, a slip agent, and a fluoropolymer-based lubricant, and wherein the roughening material contains a thermoplastic resin, and wherein a first lubricative layer containing a fluoropolymer-based lubricant in a content rate greater than 50 mass % is formed on an inner surface of the innermost layer.

[38] The molding packaging material as recited in the aforementioned Item [37], wherein a second lubricative layer containing the slip agent in a content rate greater than 50 mass % is formed on an inner surface of the first lubricative layer.

[39] The molding packaging material as recited in the aforementioned Item [37] or [38], wherein a content rate of the fluoropolymer-based lubricant in the innermost layer is 5 ppm to 5,000 ppm.

[40] The molding packaging material as recited in any one of the aforementioned Items [37] to [39], wherein a fluorine content rate in the fluoropolymer-based lubricant is 50 mass % or more.

[41] The molding packaging material as recited in any one of the aforementioned Items [37] to [40], wherein the fluoropolymer-based lubricant is one or two fluoropolymer-based lubricants selected from the group consisting of a tetrafluoroethylene-hexafluoropropylene-vinylidene fluoride copolymer and a hexafluoropropylene-vinylidene fluoride copolymer.

[42] The molding packaging material as recited in any one of the aforementioned Items [37] to [41], wherein the thermoplastic resin composing the roughening material is a high density polyethylene resin.

[43] The molding packaging material as recited in any one of the aforementioned Items [37] to [42], wherein the slip agent is a fatty acid amide.

[44] The molding packaging material as recited in any one of the aforementioned Items [37] to [43], wherein a third lubricative layer containing the slip agent is formed on an outer surface of the substrate layer.

[45] The molding packaging material as recited in the aforementioned Item [44], wherein a dynamic friction coefficient of an outer surface of the packaging material is 0.5 or less.

[46] The molding packaging material as recited in any one of the aforementioned Items [37] to [45], wherein a dynamic friction coefficient of an inner surface of the packaging material is 0.5 or less.

[47] A power storage device packaging case composed of a molded article of the molding packaging material as recited in any one of the aforementioned Items [37] to [46].

[48] A power storage device comprising:

a power storage device main parts; and an external material containing at least the power storage device packaging case as recited in the aforementioned Item [47], wherein the power storage device main parts is packaged with the external material.

[49] A method of producing a molding packaging material, comprising:

a preparation process of preparing a laminated body in which a substrate layer is laminated on one side of the metal foil via an outer adhesive and a heat fusible resin layer is laminated on the other side of the metal foil via an inner adhesive, wherein the heat fusible resin layer is composed of a single layer or a multi-layer, and an innermost layer of the heat fusible resin layer is made of a resin composition containing a heat fusible resin, a roughening material, a slip agent, and a fluoropolymer-based lubricant; and an aging process of obtaining a molding packaging material by subjecting the laminated body to a heat treatment, wherein the roughening material contains a thermoplastic resin.

[50] The method of producing a molding packaging material as recited in the aforementioned Item [49], wherein a heating temperature of the heat treatment in the aging process is 30° C. to 50° C.

[51] The method of producing a molding packaging material as recited in the aforementioned Item [49] or [50], wherein layer formation of the innermost layer is performed by melt extruding the resin composition to form a film in the preparation process.

[52] The method of producing a molding packaging material as recited in the aforementioned Item [49] or [50], wherein the layer formation of the innermost layer is performed by applying a coating solution containing the resin composition and a solvent and drying it in the preparation process.

Effects of the Invention

In the invention as recited in the aforementioned Item [1], since it is configured such that the innermost layer of the heat fusible resin layer is composed of a resin composition containing a heat fusible resin, an anti-blocking agent, a slip agent, and a fluoropolymer-based lubricant, the slipperiness between the surface of the innermost layer of the heat fusible resin layer and the surface of the molding die at the time of molding the packaging material is improved, which in turn can improve the moldability at the time of molding, such as, e.g., deep drawing molding and stretch forming. According to the present invention, a stable slipperiness can be secured during molding even when the bleed amount of the slip agent is small.

In the invention as recited in the aforementioned Item [2], the slipperiness can be further improved, and the formability at the time of molding can be further improved.

In the invention as recited in the aforementioned Item [3], since the fluorine content rate in the fluoropolymer-based lubricant is 50 mass % or more, the slipperiness can be further improved to further improve the formability during molding.

In the invention as recited in the aforementioned Item [4], as the fluoropolymer-based lubricant, a tetrafluoroethylene-hexafluoropropylene-vinylidene fluoride copolymer or a hexafluoropropylene-vinylidene fluoride copolymer, or both are used. Therefore, the slipperiness can be further improved and the formability at molding can be further improved.

In the invention as recited in the aforementioned Item [5], the slipperiness can be further improved to further improve the formability of the packaging material during molding.

In the invention as recited in the aforementioned Item [6], the slipperiness can be further improved to further improve the formability during molding.

In the invention as recited in the aforementioned Item [7], the slipperiness can be further improved to further improve the formability of the packaging material during molding.

In the invention as recited in the aforementioned Item [8], the slipperiness can be further improved to further improve the formability during molding.

In the invention as recited in the aforementioned Item [9], a well-molded power storage device packaging case can be provided.

In the invention as recited in the aforementioned Item [10], a power storage device constructed using a well-molded packaging case can be provided.

In the invention as recited in the aforementioned Item [11], the innermost layer of the heat fusible resin layer is made of a resin composition containing a heat fusible resin, an anti-blocking agent, a slip agent, and a fluoropolymer-based lubricant, and a first lubricative layer containing a fluoropolymer-based lubricant at a content rate greater than 50 mass % is formed on the inner surface of the innermost layer. Therefore, it is possible to improve the slipperiness between the inner surface of the packaging material and the surface of the molding die when molding the packaging material to thereby improve the moldability when molding, such as deep drawing and stretch forming, and it is also less likely to cause white powder on the surface of the packaging material. According to the present invention, even if the bleed amount of the slip agent is less than that of a conventional method, stable slipperiness can be secured during molding.

In the invention as recited in the aforementioned Item [12], a second lubricative layer containing a slip agent at a content rate greater than 50 mass % is formed on the inner surface of the first lubricative layer, so that the slipperiness can be further improved to further improve the moldability during molding.

In the invention as recited in the aforementioned Item [13], the slipperiness can be further improved to further improve the formability during molding.

In the invention as recited in the aforementioned Item [14], since the fluorine content rate in the fluoropolymer-based lubricant is 50 mass % or more, the slipperiness can be further improved to further improve the formability during molding.

In the invention as recited in the aforementioned Item [15], as the fluoropolymer-based lubricant, one or two fluoropolymer-based lubricants selected from the group consisting of a tetrafluoroethylene-hexafluoropropylene-vinylidene fluoride copolymer and a hexafluoropropylene-vinylidene fluoride copolymer are used. Therefore, the slipperiness can be further improved to further improve the formability during molding.

In the invention as recited in the aforementioned Item [16], the slipperiness can be further improved to further improve the formability of the packaging material during molding.

In the invention as recited in the aforementioned Item [17], the slipperiness can be further improved to further improve the formability during molding.

In the invention as recited in the aforementioned Item [18], the slipperiness can be further improved to further improve the formability of the packaging material during molding.

In the invention as recited in the aforementioned Item [19], the slipperiness can be further improved to further improve the formability during molding.

In the invention as recited in the aforementioned Item [20], a well-molded power storage device packaging case can be provided.

In the invention as recited in the aforementioned Item [21], a power storage device configured using a well-formed packaging case can be provided.

In the molding packaging material obtained by the invention (production method) as recited in the aforementioned Item [22], it is configured such that a first lubricative layer containing a fluoropolymer-based lubricant at a content rate greater than 50 mass % is formed on the inner surface of the innermost layer of the resin composition containing a heat fusible resin, an anti-blocking agent, a slip agent, and a fluoropolymer-based lubricant, and a second lubricative layer containing a slip agent at a content rate greater than 50 mass % is formed on the inner surface of the first lubricative layer. Therefore, the slipperiness between the inner surface of the packaging material and the surface of the molding die when forming the packaging material is improved. Therefore, it is possible to improve the moldability when performing molding, such as, e.g., deep-drawing forming and stretch forming, and it is less likely to cause white powder on the surface of the packaging material.

In the invention as recited in the aforementioned Item [23], since the heating temperature of the aging is 30° C. to 50° C., the second lubricative layer can be reliably formed and it is possible to sufficiently prevent causing of white powder on the surface of the packaging material. Especially, the heating temperature of the aging is preferably set to 35° C. to 45° C.

In the invention as recited in the aforementioned Item [24], since layer formation of the innermost layer is performed by melt extruding the resin composition to form a film, the first lubricative layer can be reliably formed and causing of white powder on the surface of the packaging material can be sufficiently prevented.

In the invention as recited in the aforementioned Item [25], since film formation of the innermost layer is performed by applying a coating solution containing the resin composition and a solvent and drying it, the first lubricative layer can be reliably formed and it is possible to sufficiently prevent causing of white powder on the surface of the packaging material.

In the invention as recited in the aforementioned Items [24] and [25], it is preferable to adopt the invention (production method) as recited in the aforementioned Item [24] in that a first lubricative layer higher in the content rate of the fluoropolymer-based lubricant and uniform in thickness can be assuredly formed and the formability can be further improved.

In the invention as recited in the aforementioned Item [26], since it is configured such that the innermost layer of the heat fusible resin layer is made of a resin composition containing a heat fusible resin, a thermoplastic resin contained roughening material, a slip agent, and a fluoropolymer-based lubricant, the surface of the innermost layer of the heat fusible resin layer is roughened, so that the slipperiness between the surface of the innermost layer of the heat fusible resin layer and the surface of the molding die at the time of molding the packaging material can be improved, which in turn can improve the moldability during molding, such as, e.g., deep-drawing forming and stretch forming. According to the present invention, a stable slipperiness can be secured during molding even when the bleed amount of the slip agent is small.

Further, when the molding packaging material of the present invention is rolled, the surface of the innermost layer of the heat fusible resin layer comes into contact with the surface of the base material layer. However, the surface of the innermost layer of the heat fusible resin layer is roughened. As a result, the area where the surface of the innermost layer comes into contact with the surface of the base material layer becomes smaller. This reduces the amount of transfer of the slip agent to the surface of the base material layer (the amount of transfer of the slip agent from the surface of the innermost layer of the heat fusible resin layer). Therefore, it is advantageous that the adhesion strength to the surface of the base material layer of the adhesive tape for fixing the power storage device (batteries, etc.) to an interior of an electronic device, etc., is sufficiently obtained and when matters described in the product name, the lot number, etc., are printed on the surface (the surface of the base material layer) of the packaging material that packs the power storage device (batteries, etc.), it is less likely to be peeled off.

In the invention as recited in the aforementioned Item [27], the slipperiness can be further improved to further improve the formability during molding.

In the invention as recited in the aforementioned Item [28], since the fluorine content rate in the fluoropolymer-based lubricant is 50 mass % or more, the slipperiness can be further improved to further improve the formability during molding.

In the invention as recited in the aforementioned Item [29], as a fluoropolymer-based lubricant, a tetrafluoroethylene-hexafluoropropylene-vinylidene fluoride copolymer and/or a hexafluoropropylene-vinylidene fluoride copolymer are used. Therefore, the slipperiness can be further improved to further improve the formability when molding.

In the invention as recited in the aforementioned Item [30], since the thermoplastic resin composing the roughening material is a high density polyethylene resin, the high density polyethylene resin has moderately low compatibility with the heat fusible resin, so that surface roughing can be performed efficiently, which in turn can further improve the slipperiness.

In the invention as recited in the aforementioned Item [31], the slipperiness can be further improved to further improve the formability of the packaging material during molding.

In the invention as recited in the aforementioned Item [32], the slipperiness can be further improved to further improve the formability during molding.

In the invention as recited in the aforementioned Item [33], the slipperiness can be further improved to further improve the formability of the packaging material during molding.

In the invention as recited in the aforementioned Item [34], the slipperiness can be further improved to further improve the formability during molding.

In the invention as recited in the aforementioned Item [35], a well-molded power storage device packaging case can be provided.

In the invention as recited in the aforementioned Item [36], a power storage device configured using a well-molded packaging case can be provided.

In the invention as recited in the aforementioned Item [37], the innermost layer of the heat fusible resin layer is made of a resin composition containing a heat fusible resin, a thermoplastic resin contained roughening material, a slip agent, and a fluoropolymer-based lubricant, and a first lubricative layer containing a fluoropolymer-based lubricant at a content rate greater than 50 mass % is formed on the inner surface of the innermost layer. Therefore, the slipperiness between the inner surface of the packaging material and the surface of the molding die when molding the packaging material is improved. Thus, the moldability when molding, such as, e.g., deep-drawing forming and stretch forming, can be improved, and it is less likely to cause white powder on the surface of the packaging material. According to the present invention, even if the bleed amount of the slip agent is less than that of a conventional method, stable slipperiness can be secured during molding.

Further, when the molding packaging material of the present invention is rolled, the surface of the innermost layer of the heat fusible resin layer comes into contact with the surface of the base material layer. However, the surface of the innermost layer of the heat fusible resin layer is roughened. As a result, the area where the surface of the innermost layer comes into contact with the surface of the base material layer becomes smaller. This reduces the amount of transfer of the slip agent to the surface of the base material layer (the amount of transfer of the slip agent from the surface of the innermost layer of the heat fusible resin layer). Therefore, it is advantageous that the adhesion strength to the surface of the base material layer of the adhesive tape for fixing the power storage device (batteries, etc.) to an interior of an electronic device, etc., is sufficiently obtained and when matters described in the product name, the lot number, etc., are printed on the surface (the surface of the base material layer) of the packaging material that packs the power storage device (batteries, etc.), it is less likely to be peeled off.

In the invention as recited in the aforementioned Item [38], a second lubricative layer containing a slip agent at a content rate greater than 50 mass % is formed in the inner surface of the first lubricative layer, so that the slipperiness can be further improved to further improve the moldability during molding.

In the invention as recited in the aforementioned Item [39], the slipperiness can be further improved to further improve the formability during molding.

In the invention as recited in the aforementioned Item [40], since the fluorine content rate in the fluoropolymer-based lubricant is 50 mass % or more, the slipperiness can be further improved to further improve the formability during molding.

In the invention as recited in the aforementioned Item [41], as the fluoropolymer-based lubricant, since one or two fluoropolymer-based lubricants selected from the group consisting of a tetrafluoroethylene-hexafluoropropylene-vinylidene fluoride copolymer and a hexafluoropropylene-vinylidene fluoride copolymer are used, the slipperiness can be further improved to further improve formability during molding.

In the invention as recited in the aforementioned Item [42], since the thermoplastic resin configuring the roughening material is a high density polyethylene resin, the high density polyethylene resin has moderately low compatibility with the heat fusible resin, so that surface roughing can be performed efficiently, which in turn can further improve the slipperiness.

In the invention as recited in the aforementioned Item [43], the slipperiness can be further improved to further improve the formability of the packaging material during molding.

In the invention as recited in the aforementioned Item [44], the slipperiness can be further improved to further improve the formability during molding.

In the invention as recited in the aforementioned Item [45], the slipperiness can be further improved to further improve the formability of the packaging material during molding.

In the invention as recited in the aforementioned Item [46], the slipperiness can be further improved to further improve the formability during molding.

In the invention as recited in the aforementioned Item [47], a well-molded power storage device packaging case can be provided.

In the invention as recited in the aforementioned Item [48], a power storage device configured using a well-molded packaging case can be provided.

In the molding packaging material obtained in the invention (production method) as recited in the aforementioned Item [49], a first lubricative layer containing a fluoropolymer-based lubricant at a content rate greater than 50 mass % is formed on the inner surface of the inner layer of the resin composition containing a heat fusible resin, a thermoplastic resin contained roughening material, a slip agent, and a fluoropolymer-based lubricant, and a second lubricative layer containing a slip agent at a content rate greater than 50 mass % is formed on the inner surface of the first lubricative layer. Therefore, the slipperiness between the inner surface of the packaging material and the molding die surface when forming the packaging material is improved, which in turn can improve the moldability when molding, such as, e.g., deep-drawing forming and stretch forming, and it is less likely to cause white powder on the surface of the packaging material.

Further, when the molding packaging material obtained by the production method of the present invention is rolled, the surface of the innermost layer of the heat fusible resin layer comes into contact with the surface of the base material layer. However, the surface of the innermost layer of the heat fusible resin layer is roughened. As a result, the area where the surface of the innermost layer comes into contact with the surface of the base material layer becomes smaller. This reduces the amount of transfer of the slip agent to the surface of the base material layer (the amount of transfer of the slip agent from the surface of the innermost layer of the heat fusible resin layer). Therefore, it is advantageous that the adhesion strength to the surface of the base material layer of the adhesive tape for fixing the power storage device (batteries, etc.) to an interior of an electronic device, etc., is sufficiently obtained and when matters described in the product name, the lot number, etc., are printed on the surface (the surface of the base material layer) of the packaging material that packs the power storage device (batteries, etc.), it is less likely to be peeled off.

In the invention as recited in the aforementioned Item [50], since the heating temperature of the aging is 30° C. to 50° C., the second lubricative layer can be reliably formed and it is possible to sufficiently prevent causing of white powder on the surface of the packaging material. The heating temperature of the aging is preferably set to 35° C. to 45° C.

In the invention as recited in the aforementioned Item [51], since the layer formation of the innermost layer is performed by melt extruding the resin composition to form a film, the first lubricative layer can be reliably formed and it is possible to sufficiently prevent causing of white powder on the surface of the packaging material.

In the invention as recited in the aforementioned Item [52], layer forming of the innermost layer is performed by applying a coating solution containing the resin composition and a solvent and drying it, so that the first lubricative layer can be reliably formed and it is possible to sufficiently prevent causing of white powder on the surface of the packaging material.

In the invention as recited in the aforementioned Items [51] and [52], it is preferable to adopt the invention (production method) as recited in the aforementioned Item [51] in that a first lubricative layer higher in the content rate of the fluoropolymer-based lubricant and uniform in thickness can be reliably formed and the formability can be further improved.

EMBODIMENTS FOR CARRYING OUT THE INVENTION

<First Invention>

Figure 1:
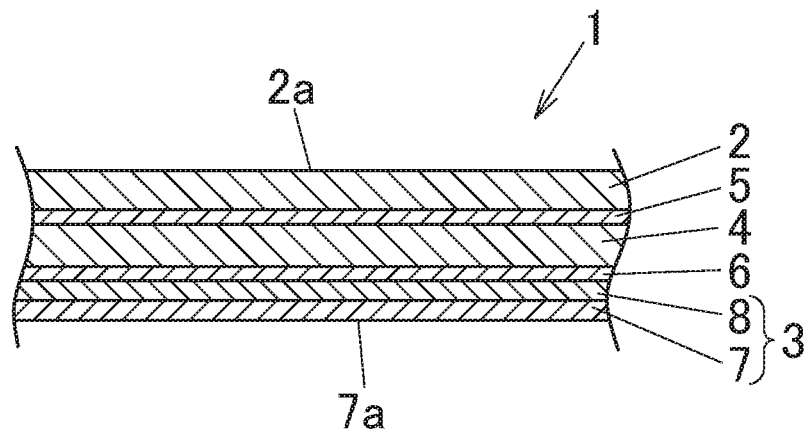
FIG. 1 is a cross-sectional view illustrating a first embodiment of a molding packaging material according to the present invention.

A molding packaging material 1 according to a first invention includes a substrate layer 2 as an outer layer, a heat fusible resin layer 3 as an inner layer, and a metal foil layer 4 arranged between these two layers. The heat fusible resin layer 3 is composed of a single layer or a multi-layer. The innermost layer 7 of the heat fusible resin layer 3 is made of a resin composition containing a heat fusible resin, an anti-blocking agent, a slip agent, and a fluoropolymer-based lubricant (see FIG. 1 to FIG. 3, FIG. 6 to FIG. 8).

Six embodiments of the molding packaging material 1 according to the first invention are shown in FIG. 1 to FIG. 3 and FIG. 6 to FIG. 8, respectively. It should be noted that these six embodiments merely illustrate typical embodiments and the invention is not particularly limited to such configurations.

The molding packaging material 1 shown in FIG. 1 to FIG. 3, and FIG. 6 to FIG. 8 is used for a lithium-ion secondary battery case. The molding packaging material 1 is subjected to molding, such as, e.g., deep-drawing forming and stretch forming, and is used as a secondary battery case or the like.

In the embodiments shown in FIG. 1 to FIG. 3 and FIG. 6 to FIG. 8, the molding packaging material 1 is configured such that the heat fusible resin layer (inner layer) 3 is integrally laminated on one side of a metal foil layer 4 via an inner adhesive layer 6 and a substrate layer (outer layer) 2 is integrally laminated on the other side of the metal foil layer 4 via an outer adhesive layer 5.

In the first embodiment shown in FIG. 1, the heat fusible resin layer (inner layer) 3 has a configuration (two-layer lamination configuration) including a first heat fusible resin layer composing the innermost layer 7 of the inner layer 3 and a second heat fusible resin layer 8 laminated on the surface of the first heat fusible resin layer 7 on the metal foil layer 4 side. The first heat fusible resin layer (innermost layer) 7 is exposed to the inner surface of the molding packaging material 1 (see FIG. 1).

Figure 2:
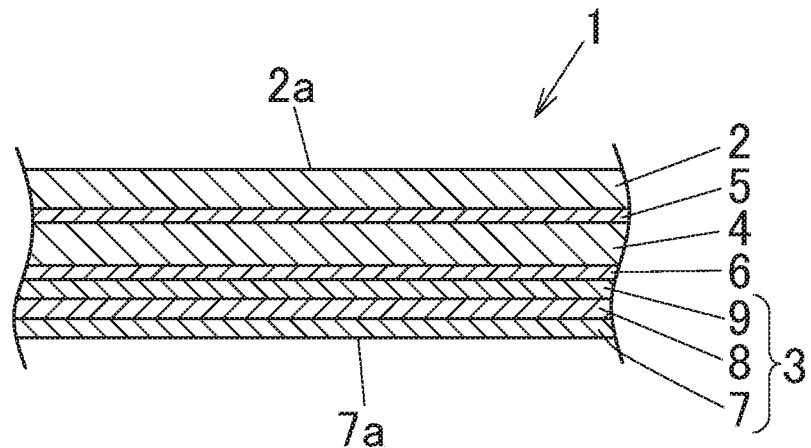
FIG. 2 is a cross-sectional view illustrating a second embodiment of a molding packaging material according to the present invention.

Further, in the second embodiment shown in FIG. 2, the heat fusible resin layer (inner layer) 3 includes a first heat fusible resin layer composing the innermost layer 7 of the inner layer 3 of the first heat fusible resin layer, a second heat fusible resin layer 8 laminated on the surface of the first heat fusible resin layer 7 on the metal foil layer 4 side, and a third heat fusible resin layer 9 laminated on the surface of the second heat fusible resin layer 8 on the metal foil layer 4 side. The first heat fusible resin layer (innermost layer) 7 is exposed to the inner surface of the molding packaging material 1 (see FIG. 2).

Figure 3:
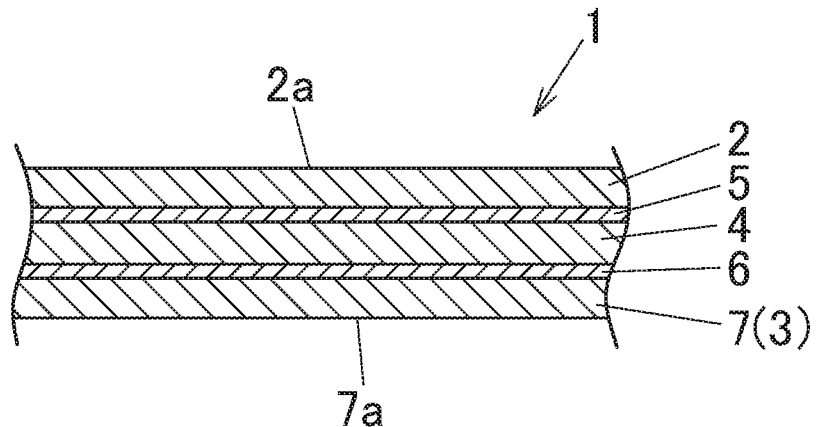
FIG. 3 is a cross-sectional view illustrating a third embodiment of a molding packaging material according to the present invention.

Further, in the third embodiment illustrated in FIG. 3, the heat fusible resin layer (inner layer) 3 is a single-layer configuration composed of only a first heat fusible resin layer (innermost layer) 7. Similarly, the first heat fusible resin layer (innermost layer) 7 is exposed to the inner surface of the molding packaging material 1 (see FIG. 3).

Figure 6:
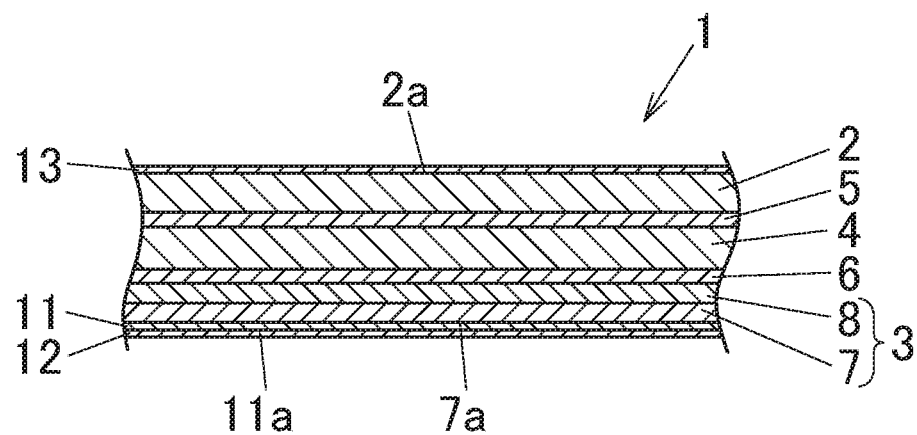
FIG. 6 is a cross-sectional view illustrating another embodiment of a molding packaging material according to the present invention.

Further, in the fourth embodiment shown in FIG. 6, the heat fusible resin layer (inner layer) 3 is a configuration (a two-layer lamination configuration) composed of a first heat fusible resin layer composing the innermost layer 7 of the inner layer 3 and a second heat fusible resin layer 8 laminated to the surface of the first heat fusible resin layer 7 on the metal foil layer 4 side. A first lubricative layer 11 containing a fluoropolymer-based lubricant at a content rate greater 50 mass % is laminated to the inner surface 7a of the first heat fusible resin layer (innermost layer) 7, and a second lubricative layer 12 containing a slip agent at a content rate greater than 50 mass % is laminated to the inner surface 11a of the first lubricative layer 11 (see FIG. 6). Further, a third lubricative layer 13 containing a slip agent is laminated to the outer surface 2a of the substrate layer (outer layer) 2 (see FIG. 6).

Figure 7:
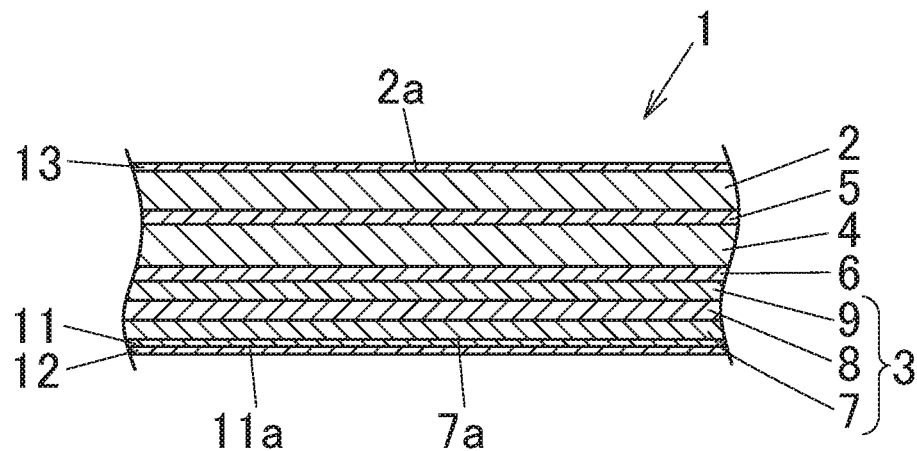
FIG. 7 is a cross-sectional view illustrating a still another embodiment of a molding packaging material according to the present invention.

Further, in the fifth embodiment shown in FIG. 7, the heat fusible resin layer (inner layer) 3 is a three-layer lamination structure including a first heat fusible resin layer composing the innermost layer 7 of the inner layer 3, a second heat fusible resin layer 8 laminated on the surface of the first heat fusible resin layer 7 on the metal foil layer 4 side, and a third heat fusible resin layer 9 laminated on the surface of the second heat fusible resin layer 8 on the metal foil layer 4 side. A first lubricative layer 11 containing a fluoropolymer-based lubricant at a content rate greater than 50 mass % is laminated to the inner surface 7a of the first heat fusible resin layer (innermost layer) 7, and a second lubricative layer 12 containing a slip agent at a content rate greater than 50 mass % is laminated to the inner surface 11a of the first lubricative layer 11 (see FIG. 7). Further, a third lubricative layer 13 containing a slip agent is laminated to the outer surface 2a of the substrate layer (outer layer) 2 (see FIG. 7).

Figure 8:
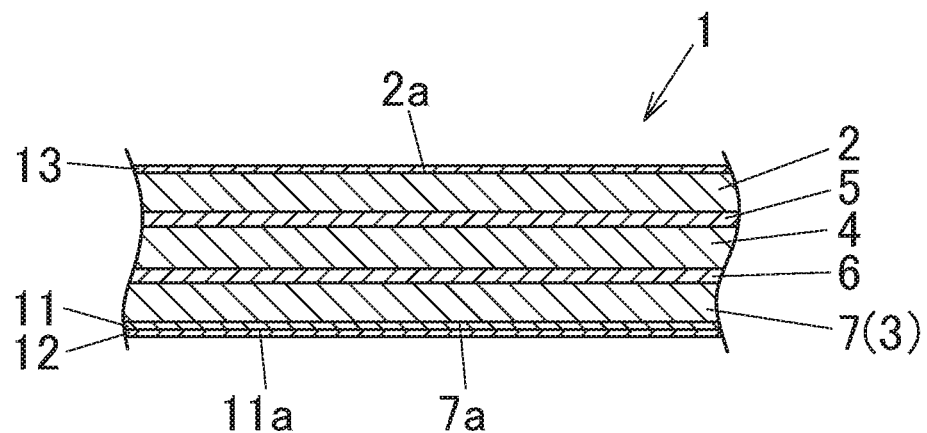
FIG. 8 is a sectional view illustrating a still yet another embodiment of a molding packaging material according to the present invention.

In the sixth embodiment illustrated in FIG. 8, the heat fusible resin layer (inner layer) 3 is a single-layer configuration composed of only the first heat fusible resin layer (innermost layer) 7. Similarly, a first lubricative layer 11 containing a fluoropolymer-based lubricant at a content rate greater than 50 mass % is laminated to the inner surface 7a of the first heat fusible resin layer (innermost layer) 7 and a second lubricative layer 12 containing a slip agent at a content rate greater than 50 mass % is laminated to the inner surface 11a of the first lubricative layer 11 (see FIG. 8). Further, a third lubricative layer 13 containing a slip agent is laminated to the outer surface 2a of the substrate layer (outer layer) 2 (see FIG. 8).

In the molding packaging material 1 of the fourth to sixth embodiments (FIG. 6 to FIG. 8), the innermost layer 7 of the heat fusible resin layer 3 is made of a resin composition containing a heat fusible resin, an anti-blocking agent, a slip agent, and a fluoropolymer-based lubricant, the first lubricative layer 11 containing a fluoropolymer-based lubricant at a content rate greater than 50 mass % is laminated to the inner surface 7a of the first heat fusible resin layer (innermost layer) 7, and the second lubricative layer 12 containing a slip agent at a content rate greater than 50 mass % is laminated to the inner surface 11a of the first lubricative layer 11. Therefore, the slipperiness between the inner surface of the packaging material 1 and the surface of a molding die during the molding process of the packaging material 1 can be improved, which in turn can improve the moldability during molding, such as, e.g., deep-drawing molding and stretch forming (deeper molding can be performed well). Further, since the third lubricative layer 13 containing a slip agent is laminated to the outer surface 2a of the substrate layer (outer layer) 2, the moldability can be further improved.

<Second Invention>

The molding packaging material 1 according to a second invention includes a substrate layer 2 as an outer layer, a heat fusible resin layer 3 as an inner layer, and a metal foil layer 4 arranged between these two layers. The heat fusible resin layer 3 is composed of a single layer or a multi-layer. The innermost layer 7 of the heat fusible resin layer 3 is made of a resin composition containing a heat fusible resin, a roughening material, a slip agent, and a fluoropolymer-based lubricant, and the roughening material contains a thermoplastic resin (see FIG. 1 to FIG. 3, FIG. 6 to FIG. 8).

Six embodiments of the molding packaging material 1 according to the present invention are shown in FIG. 1 to FIG. 3 and FIG. 6 to FIG. 8, respectively. It should be noted that these six embodiments merely illustrate typical embodiments and the invention is not particularly limited to such configurations.

The molding packaging material 1 shown in FIG. 1 to FIG. 3 and FIG. 6 to FIG. 8 is used for a lithium-ion secondary battery case. The molding packaging material 1 is subjected to molding, such as, e.g., deep-drawing forming and stretch forming, and is used as, e.g., a secondary battery case.

In the embodiments shown in FIG. 1 to FIG. 3 and FIG. 6 to FIG. 8, the molding packaging material 1 is configured such that a heat fusible resin layer (inner layer) 3 is integrally laminated to one side of a metal foil layer 4 via an inner adhesive layer 6 and a substrate layer (outer layer) 2 is integrally laminated to the other side of the metal foil layer 4 via an outer adhesive layer 5.

In the first embodiment shown in FIG. 1, the heat fusible resin layer (inner layer) 3 has a configuration (two-layer lamination configuration) including a first heat fusible resin layer composing the innermost layer 7 of the inner layer 3 and a second heat fusible resin layer 8 laminated to the surface of the first heat fusible resin layer 7 on the metal foil layer 4 side. The first heat fusible resin layer (innermost layer) 7 is exposed to the inner surface of the molding packaging material 1 (see FIG. 1).

In the second embodiment shown in FIG. 2, the heat fusible resin layer (inner layer) 3 has a configuration (three-layer lamination configuration) including a first heat fusible resin layer composing an innermost layer 7 of the inner layer 3, a second heat fusible resin layer 8 laminated to the surface of the first heat fusible resin layer 7 on the metal foil layer 4 side, and a third heat fusible resin layer 9 laminated to the surface of the first heat fusible resin layer 7 on the metal foil layer 4 side. The first heat fusible resin layer (innermost layer) 7 is exposed to the inner surface of the molding packaging material 1 (see FIG. 2).

In the third embodiment illustrated in FIG. 3, the heat fusible resin layer (inner layer) 3 is a single-layer configuration composed of only the first heat fusible resin layer (innermost layer) 7. Similarly, the first heat fusible resin layer (innermost layer) 7 is exposed to the inner surface of the molding packaging material 1 (see FIG. 3).

In the fourth embodiment illustrated in FIG. 6, the heat fusible resin layer (inner layer) 3 is a configuration (a two-layer layered configuration) composed of the first heat fusible resin layer composing the innermost layer 7 of the inner layer 3 and the second heat fusible resin layer 8 laminated on the surface of the first heat fusible resin layer 7 on the metal foil layer 4 side. The first lubricative layer 11 containing a fluoropolymer-based lubricant at a content rate greater 50 mass % is laminated to the inner surface 7a of the first heat fusible resin layer (innermost layer) 7, and the second lubricative layer 12 containing a slip agent at a content rate greater than 50 mass % is laminated to the inner surface 11a of the first lubricative layer 11 (see FIG. 6). Further, the third lubricative layer 13 containing a slip agent is laminated to the outer surface 2a of the substrate layer (outer layer) 2 (see FIG. 6).

Further, in the fifth embodiment shown in FIG. 7, the heat fusible resin layer (inner layer) 3 is a three-layer lamination configuration composed of the first heat fusible resin layer composing the innermost layer 7 of the inner layer 3, the second heat fusible resin layer 8 laminated on the surface of the first heat fusible resin layer 7 on the metal foil layer 4 side, and the third heat fusible resin layer 9 laminated on the surface of the second heat fusible resin layer 8 on the metal foil layer 4 side. The first lubricative layer 11 containing a fluoropolymer-based lubricant at a content rate greater than 50 mass % is laminated to the inner surface 7a of the first heat fusible resin layer (innermost layer) 7, and the second lubricative layer 12 containing a slip agent of greater than 50 mass % is laminated to the inner surface 11a of the first lubricative layer 11 (see FIG. 7). Further, the third lubricative layer 13 containing a slip agent is laminated to the outer surface 2a of the substrate layer (outer layer) 2 (see FIG. 7).

In the sixth embodiment illustrated in FIG. 8, the heat fusible resin layer (inner layer) 3 is a single-layer configuration composed of only the first heat fusible resin layer (innermost layer) 7. Similarly, a first lubricative layer 11 containing a fluoropolymer-based lubricant at a content rate greater than 50 mass % is laminated to the inner surface 7a of the first heat fusible resin layer (innermost layer) 7, and a second lubricative layer 12 containing a slip agent at a content rate greater than 50 mass % is laminated to the inner surface 11a of the first lubricative layer 11 (see FIG. 8). Further, a third lubricative layer 13 containing a slip agent is laminated to the outer surface 2a of the substrate layer (outer layer) 2 (see FIG. 8).

In the molding packaging material 1 of the fourth to sixth embodiments (FIG. 6 to FIG. 8) of the second invention, the innermost layer 7 of the heat fusible resin layer 3 is made of a resin composition containing a heat fusible resin, a thermoplastic resin contained roughening material, a slip agent, and a fluoropolymer-based lubricant. A first lubricative layer 11 containing a fluoropolymer-based lubricant at a content rate greater than 50 mass % is laminated to the inner surface 7a of the first heat fusible resin layer (the innermost layer) 7. Further, a second lubricative layer 12 containing a slip agent at a content rate greater than 50 mass % is laminated to the inner surface 11a of the first lubricative layer 11. Therefore, the slipperiness between the inner surface of the packaging material 1 and the surface of the molding die during the molding process of the packaging material 1 can be improved, which in turn can improve the moldability during the molding, such as, e.g., deep-drawing forming and stretch forming (deeper molding can be performed well). Further, since the third lubricative layer 13 containing a slip agent is laminated to the outer surface 2a of the substrate layer (outer layer) 2, the moldability can be further improved.

In the present invention, the heat fusible resin layer (inner layer; sealant layer) 3 has excellent chemical resistance against highly corrosive electrolytes used in, e.g., lithium-ion secondary batteries, and also play a role of providing a heat sealing property to the packaging material.

The resin composing the heat fusible resin layer 3 (including the first heat fusible resin layer 7, the second heat fusible resin layer 8, and the third heat fusible resin layer 9) is not specifically limited. It is preferable to use as the resin at least one heat fusible resin selected from the group consisting of polyethylene, polypropylene, olefin-based copolymer, and ionomer. Note that it is not preferable to use an acid-modified polyolefin resin as the resin composing the heat fusible resin layer 3 from the viewpoint of economic efficiency. In other words, it is preferable to use a non-acid modified polyolefin resin as the resin composing the heat fusible resin layer 3.

When a two-layer lamination configuration is employed as the heat fusible resin layer (inner layer) 3 as shown in the first embodiment, it is preferable to configure as follows. That is, a random copolymer containing "propylene" and "other copolymer components other than propylene" as copolymer components is used as the heat fusible resin composing the first heat fusible resin layer (innermost layer) 7. Further, a block copolymer containing "propylene" and "other copolymer components other than propylene" as copolymer components is used as the heat fusible resin composing the second heat fusible resin layer 8.

Further, when a three-layer lamination configuration is employed as the heat fusible resin layer (inner layer) 3 as in the second embodiment, it is preferable to configure as follows. That is, a random copolymer containing "propylene" and "other copolymer components other than propylene" as copolymer components is used as the heat fusible resin composing the first heat fusible resin layer (innermost layer) 7 and the third heat fusible resin layer 9. Further, a block copolymer containing "propylene" and "other copolymer components other than propylene" as copolymer components is used as the heat fusible resin configuring the second heat fusible resin layer 8. Note that in the case of employing a three-layer lamination configuration as the heat fusible resin layer 3, a fluoropolymer-based lubricant may be contained also in the third heat fusible resin layer 9. However, since there is a concern that the laminate strength may be reduced, it is preferably configured such that the third heat fusible resin layer 9 contains no fluoropolymer-based lubricant or contains a fluoropolymer-based lubricant at a content rate less than 1,000 ppm even in the case of containing the fluoropolymer-based lubricant.

Further, in the case of employing a single layer configuration as the heat fusible resin layer (inner layer) 3 as in the third embodiment, it is preferable to use a random copolymer containing "propylene" and "other copolymer components other than propylene" as copolymer components as the heat fusible resin configuring the first heat fusible resin layer (innermost layer) 7.

With respect to the random copolymer, the "other copolymer components other than propylene" are not specifically limited, and examples thereof include, olefinic components, such as, e.g., ethylene, 1-butene, 1-hexene, 1-pentene, and 4 methyl-1-pentene, and butadiene. Also, with respect to the block copolymer, the "other copolymer components other than propylene" are not specifically limited, and examples thereof include olefinic components, such as, e.g., ethylene, 1-butene, 1-hexene, 1-pentene, 4 methyl-1-pentene, and butadiene.

In the present invention, the innermost layer 7 of the heat fusible resin layer 3 is made of a resin composition containing a heat fusible resin, an anti-blocking agent, a slip agent, and a fluoropolymer-based lubricant. Therefore, the slipperiness between the surface 7a of the innermost layer 7 of the heat fusible resin layer 3 and the surface of the molding die at the time of molding the packaging material 1 can be improved, which in turn can improve the moldability during forming, such as, e.g., deep-drawing forming and stretch forming (deeper molding can be performed well).

[Anti-Blocking Agent]

The anti-blocking agent is not specifically limited, and examples thereof include inorganic particles and resin particles. The inorganic particles are not specifically limited, and examples thereof include silica particles and aluminum silicate particles. The resin particles are not particularly limited, and examples thereof include acrylic resin particles, polyolefin resin particles (polyethylene resin particles, polypropylene resin particles), and polystyrene resin particles.

The particle size of the anti-blocking agent is preferably in the range of 0.1 µm to 10 µm in terms of an mean particle diameter, and more preferably in the range of 1 µm to 5 µm in terms of an mean particle diameter.

The concentration (content rate) of the anti-blocking agent in the innermost layer 7 is preferably set to 100 ppm to 50,000 ppm, and particularly preferably set to 500 ppm to 15,000 ppm.

[Roughening Material]

The roughening material is not particularly limited, and, for example, a thermoplastic resin containing pellets, thermoplastic resin containing powder, and the like, are used. Among these, a thermoplastic resin contained powder is preferred in terms of dispersibility. The thermoplastic resin configuring the roughening material is not particularly limited, and examples thereof include an olefin-based resin, such as, e.g., a polyethylene resin (a high density polyethylene resin, a low density polyethylene resin, etc.), a polypropylene resin, an ethylene-olefin (olefin excluding ethylene) copolymer resin, and an ethylene-vinyl ester copolymer resin, and a polystyrene-based resin. Among them, as the roughening material, it is preferable to use a roughening material containing a high density polyethylene resin. In this case, the surface 7a of the innermost layer 7 of the heat fusible resin layer can be roughened effectively to further improve slipperiness without deteriorating the heat sealing properties.

The roughening material is partially exposed (protruded) to the surface 7a of the innermost layer 7 in a state in which the roughening material having a low compatibility with the matrix is dispersed in the matrix of the heat fusible resin composing the innermost layer 7. Accordingly, irregularities are formed on the surface 7a (the surface is roughened). For example, thermoplastic resin pellets or thermoplastic resin powder as a roughening material are mixed with pellets or powder of the heat fusible resin, and the mixture is melted and kneaded with an extruder or the like and dispersed finely, then cooled and solidified. Thus, a surface 7a of the innermost layer 7 having irregularities formed thereon (roughened surface) is obtained.

The mean diameter (mean value of the long diameter) of the roughening material in a dispersion state is preferably in the range of 0.05 µm to 10 µm, in which case the slipperiness can be further improved.

Preferably, the density of the high density polyethylene resin (HDPE) composing the roughening material is in the range of 0.935 g/cm$^3$ to 0.965 g/cm$^3$. In cases where the density falls within such a high density range, the slipperiness can be improved to further improve the formability. Especially, the density of the high density polyethylene resin (HDPE) composing the roughening material preferably falls within the range of 0.945 g/cm$^3$ to 0.960 g/cm$^3$.

The density of the high density polyethylene resin can be adjusted by changing the content rate of a comonomer (copolymer component). As such a comonomer, unsaturated olefins other than ethylene, such as, e.g., 1-butene, 1-hexene, 1-octene, and 4-methyl-1-pentene, can be exemplified, but not limited thereto. As the comonomer, it is preferable to use at least one comonomer selected from the group consisting of 1-butene and 1-hexene.

Preferably, the melt flow rate (MFR) of the high density polyethylene resin composing the roughening material at 190° C. falls within the range of 0.01 g/10 min. to 2 g/10 min. When the MFR is "0.01 g/10 min." or more, the roughening material can be finely and evenly dispersed in the heat fusible resin, and when the MFR is "2 g/10 min." or less, the surface roughness can be increased to further improve the slipperiness. Especially, it is particularly preferable that the melt flow rate (MFR) of the high density polyethylene resin (HDPE) composing the roughening material at 190° C. is in the range of 0.1 g/10 min. to 1 g/10 min.

The melt flow rate (MFR) of the high density polyethylene resin can be adjusted, for example, as follows. When the high density polyethylene resin is produced using a Phillips catalyst, the MFR of the high density polyethylene resin can be adjusted by changing the reactor temperature during polymerization, or the MFR of the high density polyethylene resin can be adjusted by adding a trace amount of hydrogen and then changing the reactor temperature. In cases where the high density polyethylene resin is produced using a Ziegler catalyst, the MFR of the high density polyethylene resin can be adjusted by changing the amount of hydrogen supplied to the reactor during polymerization. When the Phillips catalyst is used, the high density polyethylene resin can be produced by slurry polymerization using isobutane as a solvent, but is not particularly limited to such a method.

Preferably, the melting point of the high density polyethylene resin composing the roughening material is in the range of 130° C. to 145° C. Preferably, the high density polyethylene resin has a branch with a long chain (10C or more). When a branched high density polyethylene resin having a long chain is used, when melting and kneading the roughening material into the heat fusible resin, it is easy to cause particles in which the molten roughening material (thermoplastic resin) is dispersed. Therefore, the surface 7a of the innermost layer of heat fusible resin layer 3 can be roughened more effectively to further improve slipperiness.

The swell of the high density polyethylene resin composing the roughening material is preferably in the range of 25% to 55%. In this case, the melt viscoelasticity of the resin composing the roughening material is relatively high, so that high density polyethylene resin particles are easily formed and the surface 7a of the innermost layer can be roughened more effectively to further improve slipperiness. Especially, the swell of the high density polyethylene resin composing the roughening material is more preferably in the range of 35% to 45%.

The "swell" means a room temperature die swell percentage (%) by a capillary rheometer A method defined in JIS K7119-2001, and is a value (%) obtained by the following formula. Using a standard die (hole diameter: 2.095 mm, length: 8 mm) defined in JIS K7210-1-2014, when a strand of a resin (string-like resin) extruded from a capillary die at a temperature of 190° C. and a load of 2.16 kg has a length of 2 cm, the strand is collected with tweezers, and after natural cooling and solidification, when the diameter of the strand of 1 cm from the tip is measured with a micrometer and this measured value is $D_1$ (mm), $$\text{swell}(\%) = \{(D_1 - D_0)/D_0\} \times 100,$$

where $D_1$: extruded resin diameter, and
$D_0$: standard die hole diameter (2.095 mm).

A high load swell (swell at a load of 21.6 kg) of the high density polyethylene resin composing the roughening material is preferably in the range of 55% to 90%. In this case, the molten viscoelasticity of the resin composing the roughening material is relatively high, so that the high density polyethylene resin particles are easily formed. Thus, the surface 7a of the innermost layer can be roughened more effectively to further improve slipperiness.

Using a standard die (hole diameter: 2.095 mm, length: 8 mm) defined in JIS K7210-1-2014, when a strand of a resin (string-like) extruded from a capillary die at a temperature of 190° C. and a load of 21.6 kg becomes 2 cm in length, the strand is collected with tweezers, and after natural cooling and solidification, the diameter of the 1 cm portion of the strand from the tip is measured with a micrometer, and this measured value is defined as $D_2$ (mm), $$\text{High load swell}(\%) = \{(D_2 - D_0)/D_0\} \times 100,$$

where $D_2$: extruded resin diameter, and
$D_0$: standard die hole diameter (2.095 mm).

The "high-load MFR (MFR at a load of 21.6 kg)/MFR (MFR at a load of 2.16 kg)" of the high density polyethylene resin composing the roughening material is preferably in the range of 25 to 40, in which case the compatibility of the random copolymer with the roughening material can be secured to some extent, thereby further inhibiting the bleaching of the sealant layer 3 during molding.

The difference between the melt density of the roughening material and the density of the roughening material is preferably in the range of 0.15 g/cm$^3$ to 0.25 g/cm$^3$. In this case, the volume shrinkage ratio of the roughening material is increased in the process of cooling and solidifying the mixed resin from the molten state. Therefore, the surface 7a of the innermost layer 7 can be roughened efficiently, so that the central line mean roughness Ra of the surface 7a of the innermost layer 7 can be easily adjusted to 0.05 μm to 1 μm.

In the innermost layer 7 of the heat fusible resin layer 3, the difference between the density of the random copolymer (a random copolymer containing propylene and other copolymer components other than propylene as copolymer components) and the density of the roughening material is preferably in the range of 0.04 g/cm$^3$ to 0.07 g/cm$^3$. In this case, the difference in the volume shrinkage ratio between the random copolymer and the roughening material is increased in the process of cooling and solidifying the mixed resin in the molten state. Therefore, the irregularities of the surface 7a of the innermost layer 7 become larger, so that the surface 7a of the innermost layer can be roughened more effectively, thereby further improving the slipperiness.

In addition, it is preferable that the difference between the melt density of the random copolymer (a random copolymer containing propylene and other copolymer components other than propylene as copolymer components) and the melt density of the roughening material be 0.3 g/cm$^3$ or less.

Preferably, the content rate of the roughening material in the innermost layer 7 of the heat fusible resin layer 3 is set to 1 mass % to 30 mass %, and in this case, even if the content rate of the lubricant in the innermost layer 7 is 1,000 ppm or less, excellent moldability can be ensured. In addition, when the lubricant content rate in the innermost layer 7 exceeds 0 ppm and is 1,000 ppm or less, it becomes less likely to cause white powder on the surface 7a of the innermost layer 7 of the heat fusible resin layer of the packaging material. Among them, it is particularly preferred that the content rate of the roughening material in the innermost layer 7 be set to 1 mass % to 20 mass %.

[Slip Agent]

The slip agent is not particularly limited, but fatty acid amide is preferably used. The fatty acid amide is not particularly limited. Examples thereof include saturated fatty amide, unsaturated fatty acid amide, substituted amide, methylolamide, saturated fatty acid bisamide, unsaturated fatty acid bisamide, fatty acid esteramide, aromatic bisamide, and the like.

As the saturated fatty acid amide, it is not particularly limited. Examples thereof include lauric acid amide, palmitic acid amide, stearic acid amide, behenic acid amide, hydroxystearic acid amide, and the like. As such unsaturated fatty acid amide, it is not specifically limited. Examples thereof include oleic acid amide, erucic acid amide, and the like.

As such substituted amide, it is not particularly limited, but examples thereof include N-oleyl palmitic acid amide, N-stearyl stearic acid amide, N-stearyl oleate amide, N-oleyl stearyl stearic acid amide, N-stearyl erucic acid amide, and the like. Further, as the methylolamide, it is not particularly limited, but examples thereof include methylol stearamide and the like.

As the saturated fatty acid bisamides, it is not specifically limited. Examples thereof include methylene bis-stearic acid amide, ethylene bis-caprinic acid amide, ethylene bis-lauric acid amide, ethylene bis-stearic acid amide, ethylene bis-hydroxystearic acid amide, ethylene bis-behenic acid amide, hexamethylene bis-stearic acid amide, hexamethylene bis-behenic acid amide, hexamethylene hydroxystearic acid amide, N,N'-distearyl adipic acid amide, N,N'-distearylsebacic acid amide, and the like.

As the unsaturated fatty acid bisamides, it is not specifically limited. Examples thereof include ethylene bis-oleic acid amide, ethylene bis-erucic acid amide, hexamethylene bis-oleic acid amide, N,N'-dioleylsebacic acid amide, and the like.

As the fatty acid esteramide, it is not specifically limited. Examples thereof include stearoamide ethylstearate and the like. As the aromatic bisamide, it is not specifically limited. Examples thereof include m-xylylene bis stearic acid amide, m-xylylene bis hydroxystearic acid amide, N,N'-distearyl isophthalate amide, and the like.

The concentration (content rate) of the slip agent in the innermost layer 7 is preferably set to 100 ppm to 3,000 ppm, and particularly preferably set to 500 ppm to 1,500 ppm.

In cases where the two-layer lamination configuration described above is employed as the heat fusible resin layer 3 (see FIG. 1 and FIG. 6), it is preferable that the second heat fusible resin layer 8 also contain a slip agent. In this case, it is preferred that the second heat fusible resin layer 8 contain a slip agent in the content rate of 100 ppm to 5,000 ppm, particularly preferably in the content rate of 500 ppm to 3,000 ppm.

Further, in cases where the above-described three-layer lamination configuration (see FIG. 2 and FIG. 7) is employed as the heat fusible resin layer 3, the third heat fusible resin layer 9 may also contain a slip agent. However, there is a concern that the laminate strength deteriorates. Accordingly, it is preferable to configure such that the third heat fusible resin layer 9 contains no slip agent or contain at least a slip agent at the content rate of less than 2,000 ppm when a slip agent is contained.

[Fluoropolymer-Based Lubricant]

The fluoropolymer-based lubricant is a fluorine-containing polymer (a polymer having one or more fluorine atoms in a molecule) capable of imparting slipperiness, and examples thereof include a fluoroelastomer, a fluoropolymer (without elastomer), and the like. Since such a fluoropolymer-based lubricant is contained in the innermost layer 7, the fluorine resin lubricant has little interaction with the slip agent, and can form a slipping layer on the surface 7a of the innermost layer 7, which in turn can reduce the dynamic friction. As a result, the moldability at the time of molding, such as, e.g., deep drawing, can be greatly improved (a well molded product can be obtained even by performing deeper molding). Further, by containing the fluoropolymer-based lubricant in the innermost layer 7, the surface roughness of the surface 7a of the innermost layer 7 can be controlled.

As the fluoroelastomer, it is not specifically limited. Examples thereof include a copolymer of a fluorine-containing monomer and the like. As the copolymer of the fluorine-containing monomers, it is not specifically limited. Examples thereof include a vinylidene fluoride-hexafluoropropylene copolymer, a tetrafluoroethylene-propylene copolymer, a tetrafluoroethylene-vinylidene fluoride-hexafluoropropylene copolymer, and the like. The copolymers illustrated above are polymers in which Tg is in the range of −35° C. to −5° C. without showing a melting point. Among them, preferably, a vinylidene fluoride-hexafluoropropylene copolymer is used. In this case, a polyethylene glycol may be blended with a vinylidene fluoride-hexafluoropropylene copolymer. At this time, it is preferable to set the blend amount of the polyethylene glycol to 1 parts by mass to 70 parts by mass for 100 parts by mass of a vinylidene fluoride-hexafluoropropylene copolymer, more preferably set to 5 parts by mass to 65 parts by mass. The fluoroelastomer may be blended with, for example, an inorganic adhesion inhibitor or the like. As the inorganic-based antiadhesive, it is not specifically limited. Examples thereof include talc, amorphous silica, kaolin (aluminum silicate), calcium carbonate, and the like. As the fluoroelastomer, examples thereof include dynamer (trademark) "FX5920A", dynamer (trademark) "FX9613" produced by 3M Corporation, which contains a vinylidene fluoride-hexafluoropropylene copolymer.

As the fluorine resin (not including elastomers), it is preferable to use a fluorine resin (crystalline showing a melting point) having a melting point. As the fluorine resin having a melting point, although not specifically limited to, examples thereof include polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-hexafluoropropylene perfluoroalkyl vinyl ether copolymer (EPA), tetrafluoroethylene-ethylene copolymer (ETFE), polychlorotrifluoroethylene (PCTFE), polyvinylidene fluoride (PVDF), tetrafluoroethylene-propylene copolymer (TFE/P), tetrafluoroethylene-hexafluoropropylene-vinylidene fluoride copolymer (THV), and the like. The fluorine resin having the above-described melting point has an advantage of being superior to the fluoroelastomer in heat resistance and having less interaction (reaction) with the slip agent (fatty acid amides, etc.).

As the fluorine resin (not including elastomers), it is preferable to use a fluorine resin having a melting point falling within the range of 100° C. to 300° C. When the melting point is 100° C. or higher, it is possible to improve the dispersibility of the fluorine resin (fluoropolymer-based lubricant) in the resin composition. When the melting point is 300° C. or less, the processability can be improved (without requiring to increase the molding temperature). Especially, as the fluorine resin (not including elastomers), it is particularly preferred to use a fluorine resin having a melting point in the range of 110° C. to 230° C. Among the fluoropolymers exemplified above, those having a melting point of 100° C. to 300° C. are FEP, PCTFE, ETFE, PVDF, TFE/P, THV, and the like. Also, those having a melting point of 110° C. to 230° C. are PVDF, TFE/P, THV, and the like. Among these, a tetrafluoroethylene-hexafluoropropylene-vinylidene fluoride copolymer (THV) is optimal.

Note that the tetrafluoroethylene-hexafluoropropylene-vinylidene fluoride copolymer includes both a "fluoroelastomer" and a "fluorine resin having a melting point." It is particularly preferred to use those corresponding to the latter (i.e., tetrafluoroethylene-hexafluoropropylene-vinylidene fluoride copolymer having a melting point) in that formability can be improved. As the tetrafluoroethylene-hexafluoropropylene-vinylidene fluoride copolymer having a melting point, a dynamer (trademark) "FX5911" produced by 3M Corporation can be exemplified.

As the fluoropolymer-based lubricant, the fluoroelastomer lubricant and the fluorine resin lubricant (not including elastomers) may be used in combination (may be used in a blended manner).

Preferably, the content rate of fluorine (F atoms) in the fluoropolymer-based lubricant is 50 mass % or more. When the content rate is 50 mass % or more, it is possible to improve the heat resistance, which makes bleed easier on the surface 7a of the innermost layer. Especially, the content rate of fluorine (F atoms) in the fluoropolymer-based lubricant is more preferably 60 mass % to 80 mass %, and particularly preferably 66 mass % to 76 mass %.

Preferably, the concentration (content rate) of the fluoropolymer-based lubricant in the innermost layer 7 is set to 5 ppm to 5,000 ppm. When it is 5 ppm or more, it is possible to sufficiently improve the formability, and when it is 5,000 ppm or less, it is possible to achieve uniform extrusion (film-forming) of the innermost layer 7. Especially, the concentration (content rate) of the fluoropolymer-based lubricant in the innermost layer 7 is more preferably set to 50 ppm to 3,000 ppm, particularly preferably set to 100 ppm to 1,500 ppm, and most preferably set to 200 ppm to 1,200 ppm. When the fluoropolymer-based lubricant is blended to obtain a resin composition of the innermost layer 7, the master batch may be made by mixing the fluoropolymer-based lubricant with a resin such as a polyolefin resin, and the master batch may be blended to obtain a resin composition of the innermost layer 7.

In the present invention, the substrate layer (outer layer) 2 is preferably composed of a heat-resistant resin layer. As a heat-resistant resin composing the heat-resistant resin layer 2, a heat-resistant resin that does not melt at the heat sealing temperature when heat-sealing the packaging material is used. As the heat-resistant resin, it is preferable to use a heat-resistant resin having a melting point higher by 10° C. or more than the melting point of the heat fusible resin layer 3 (the melting point of the layer having the highest melting point when the heat fusible resin layer is composed of a multi-layer). It is particularly preferred to use a heat-resistant resin having a melting point higher by 20° C. or more than the melting point of the heat fusible resin layer 3 (the melting point of the layer having the highest melting point when the heat fusible resin layer is composed of a multi-layer).

As the heat-resistant resin layer (outer layer) 2, though not specifically limited, a polyamide film such as a nylon film, a polyester film, and the like, and stretched films thereof are preferably used. Among them, as the heat-resistant resin layer 2, it is particularly preferred to use a biaxially stretched polyamide film such as a biaxially stretched nylon films, a biaxially stretched polybutylene terephthalate (PBT) film, a biaxially stretched polyethylene terephthalate (PET) film, or a biaxially stretched polyethylene naphthalate (PEN) film. As the nylon film, it is not particularly limited. Examples thereof include a 6 nylon film, a 6,6 nylon film, an MXD nylon film, and the like. The heat-resistant resin layer 2 may be composed of a single layer. Alternatively, it may be composed of a multi-layer, such as a multi-layer composed of a polyester film/a polyamide film (such as a multi-layer composed of a PET film/nylon film).

Preferably, the thickness of the heat-resistant resin layer (outer layer) 2 is 2 μm to 50 μm. When a polyester film is used, the thickness is preferably 2 μm to 50 μm, and when a nylon film is used, the thickness is preferably 7 μm to 50 μm. When it is set to the above-mentioned preferred lower limit or more, it is possible to ensure sufficient strength as a packaging material, and when it is set to the above-mentioned preferred upper limit or less, it is possible to reduce the stress in forming such as stretch forming and drawing, which in turn can improve the formability.

The metal foil layer 4 play a role to provide a gas barrier property that prevents oxygen or water from entering the packaging material 1. As the metal foil layer 4, it is not particularly limited. Examples thereof include an aluminum foil, a SUS foil (stainless steel foil), a copper foil, and the like. Among them, it is preferable to use an aluminum foil and a SUS foil (stainless steel foil). The thickness of the metal foil layer 4 is preferably 5 μm to 120 μm. When it is 5 μm or more, it is possible to prevent pinholes from being generated during rolling when producing a metal foil. When it is 120 μm or less, it is possible to reduce the stress at the time of forming, such as stretch forming and drawing, which in turn can improve the formability. Especially, the thickness of the metal foil layer 4 is preferably 10 μm to 80 μm.

In the metal foil layer 4, it is preferable that at least the inner surface (the surface on the inner layer 3 side) be subjected to a chemical conversion treatment. The application of such a chemical conversion treatment sufficiently prevents corrosion of the metal foil surface due to the content (electrolyte of the battery, etc.). For example, the metal foil is subjected to a chemical conversion treatment by performing the following treatments. That is, for example, a chemical conversion treatment is subjected to the surface of the metal foil on which a degreasing treatment was performed by coating any one of the following aqueous solutions 1) to 3) and drying it:

1) an aqueous solution of a mixture including
   phosphoric acid,
   chromic acid, and
   at least one compound selected from the group consisting of a metal salt of fluoride, and a non-metal salt of fluoride;
2) an aqueous solution of a mixture including
   phosphoric acid,
   at least one resin selected from the group consisting of an acrylic resin, a chitosan derivative resin, and a phenol-based resin, and at least one compound selected from the group consisting of chromic acid and chromic (III) salt; and 3) an aqueous solution of a mixture including phosphoric acid, at least one resin selected from the group consisting of an acryl-based resin, a chitosan derivative resin, and a phenol-based resin, at least one compound selected from the group consisting of chromic acid and chromic (III) salt, and at least one compound selected from the group consisting of a metal salt of fluoride and a non-metal salt of fluoride.

In the aforementioned chemical conversion coating, the amount of chromium deposition (per side) is preferably 0.1 mg/m$^2$ to 50 mg/m$^2$, and particularly preferably 2 mg/m$^2$ to 20 mg/m$^2$.

As the outer adhesive 5, though not specifically limited, examples thereof include a thermosetting adhesive. As the thermosetting adhesive, though not specifically limited, examples thereof include an olefin-based adhesive, an epoxy-based adhesive, an acryl-based adhesive, and the like. Preferably, the thickness of the outer adhesive layer 5 is set to 1 μm to 5 μm. Especially, it is particularly preferred that the thickness of the outer adhesive layer 5 be set to 1 μm to 3 μm from the viewpoint of thinning and weight reduction of the packaging material 1.

As the inner adhesive 6, though not specifically limited, examples thereof include a thermosetting adhesive and the like. Preferably, the thickness of the inner adhesive layer 6 is set to 1 μm to 5 μm. In particular, it is particularly preferred that the thickness of the inner adhesive layer 6 be set to 1 μm to 3 μm from the viewpoint of thinning and weight reduction of the packaging material 1.

The following additive may be added to the substrate layer 2 and the heat fusible resin layer 3 (including the innermost layer 7) composing the molding packaging material 1 to the extent that the additive agent does not interfere with effects of the present invention. As the additive agent, though not specifically limited, examples thereof include antioxidant, plasticizer, ultraviolet light absorber, fungicide, colorant (pigments, dyes, etc.), antistatic agent, antirust agent, moisture absorber, oxygen absorber, and the like. As the plasticizer, though not specifically limited, examples thereof include glycerin fatty acid ester monoglyceride, glycerin fatty acid ester acetyl monoglyceride, glycerin fatty acid ester organic acid monoglyceride, glycerin fatty acid ester medium chain fatty acid triglyceride, polyglycerin fatty acid ester, sorbitan fatty acid ester, propylene glycol fatty acid ester, special fatty acid ester, higher alcohol fatty acid ester, and the like.

Thus, in the molding packaging material 1 of the first to third embodiments according to the first and second inventions, a part of the slip agent and a part of the fluoropolymer-based lubricant are adhered to the surface 7a of the innermost layer 7 of the heat fusible resin layer 3 in an exposed (bleed) manner. The deposition amount of the slip agent on the surface 7a of the innermost layer 7 is preferably in the range of 0.05 μg/cm$^2$ to 1.0 μg/cm$^2$. The deposition amount of the fluoropolymer-based lubricant on the surface 7a of the innermost layer 7 is preferably in the range of 0.05 μg/cm$^2$ to 1.0 μg/cm$^2$. However, due to such surface deposition, the dynamic friction coefficient of the surface 7a of the aforementioned innermost layer 7 becomes 0.5 or less. In particular, the dynamic friction coefficient of the surface 7a of the innermost layer 7 is preferably 0.25 or less, more preferably 0.20 or less, particularly preferably 0.18 or less.

In the molding packaging material 1 of the first to third embodiments according to the first and second inventions, the slip agent contained in the innermost layer 7 is adhered to the surface 2a of the substrate layer 2. The adhered slip agent is transferred from the innermost layer 7 by contacting the surface 7a of the innermost layer 7 in a wound state when storing the laminated molding packaging material 1 in a wound state. The post-transfer deposition amount is preferably in the range of 0.05 μg/cm$^2$ to 1.0 μg/cm$^2$. If the deposition amount is in such a range, the formability of the molding packaging material 1 can be increased. In particular, the post-transfer deposition amount is more preferably in the range of 0.1 μg/cm$^2$ to 0.6 μg/cm$^2$. Due to such transfer adhesion, the dynamic friction coefficient of the surface 2a of the substrate layer 2 becomes 0.5 or less. In particular, the dynamic friction coefficient of the surface 2a of the substrate layer 2 is preferably 0.25 or less, and more preferably 0.20 or less, and particularly preferably 0.18 or less. After molding the molding packaging material 1 with deep-drawing forming or the like, the transfer slip agent may be removed, left unattended, or spontaneously disappeared.

On the other hand, in the molding packaging materials 1 of the fourth to sixth embodiments according to the first and second inventions, the thickness of the first lubricative layer 11 is preferably 0.01 μm to 5 μm. Further, the thickness of the second lubricative layer 12 is preferably 0.01 μm to 5 μm. The thickness of the third lubricative layer 13 is preferably 0.01 μm to 5 μm.

In the molding packaging materials 1 according to the fourth to sixth embodiments of the first and second inventions, the formation amount of the first lubricative layer 11 is preferably in the range of 0.05 μg/cm$^2$ to 1.0 μg/cm$^2$. The formation amount of the second lubricative layer 12 is preferably in the range of 0.05 μg/cm$^2$ to 1.0 μg/cm$^2$. When the formation amount falls within the above range, the dynamic friction coefficient of the inner surface of the molding packaging material 1 becomes 0.5 or less. In particular, the dynamic friction coefficient of the inner surface of the molding packaging material 1 is preferably 0.25 or less, more preferably 0.20 or less, and particularly preferably 0.18 or less.

By forming the innermost layer 7 by melt extruding the resin composition forming the innermost layer 7 into a film, the first lubricative layer 11 can be securely formed and the content rate of the fluoropolymer-based lubricant in the first lubricative layer 11 can be increased.

By forming the innermost layer 7 by applying a coating solution containing the resin composition forming the innermost layer 7 and a solvent and drying it, the first lubricative layer 11 can be formed assuredly, and the content rate of the fluoropolymer-based lubricant content in the first lubricative layer 11 can be increased.

In the molding packaging materials 1 of the fourth to sixth embodiments according to the first and second inventions, by setting the heat treatment temperature at the time of aging to 30° C. to 50° C., the second lubricative layer 12 can be assuredly formed and the content rate of the slip agent in the second lubricative layer 12 can be increased. When the heating temperature at aging is 30° C. or more, the second lubricative layer 12 can be formed sufficiently, and when the heating temperature is 50° C. or less, it is possible to sufficiently prevent causing of white powder on the surface of the molding packaging material. In particular, the heating temperature at the time of aging is preferably set to 35° C. to 45° C.

In the molding packaging materials 1 of the fourth to sixth embodiments according to the first and second inventions, the formation amount of the third lubricative layer 13 is preferably in the range of 0.05 μg/cm$^2$ to 1.0 μg/cm$^2$. When the formation amount is within the aforementioned range, the dynamic friction coefficient of the outer surface of the molding packaging material 1 becomes 0.5 or less. In particular, the dynamic friction coefficient of the outer surface of the molding packaging material 1 is preferably 0.2 or less, more preferably 0.20 or less, and particularly preferably 0.18 or less.

In the molding packaging materials 1 of the fourth to sixth embodiments according to the first and second inventions, the third lubricative layer 13 is a layer formed by being transferred from the inner surface of the packaging material by contacting the inner surface and the outer surface of the packaging material in a wrapped state when the packaging material obtained by laminating is stored in a wrapped state. After molding the molding packaging material 1 with a deep-drawing forming or the like, the third lubricative layer 13 may be removed, left unattended, or spontaneously disappeared.

Figure 4:
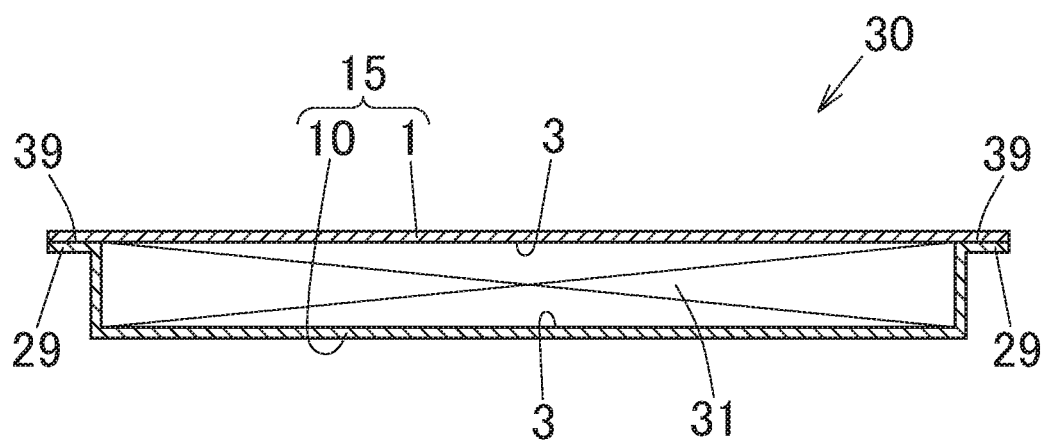
FIG. 4 is a cross-sectional view illustrating an embodiment of a power storage device according to the present invention.
Figure 5:
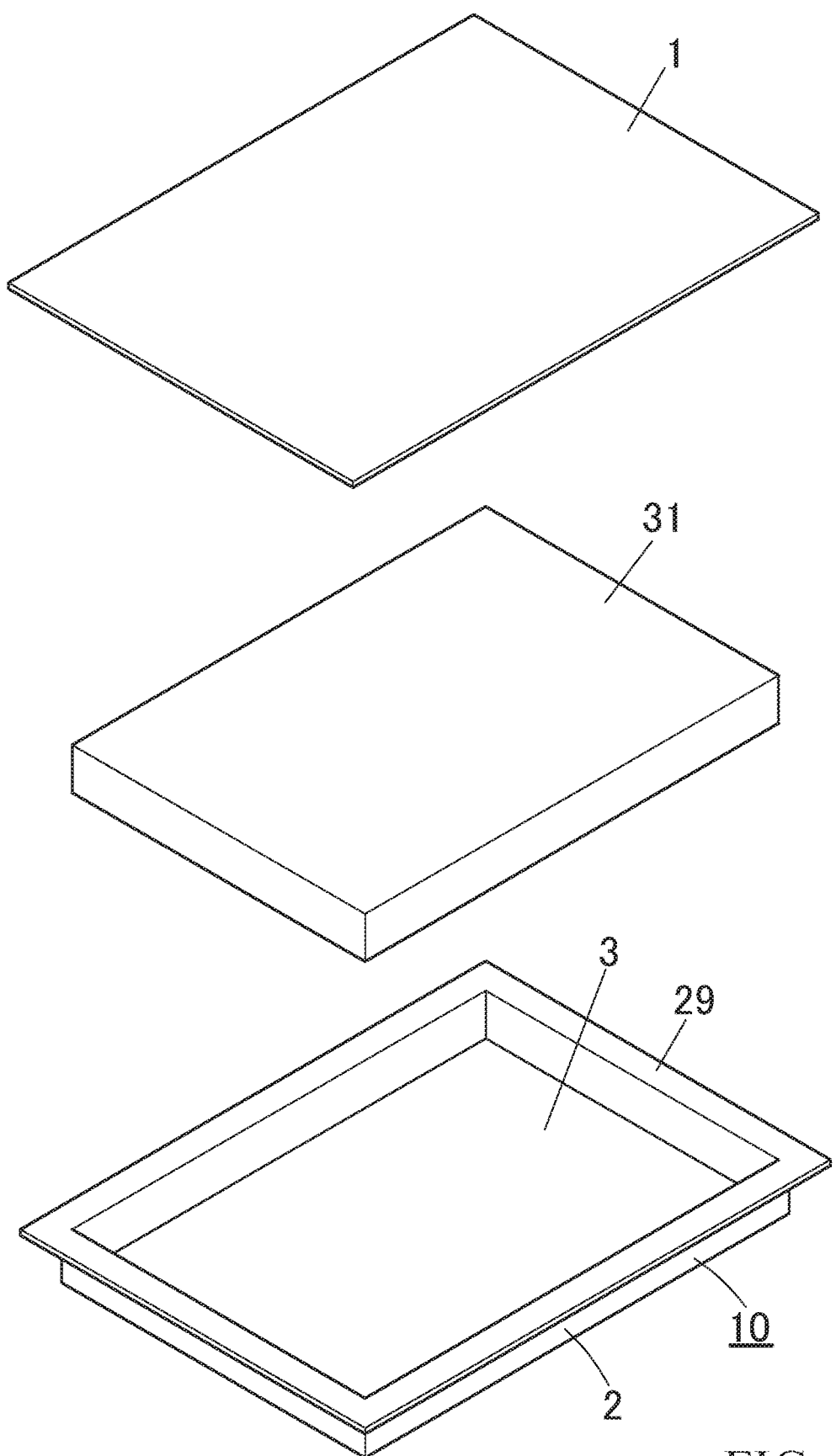
FIG. 5 is a perspective view showing a packaging material (planar material) constituting a power storage device shown in FIG. 4, a power storage device main parts, and a packaging case (molded article molded into a three-dimensional shape) in a separate state prior to heat-sealing.

By molding (deep-drawing forming, stretch forming, etc.) the packaging material 1 of the present invention, a packaging case (battery case, etc.) 10 can be obtained (see FIG. 4 and FIG. 5).

An embodiment of a power storage device 30 configured using the packaging material 1 of the present invention is shown in FIG. 4. The power storage device 30 is a lithium-ion secondary battery. In this embodiment, as illustrated in FIG. 4 and FIG. 5, the external material 15 is configured by a packaging case 10 obtained by molding the packaging material 1 and a planar packaging material 1 not subjected to molding. Thus, the power storage device 30 of the present invention is configured (see FIG. 4 and FIG. 5) by accommodating a generally rectangular shaped power storage device main parts (electrochemical device, etc.) 31 in the accommodation recess of the packaging case 10 obtained by molding the packaging material 1 of the present invention, arranging the planar packaging material 1 on the power storage device main parts 31 with the inner layer 3 side facing inwardly (underside), and heat-sealing the periphery of the inner layer 3 (innermost layer 7) of the planar packaging material 1 and the inner layer 3 (innermost layer 7) of the flange portion (sealing peripheral portion) 29 of the packaging case 10. The inner surface of the accommodation recess of the packaging case 10 is constituted by the inner layer 3 (innermost layer 7), and the outer surface of the accommodation recess is constituted by the substrate layer (outer layer) 2 (see FIG. 5).

In FIG. 4, the reference numeral "39" denotes a heat seal portion in which the peripheral portion of the packaging material 1 and the flange portion (sealing periphery) 29 of the packaging case 10 are bonded (welded). Note that in the power storage device 30, the tip end portion of the tab lead connected to the power storage device main parts 31 is guided to the outside of the external material 15, but not illustrated.

As the power storage device main parts 31, though not specifically limited, examples thereof include a battery body portion, an ultracapacitors main body portion, a capacitor main body portion, and the like.

Preferably, the width of the heat seal portion 39 is set to 0.5 mm or more. When it is set to 0.5 mm or more, the sealing can be securely carried out. In particular, the width of the heat seal portion 39 is preferably set to 3 mm to 15 mm.

Note that in the above-described embodiment, the external material 15 is composed of the packaging case 10 formed by molding the packaging material 1 and the planar packaging material 1 (see FIGS. 4 and 5). However, it is not particularly limited to such a combination. For example, the external material 15 may be composed of a pair of packaging cases 10.

EXAMPLES

Next, specific examples of the present invention will be described. However, it should be noted that the present invention is not particularly limited to these embodiments.
<Material Used>
[Fluoropolymer-Based Lubricant a (Fluorine Resins and not Elastomers)]
Dynamer™ "FX5911" produced by 3M Corporation:
tetrafluoroethylene-hexafluoropropylene-vinylidene fluoride copolymer (the melting point of the copolymer is 118° C., the fluoride content rate in the copolymer is 69 mass %)
[Fluoropolymer-Based Lubricant B (Fluoroelastomer)]
Dynamer™ "FX5920A" produced by 3M Corporation:
a mixture of 35 mass % of hexafluoropropylene-vinylidene fluoride copolymer (fluorine content rate in the copolymer is 66 mass %) and 65 mass % of ethylene glycol
[Fluoropolymer-Based Lubricant C (Fluoroelastomer)]
Dynamer (trademark) "FX9613" produced by 3M Corporation:
a mixture of 90 mass % of a hexafluoropropylene-vinylidene fluoride copolymer (66 mass % of the fluorine content rate in the copolymer) and 10 mass % of inorganic particles (6.5 mass % of talc, 2.5 mass % of amorphous silica, 1 mass % of calcium carbonate).

Example 1

A chemical conversion treatment liquid composed of phosphoric acid, polyacrylic acid (acryl-based resin), chromium (III) salt compound, water, and alcohol was applied to both sides of the aluminum foil 4 having a thickness of 30 µm, and then dried at 180° C. to form a chemical conversion coating. The chromium deposition amount of this chemical conversion coating was 10 mg/m$^2$ per side.

Next, a biaxially stretched 6 nylon film 2 having a thickness of 15 µm was dry laminated (bonded) to one side of the chemical conversion treated aluminum foil 4 via a two-part curing type urethane-based adhesive 5.

Next, a first heat fusible resin unstretched film 7 having a thickness of 3 µm, a second heat fusible resin unstretched film 8 having a thickness of 14 µm, and a third heat fusible resin unstretched film 9 having a thickness of 3 µm were coextruded using a T-die as to be laminated in three layers in this order. The first heat fusible resin unstretched film 7 contained an ethylene-propylene random copolymer, 1,000 ppm of erucic acid amide (slip agent), 5,000 ppm of silica particles (mean particle diameter of 2 µm; anti-blocking agent), and 50 ppm of fluoropolymer-based lubricant A ("FX5911" produced by 3M Corporation). The second heat fusible resin unstretched film 8 contained an ethylene-propylene block copolymer and 1,000 ppm of erucic acid amide. The third heat fusible resin unstretched film 9 contained an ethylene-propylene random copolymer and 1,000 ppm of erucic acid amide. With this, a sealant film (first heat fusible resin unstretched film layer 7/second heat fusible resin unstretched film layer 8/third heat fusible resin unstretched film layer 9) 3 having a thickness of 20 µm in which the three layers are laminated was obtained. Thereafter, the third heat fusible resin unstretched film layer 9 surface of the sealant film 3 was superimposed on the other side of the aluminum foil 4 after the dry lamination via a two-part curing type maleic acid modified polypropylene adhesive 6, and dried laminated by interposing between the rubber nip roll and the laminate roll heated to 100° C. and winding it to the roll shaft. After aging (heated) at 33° C. for 13 days, the power storage device packaging material (molding packaging material) 1 of the configuration shown in FIG. 2 was obtained by pulling out of the roll shaft.

As the above-described two-part curing type maleic acid modified polypropylene adhesive, an adhesive solution made by mixing 100 parts by mass of maleic acid modified polypropylene (melting point: 80° C., acid value: 10 mgKOH/g) as the main agent, 8 parts by mass of isocyanurate (NOC content rate: 20 mass %) of hexamethylene diisocyanate as the curing agent, and a solvent was used. The adhesive solution was applied to the other side of the aluminum foil 4 so that the solid distribution applied amount became 2 g/m², heated to dry, and then superimposed on the third unstretched film layer 9 surface of the sealant film 3.

Example 2

A power storage device packaging material (molding packaging material) 1 having the configuration shown in FIG. 2 was obtained In the same manner as in Example 1 except that the content rate of the fluoropolymer-based lubricant A ("FX5911" produced by 3M Corporation) in the first heat fusible resin unstretched film 7 was changed to 500 ppm.

Comparative Example 1

A power storage device packaging material (molding packaging material) was obtained in the same manner as Example 1 except that a fluoropolymer-based lubricant was not contained in the first heat fusible resin unstretched film 7.

Example 3

A power storage device packaging material (molding packaging material) 1 of the configuration shown in FIG. 2 was obtained in the same manner as in Example 1 except that the thickness of the aluminum foil 4 was changed to 35 μm and a sealant film (the first heat fusible resin unstretched film layer 7 having a thickness of 3 μm/the second heat fusible resin unstretched film layer 8 having a thickness of 24 μm/the third heat fusible resin unstretched film layer 9 having a thickness of 3 μm) having a thickness of 30 μm in which only the thickness was changed was used (without changing the composition) as the sealant film.

Example 4

A power storage device packaging material (molding packaging material) 1 of the configuration shown in FIG. 2 was obtained in the same manner as in Example 2 except that the thickness of the aluminum foil 4 was changed to 35 μm and a sealant film (a first heat fusible resin unstretched film layer 7 having a thickness of 4.5 μm, a second heat fusible resin unstretched film layer 8 having a thickness of 21 μm, a third heat fusible resin unstretched film layer 9 having a thickness of 4.5 μm) having a thickness of 30 μm in which only the thickness was changed to 35 μm was used as a sealant film.

Comparative Example 2

A power storage device packaging material (molding packaging material) was obtained in the same manner as in Example 3 except that a fluoropolymer-based lubricant was not contained in the first heat fusible resin unstretched film 7.

Example 5

A power storage device packaging material (molding packaging material) 1 having the configuration shown in FIG. 2 was obtained in the same manner as in Example 3 except that the content rate of a fluoropolymer-based lubricant A ("FX5911" produced by 3M Corporation) in the first heat fusible resin unstretched film 7 was changed to 1,000 ppm.

Example 6

A power storage device packaging material (molding packaging material) 1 of the configuration shown in FIG. 2 was obtained in the same manner as in Example 3 except that as a fluoropolymer-based lubricant to be contained in the first heat fusible resin unstretched film 7, instead of a 50 ppm of a fluorine resin lubricant ("FX5911" produced by 3M Corporation), 50 ppm of a fluorine resin lubricant ("FX5911" produced by 3M Corporation) and 50 ppm of a fluoroelastomer lubricant ("FX5920A" produced by 3M Corporation) was used.

Example 7

A power storage device packaging material (molding packaging material) 1 of the configuration shown in FIG. 2 was obtained in the same manner as in Example 3 except that as a fluoropolymer-based lubricant to be contained in the first heat fusible resin unstretched film 7, instead of a 50 ppm of a fluorine resin lubricant ("FX5911" produced by 3M Corporation), 250 ppm of a fluorine resin lubricant ("FX5911" produced by 3M Corporation) and 250 ppm of a fluoroelastomer lubricant ("FX5920A" produced by 3M Corporation) was used.

Example 8

A power storage device packaging material (molding packaging material) 1 of the configuration shown in FIG. 2 was obtained in the same manner as in Example 3 except that as a fluoropolymer-based lubricant to be contained in the first heat fusible resin unstretched film 7, instead of a 50 ppm of a fluorine resin lubricant ("FX5911" produced by 3M Corporation), 500 ppm of a fluorine resin lubricant ("FX5911" produced by 3M Corporation) and 500 ppm of a fluoroelastomer lubricant ("FX5920A" produced by 3M Corporation) was used.

Example 9

A power storage device packaging material (molding packaging material) 1 having the configuration shown in FIG. 2 was obtained in the same manner as in Example 1 except that the thickness of the biaxially stretched 6 nylon film 2 was changed to 25 μm, the thickness of the aluminum foil 4 was changed to 40 μm, the fluoropolymer-based lubricant to be contained in the first heat fusible resin unstretched film 7 was changed to a fluoroelastomer lubricant ("FX5920A" produced by 3M Corporation), and a sealant film (a first heat fusible resin unstretched film layer 7 having a thickness of 4 μm/a second heat fusible resin unstretched film layer 8 having a thickness of 32 μm/a third heat fusible resin unstretched film layer 9 having a thickness of 4 μm) having a thickness of 40 μm was used as a sealant film.

Example 10

A power storage device packaging material (molding packaging material) 1 having the configuration shown in FIG. 2 was obtained in the same manner as Example 2 except that the thickness of the biaxially stretched 6 nylon film 2 was changed to 25 μm, the thickness of the aluminum foil 4 was changed to 40 μm, the fluoropolymer-based lubricant to be contained in the first heat fusible resin unstretched film 7 was changed to 500 ppm of a fluoroelastomer lubricant ("FX5920A" produced by 3M Corporation), and a sealant film (a first heat fusible resin unstretched film layer 7 having a thickness of 6 μm/a second heat fusible resin unstretched film layer 8 having a thickness of 28 μm/a third heat fusible resin unstretched film layer 9 having a thickness of 6 μm) having a thickness of 40 μm was used as a sealant film.

Example 11

A power storage device packaging material (molding packaging material) 1 having the configuration shown in FIG. 2 was obtained in the same manner as in Example 1 except that instead of a biaxially stretched 6-nylon film, a polyethylene terephthalate film having a thickness of 12 μm was used, the thickness of the aluminum foil 4 was changed to 35 μm, and a fluoropolymer-based lubricant to be contained in the first heat fusible resin unstretched film 7 was changed to a 50 ppm of a fluoroelastomer lubricant ("FX9613" produced by 3M Corporation), and a sealant film (a first heat fusible resin unstretched film layer 7 having a thickness of 8 μm/a second heat fusible resin unstretched film layer 8 having a thickness of 64 μm/a third heat fusible resin unstretched film layer 8 having a thickness of 8 μm) having a thickness of 80 μm was used as a sealant film.

Example 12

A power storage device packaging material (molding packaging material) 1 having the configuration shown in FIG. 2 was obtained in the same manner as Example 1 except that instead of a biaxially stretched 6-nylon film, a polyethylene terephthalate film having a thickness of 12 μm was used, the thickness of the aluminum foil 4 was changed to 35 μm, the fluoropolymer-based lubricant to be contained in the first heat fusible resin unstretched film 7 was changed to a 500 ppm of a fluoroelastomer lubricant ("FX9613" produced by 3M Corporation), and a sealant film (a first heat fusible resin unstretched film layer 7 having a thickness of 12 μm/a second heat fusible resin unstretched film layer 8 having a thickness of 56 μm/a third heat fusible resin unstretched film layer 8 having a thickness of 12 μm) having a thickness of 80 μm was used as a sealant film.

Comparative Example 3

A power storage device packaging material (molding packaging material) was obtained in the same manner as in Example 11 except that a fluoropolymer-based lubricant was not contained in the first heat fusible resin unstretched film 7.

Example 13

A power storage device exterior material (shaping packaging material) 1 having the configuration shown in FIG. 2 was obtained in the same manner as in Example 1 except that a laminated film (a polyethylene terephthalate film having a thickness of 12 μm/a biaxially stretched 6 nylon film having a thickness of 15 μm) having a thickness of 27 μm was used as the outer layer 2, the thickness of the aluminum foil 4 was changed to 40 μm, the fluoropolymer-based lubricant to be contained in the first heat fusible resin unstretched film 7 was changed to 500 ppm of a fluoroelastomer lubricant ("FX9613" produced by 3M Corporation), and a sealant film (a first heat fusible resin unstretched film layer 7 having a thickness of 8 μm, a second heat fusible resin unstretched film layer 8 having a thickness of 64 μm/a third heat fusible resin unstretched film layer 9 having a thickness of 8 μm) having a thickness of 80 μm was used as a sealant film.

Comparative Example 4

A power storage device packaging material (molding packaging material) was obtained in the same manner as in Example 13 except that a fluoropolymer-based lubricant was not contained in the first heat fusible resin unstretched film 7.

TABLE 1

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Comp. Ex. 1 | 15 | 30 | 20 | Silica particles/5000 | Erucic acid amide/1000 | — |
| Ex. 1 | 15 | 30 | 20 | Silica particles/5000 | Erucic acid amide/1000 | FX5911/50 |
| Ex. 2 | 15 | 30 | 20 | Silica particles/5000 | Erucic acid amide/1000 | FX5911/500 |
| Comp. Ex. 2 | 15 | 35 | 30 | Silica particles/5000 | Erucic acid amide/1000 | — |
| Ex. 3 | 15 | 35 | 30 | Silica particles/5000 | Erucic acid amide/1000 | FX5911/50 |
| Ex. 4 | 15 | 35 | 30 | Silica particles/5000 | Erucic acid amide/1000 | FX5911/500 |
| Ex. 5 | 15 | 35 | 30 | Silica particles/5000 | Erucic acid amide/1000 | FX5911/1000 |
| Ex. 6 | 15 | 35 | 30 | Silica particles/5000 | Erucic acid amide/1000 | FX5911/50 and FX5920A/50 |
| Ex. 7 | 15 | 35 | 30 | Silica particles/5000 | Erucic acid amide/1000 | FX5911/250 and FX5920A/250 |
| Ex. 8 | 15 | 35 | 30 | Silica particles/5000 | Erucic acid amide/1000 | FX5911/500 and FX5920A/500 |
| Ex. 9 | 25 | 40 | 40 | Silica particles/5000 | Erucic acid amide/1000 | FX5920A/50 |
| Ex. 10 | 25 | 40 | 40 | Silica particles/5000 | Erucic acid amide/1000 | FX5920A/500 |

TABLE 1-continued

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Comp. Ex. 3 | 12 | 35 | 80 | Silica particles/5000 | Erucic acid amide/1000 | — |
| Ex. 11 | 12 | 35 | 80 | Silica particles/5000 | Erucic acid amide/1000 | FX9613/50 |
| Ex. 12 | 12 | 35 | 80 | Silica particles/5000 | Erucic acid amide/1000 | FX9613/500 |
| Comp. Ex. 4 | 27 | 40 | 80 | Silica particles/5000 | Erucic acid amide/1000 | — |
| Ex. 13 | 27 | 40 | 80 | Silica particles/5000 | Erucic acid amide/1000 | FX9613/500 |

TABLE 2

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Ex. 14 | 15 | 35 | 30 | Silica particles/5000 | Erucic acid amide/1000 | FX9613/250 and FX5920A/250 |
| Ex. 15 | 15 | 35 | 30 | Aluminum silicate particles/6000 | Erucic acid amide/1000 | FX5911/750 and FX5920A/250 |
| Ex. 16 | 15 | 35 | 30 | Acrylic resin beads/4000 | Erucic acid amide/1000 | FX5911/1000 and FX5920A/500 |
| Ex. 17 | 15 | 35 | 30 | Silica particles/5000 | Stearic acid amide/1000 | FX5911/500 and FX5920A/250 |
| Ex. 18 | 15 | 35 | 30 | Silica particles/5000 | Behenic acid amide/1000 | FX5911/750 and FX5920A/750 |
| Comp. Ex. 5 | 15 | 35 | 30 | Silica particles/5000 | Erucic acid amide/2500 | — |

Example 14

A power storage device packaging material (molding packaging material) 1 of the configuration shown in FIG. 2 was obtained in the same manner as in Example 3 except that as a fluoropolymer-based lubricant to be contained in the first heat fusible resin unstretched film 7, instead of 50 ppm of a fluorine resin lubricant ("FX5911" produced by 3M Corporation), 250 ppm of a fluoroelastomer lubricant ("FX9613" produced by 3M Corporation) and 250 ppm of a fluoroelastomer lubricant ("FX5920A" produced by 3M Corporation) were used.

Example 15

A power storage device packaging material (molding packaging material) 1 having the configuration shown in FIG. 2 was obtained except that as an anti-blocking agent, instead of 5,000 ppm of silica particles, 6,000 ppm of aluminum silicate particles (mean particle diameter: 2 μm) was used, and as a fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 250 ppm of a fluoroelastomer lubricant ("FX5920A" produced by 3M Corporation) were used.

Example 16

A power storage device packaging material (molding packaging material) 1 having the configuration shown in FIG. 2 was obtained in the same manner as in Example 3 except that as an anti-blocking agent, instead of 5,000 ppm of silica particles, 4,000 ppm of an acrylic resin bead (mean particle size: 3 μm) was used, and as a fluoropolymer-based lubricant to be contained in the first heat fusible resin unstretched film 7, instead of 50 ppm of a fluorine resin lubricant ("FX5911" produced by 3M Corporation), 1,000 ppm of a fluorine resin lubricant ("FX5911" produced by 3M Corporation) and 500 ppm of a fluoroelastomer lubricant ("FX5920A" produced by 3M Corporation) were used.

Example 17

A power storage device packaging material (molding packaging material) 1 having the configuration shown in FIG. 2 was obtained in the same manner as in Example 3 except that as a slip agent to be contained in the first heat fusible resin unstretched film 7 and the third heat fusible resin unstretched film 9, instead of 1,000 ppm of erucic acid amide, 1,000 ppm of stearic acid amide was used, as a slip agent to be contained in the second heat fusible resin unstretched film 8, instead of 1,000 ppm of erucic acid amide, 1,000 ppm of stearic acid amide was used, and as a fluoropolymer-based lubricant to be contained in the first heat fusible resin unstretched film 7, instead of 50 ppm of a fluorine resin lubricant ("FX5911" produced by 3M Corporation), 500 ppm of a fluorinated resin lubricant ("FX5911" produced by 3M Corporation) and 250 ppm of a fluoroelastomer lubricant ("FX5920A" produced by 3M Corporation) were used.

Example 18

A power storage device packaging material (molding packaging material) 1 having the configuration shown in FIG. 2 was obtained in the same manner as in Example 3 except that as a slip agent to be contained in the first heat fusible resin unstretched film 7 and the third heat fusible resin unstretched film 9, instead of 1,000 ppm of erucic acid amide, 1,000 ppm of behenic acid amide was used, as a slip agent to be contained in the second heat fusible resin unstretched film 8, instead of 1,000 ppm of erucic acid amide, 1,000 ppm of behenic acid amide was used, as a fluoropolymer-based lubricant to be contained in the first heat fusible resin unstretched film 7, instead of 50 ppm of fluorine resin lubricant ("FX5911" produced by 3M Corporation), 750 ppm of a fluorine resin lubricant ("FX5911" produced by 3M Corporation) and 750 ppm of a fluoroelastomer lubricant ("FX5920A" produced by 3M Corporation) were used.

Comparative Example 5

A power storage device packaging material (molding packaging material) 1 was obtained in the same manner as in Example 3 except that the content rate (concentration) of erucic acid amide to be contained in the first heat fusible resin unstretched film 7 was changed to 2,500 ppm, the content rate (concentration) of erucic acid amide to be contained in the second heat fusible resin unstretched film 8 was changed to 2,500 ppm, and a fluoropolymer-based lubricant was not contained in the first heat fusible resin unstretched film 7.

TABLE 3

| | Obtained power storage device packaging material | | | | | | |
|---|---|---|---|---|---|---|---|
| | Amount of slip agent present on the surface of the innermost layer ($\mu g/cm^2$) | Amount of fluorine resin lubricant present on the surface of the innermost layer ($\mu g/cm^2$) | Coefficient of dynamic friction on innermost layer surface | Amount of slip agent present on the surface of the base material layer ($\mu m/cm^2$) | Coefficient of dynamic friction on the surface of the substrate layer | Evaluation results Formability evaluation Maximum forming depth (mm) | Presence or absence of white powder Evaluation |
| Comp. EX. 1 | 0.18 | | 0.28 | 0.18 | 0.16 | 3.0 | ○ |
| Ex. 1 | 0.19 | 0.01 | 0.20 | 0.19 | 0.16 | 4.0 | ○ |
| Ex. 2 | 0.19 | 0.05 | 0.11 | 0.19 | 0.15 | 4.5 | ○ |
| Comp. EX. 2 | 0.18 | | 0.27 | 0.16 | 0.16 | 3.5 | ○ |
| Ex. 3 | 0.18 | 0.01 | 0.19 | 0.16 | 0.14 | 4.0 | ○ |
| Ex. 4 | 0.21 | 0.05 | 0.12 | 0.14 | 0.14 | 5.0 | ○ |
| Ex. 5 | 0.19 | 0.10 | 0.08 | 0.15 | 0.15 | 5.5 | ○ |
| Ex. 6 | 0.18 | 0.01 | 0.18 | 0.16 | 0.17 | 4.0 | ○ |
| Ex. 7 | 0.19 | 0.03 | 0.13 | 0.14 | 0.16 | 5.5 | ○ |
| Ex. 8 | 0.18 | 0.07 | 0.09 | 0.17 | 0.15 | 6.0 | ○ |
| Ex. 9 | 0.20 | 0.01 | 0.19 | 0.20 | 0.14 | 6.0 | ○ |
| Ex. 10 | 0.22 | 0.05 | 0.11 | 0.18 | 0.16 | 7.0 | ○ |
| Comp. EX. 3 | 0.24 | | 0.25 | 0.19 | 0.17 | 3.5 | ○ |
| Ex. 11 | 0.25 | 0.02 | 0.18 | 0.20 | 0.16 | 4.0 | ○ |
| Ex. 12 | 0.28 | 0.12 | 0.08 | 0.18 | 0.15 | 5.0 | ○ |
| Comp. EX. 4 | 0.25 | | 0.23 | 0.18 | 0.16 | 3.5 | ○ |
| Ex. 13 | 0.24 | 0.12 | 0.09 | 0.18 | 0.14 | 6.0 | ○ |

TABLE 4

| | Obtained power storage device packaging material | | | | | | |
|---|---|---|---|---|---|---|---|
| | Amount of slip agent existing on the surface of the innermost layer ($\mu g/cm^2$) | Amount of fluorine polymer-based lubricant present on the surface of the innermost layer ($\mu g/cm^2$) | Coefficient of dynamic friction on innermost layer surface | Amount of slip agent present on the surface of the substrate material layer surface ($\mu m/cm^2$) | Coefficient of dynamic friction on the surface of the substrate layer | Evaluation results Formability evaluation Maximum forming depth (mm) | Presence or absence of white powder Evaluation |
| EX. 14 | 0.18 | 0.03 | 0.14 | 0.17 | 0.15 | 5.0 | ○ |
| Ex. 15 | 0.19 | 0.08 | 0.11 | 0.16 | 0.16 | 5.0 | ○ |
| Ex. 16 | 0.18 | 0.12 | 0.09 | 0.16 | 0.17 | 5.5 | ○ |
| EX. 17 | 0.19 | 0.06 | 0.12 | 0.15 | 0.16 | 5.0 | ○ |
| Ex. 18 | 0.19 | 0.10 | 0.09 | 0.16 | 0.15 | 5.5 | ○ |
| Comp. 5 | 0.63 | | 0.10 | 0.30 | 0.13 | 5.5 | X |

Example 21

A chemical conversion treatment liquid composed of phosphoric acid, polyacrylic acid (acrylic resin), chromium (III) salt compound, water, and alcohol was applied to both sides of the aluminum foil 4 having a thickness of 30 μm, and then dried at 180° C. to form a chemical conversion coating. The chromic deposition amount of this chemical conversion coating was 10 mg/m² per side.

Next, a biaxially stretched 6 nylon film 2 having a thickness of 15 μm was dry laminated (bonded) to one side of the chemical conversion treatment aluminum foil 4 via a two-part curing type urethane-based adhesive 5.

Next, a first heat fusible resin unstretched film 7 having a thickness of 3 μm, a second heat fusible resin unstretched film 8 having a thickness of 14 μm, and a third heat fusible resin unstretched film 9 having a thickness of 3 μm were coextruded using a T-die so as to be laminated in three layers in this order. The first heat fusible resin unstretched film 7 contained an ethylene-propylene random copolymer, 1,000 ppm of erucic acid amide (slip agent), 5,000 ppm of silica particles (mean particle diameter 2 μm; anti-blocking agent), and 50 ppm of a fluoropolymer-based lubricant A ("FX5911" produced by 3M Corporation). The second heat fusible resin unstretched film 8 contained an ethylene-propylene block copolymer and 2,000 ppm of erucic acid amide. The third heat fusible resin unstretched film 9 contained an ethylene-propylene random copolymer and 1,000 ppm of erucic acid amide. With this, a sealant film (a first heat fusible resin unstretched film layer 7/a second heat fusible resin unstretched film layer 8/a third heat fusible resin unstretched film layer 9) 3 having a thickness of 20 μm in which the three layers are laminated. Thereafter, the third heat fusible resin unstretched film layer 9 surface of the sealant film 3 was superimposed on the other side of the aluminum foil 4 after the dry lamination via a two-part curing type maleic acid modified polypropylene adhesive 6, and dried laminated by interposing between the rubber nip roll and the laminate roll heated to 100° C. and winding it to the roll shaft. After aging (heated) at 40° C. for 10 days in a state in which it was wound on the roll shaft, the power storage device packaging material (molding packaging material) 1 of the configuration shown in FIG. 7 was obtained by pulling out of the roll shaft.

Note that, as the two-part curing type maleic acid modified polypropylene adhesive, an adhesive solution containing 100 parts by mass of maleic acid modified polypropylene (melting point: 80° C., acid value: 10 mgKOH/g) as the main agent, 8 parts by mass of isocyanurate (NOC content rate: 20 mass %) of hexamethylene diisocyanate as a curing agent, and a solvent was mixed was prepared. The adhesive solution was applied to the other side of the aluminum foil 4 so that the solid distribution amount of the adhesive solution became 2 g/m², and the adhesive solution was heated to dry, and the adhesive solution was superimposed on the third unstretched film layer 9 of the sealant film 3.

Example 22

A power storage device packaging material (molding packaging material) 1 having the configuration shown in FIG. 7 was obtained in the same manner as in Example 21 except that the content rate of fluoropolymer-based lubricant A ("FX5911" produced by 3M Corporation) in the first heat fusible resin unstretched film 7 was changed to 500 ppm.

Comparative Example 6

A power storage device packaging material (molding packaging material) was obtained in the same manner as in Example 21 except that a fluoropolymer-based lubricant was not contained in the first heat fusible resin unstretched film 7.

Example 23

A power storage device packaging material (molding packaging material) 1 having the configuration shown in FIG. 7 was obtained in the same manner as in Example 21 except that the thickness of the aluminum foil 4 was changed to 35 μm, and a sealant film (a first heat fusible resin unstretched film layer 7 having a thickness of 3 μm/a second heat fusible resin unstretched film layer 8 having a thickness of 24 μm/a third heat fusible resin unstretched film layer 9 having a thickness of 3 μm) having a thickness of 30 μm in which only the thickness was changed (without changing the composition) was used as a sealant film.

Example 24

A power storage device packaging material (molding packaging material) 1 having the configuration shown in FIG. 7 was obtained in the same manner as in Example 22 except that the thickness of the aluminum foil 4 was changed to 35 μm, and a sealant film (a first heat fusible resin unstretched film layer 7 having a thickness of 4.5 μm/a second heat fusible resin unstretched film layer 8 having a thickness of 21 μm/a third heat fusible resin unstretched film layer 9 having a thickness of 4.5 μm) having a thickness of 30 μm thick in which only the thickness was changed (the composition was not changed) was used as a sealant film.

Comparative Example 7

A power storage device packaging material (molding packaging material) was obtained in the same manner as in Example 23 except that a fluoropolymer-based lubricant was not contained in the first heat fusible resin unstretched film 7.

Example 25

A power storage device packaging material (molding packaging material) 1 having the configuration shown in FIG. 7 was obtained in the same manner as in Example 23 except that the content rate of a fluoropolymer-based lubricant A ("FX5911" produced by 3M Corporation) in the first heat fusible resin unstretched film 7 was changed to 1,000 ppm.

Example 26

A power storage device packaging material (molding packaging material) 1 having the configuration shown in FIG. 7 was obtained in the same manner as in Example 23 except that as the fluoropolymer-based lubricant to be contained in the first heat fusible resin unstretched film 7, instead of 50 ppm of a fluorine resin lubricant ("FX5911" produced by 3M Corporation), 50 ppm of a fluorine resin lubricant ("FX5911" produced by 3M Corporation) and 50 ppm of a fluoroelastomer lubricant ("FX5920A" produced by 3M Corporation) were used.

Example 27

A power storage device packaging material (molding packaging material) 1 having the configuration shown in FIG. 7 was obtained in the same manner as in Example 23 except that as the fluoropolymer-based lubricant to be contained in the first heat fusible resin unstretched film 7, instead of 50 ppm of a fluorine resin lubricant ("FX5911" produced by 3M Corporation), 250 ppm of a fluorine resin lubricant ("FX5911" produced by 3M Corporation) and 250 ppm of a fluoroelastomer lubricant ("FX5920A" produced by 3M Corporation) were used.

Example 28

A power storage device packaging material (molding packaging material) 1 having the configuration shown in FIG. 7 was obtained in the same manner as in Example 23 except that as a fluoropolymer-based lubricant to be contained in the first heat fusible resin unstretched film 7, instead of 50 ppm of a fluorine resin lubricant ("FX5911" produced by 3M Corporation), 500 ppm of a fluorine resin lubricant ("FX5911" produced by 3M Corporation) and 500 ppm of a fluoroelastomer lubricant ("FX5920A" produced by 3M Corporation) were used.

Example 29

A power storage device packaging material (molding packaging material) 1 having the configuration shown in FIG. 7 was obtained in the same manner as in Example 21 except that the thickness of the biaxially stretched 6 nylon film 2 was changed to 25 µm, the thickness of the aluminum foil 4 was changed to 40 µm, the fluoropolymer-based lubricant to be contained in the first heat fusible resin unstretched film 7 was changed to a fluoroelastomer lubricant ("FX5920A" produced by 3M Corporation), and a sealant film (a first heat fusible resin unstretched film layer 7 having a thickness of 4 µm/a second heat fusible resin unstretched film layer 8 having a thickness of 32 µm/a third heat fusible resin unstretched film layer 9 having a thickness of 4 µm) having a thickness of 40 µm was used as a sealant film.

Example 30

A power storage device packaging material (molding packaging material) 1 having the configuration shown in FIG. 7 was obtained in the same manner as in Example 22 except that the thickness of the biaxially stretched 6 nylon film 2 was changed to 25 µm, the thickness of the aluminum foil 4 was changed to 40 µm, the fluoropolymer-based lubricant to be contained in the first heat fusible resin unstretched film 7 was changed to 500 ppm of a fluoroelastomer lubricant ("FX5920A" produced by 3M Corporation), and a sealant film (a first heat fusible resin unstretched film layer 7 having a thickness of 6 µm/a second heat fusible resin unstretched film layer 8 having a thickness of 28 µm/a third heat fusible resin unstretched film layer 9 having a thickness of 6 µm) having a thickness of 40 µm was used as a sealant film.

Example 31

A power storage device packaging material (molding packaging material) 1 having the configuration shown in FIG. 7 was obtained in the same manner as in Example 21 except that instead of a biaxially stretched 6 nylon film, a polyethylene terephtalate film having a thickness of 12 µm thick was used, the thickness of the aluminum foil 4 was changed to 35 µm, the fluoropolymer-based lubricant to be contained in the first heat fusible resin unstretched film 7 was changed to 50 ppm of a fluoroelastomer lubricant ("FX9613" produced by 3M Corporation), a sealant film (a first heat fusible resin unstretched film layer 7 having a thickness of 8 µm/a second heat fusible resin unstretched film layer 8 having a thickness of 64 µm/a third heat fusible resin unstretched film layer 9 having a thickness of 8 µm) having a thickness of 80 µm was used as a sealant film.

Example 32

A power storage device packaging material (molding packaging material) 1 having the configuration shown in FIG. 7 was obtained in the same manner as in Example 21 except that instead of a biaxially stretched 6 nylon film, a polyethylene terephthalate film having a thickness of 12 µm was used, the thickness of the aluminum foil 4 was changed to 35 µm, the fluoropolymer-based lubricant to be contained in the first heat fusible resin unstretched film 7 was changed to 500 ppm of a fluoroelastomer lubricant ("FX9613" produced by 3M Corporation), a sealant film (a first heat fusible resin unstretched film layer 7 having a thickness of 12 µm/a second heat fusible resin unstretched film layer 8 having a thickness of 56 µm/a third heat fusible resin unstretched film layer 9 having a thickness of 12 µm) having a thickness of 80 µm was used as a sealant film.

Comparative Example 8

A power storage device packaging material (molding packaging material) was obtained in the same manner as in Example 31 except that a fluoropolymer-based lubricant was not contained in the first heat fusible resin unstretched film 7.

Example 33

A power storage device packaging material (molding packaging material) 1 having the configuration shown in FIG. 7 was obtained in the same manner as in Example 21 except that a laminated film (a polyethylene terephthalate film having a thickness of 12 µm/a biaxially stretched 6 nylon film having a thickness of 15 µm) w having a thickness of 27 µm was used as an outer layer 2, the thickness of the aluminum foil 4 was changed to 40 µm, the fluoropolymer-based lubricant to be contained in the first heat fusible resin unstretched film 7 was changed to 500 ppm of a fluoroelastomer lubricant ("FX9613" produced by 3M Corporation), a sealant film (a first heat fusible resin unstretched film layer 7 having a thickness of 8 µm/a second heat fusible resin unstretched film layer 8 having a thickness of 64 µm/a third heat fusible resin unstretched film layer 9 having a thickness of 8 µm) having a thickness of 80 µm was used as a sealant film.

Comparative Example 9

The power storage device packaging material (molding packaging material) was obtained in the same manner as in Example 33 except that a fluoropolymer-based lubricant was not contained in the first heat fusible resin unstretched film 7.

TABLE 5

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Comp. Ex. 6 | 15 | 30 | 20 | Silica particles/5000 | Erucic acid amide/1000 | — |
| Ex. 21 | 15 | 30 | 20 | Silica particles/5000 | Erucic acid amide/1000 | FX5911/50 |
| Ex. 22 | 15 | 30 | 20 | Silica particles/5000 | Erucic acid amide/1000 | FX5911/500 |
| Comp. Ex. 7 | 15 | 35 | 30 | Silica particles/5000 | Erucic acid amide/1000 | — |
| Ex. 23 | 15 | 35 | 30 | Silica particles/5000 | Erucic acid amide/1000 | FX5911/50 |
| Ex. 24 | 15 | 35 | 30 | Silica particles/5000 | Erucic acid amide/1000 | FX5911/500 |
| Ex. 25 | 15 | 35 | 30 | Silica particles/5000 | Erucic acid amide/1000 | FX5911/1000 |
| Ex. 26 | 15 | 35 | 30 | Silica particles/5000 | Erucic acid amide/1000 | FX5911/50 and FX5920A/50 |
| Ex. 27 | 15 | 35 | 30 | Silica particles/5000 | Erucic acid amide/1000 | FX5911/250 and FX5920A/250 |
| Ex. 28 | 15 | 35 | 30 | Silica particles/5000 | Erucic acid amide/1000 | FX5911/500 and FX5920A/500 |
| Ex. 29 | 25 | 40 | 40 | Silica particles/5000 | Erucic acid amide/1000 | FX5920A/50 |
| Ex. 30 | 25 | 40 | 40 | Silica particles/5000 | Erucic acid amide/1000 | FX5920A/500 |
| Comp. Ex. 8 | 12 | 35 | 80 | Silica particles/5000 | Erucic acid amide/1000 | — |
| Ex. 31 | 12 | 35 | 80 | Silica particles/5000 | Erucic acid amide/1000 | FX9613/50 |
| Ex. 32 | 12 | 35 | 80 | Silica particles/5000 | Erucic acid amide/1000 | FX9613/500 |
| Comp. Ex. 9 | 27 | 40 | 80 | Silica particles/5000 | Erucic acid amide/1000 | — |
| Ex. 33同感 | 27 | 40 | 80 | Silica particles/5000 | Erucic acid amide/1000 | FX9613/500 |

TABLE 6

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Ex. 34 | 15 | 35 | 30 | Silica particles/5000 | Erucic acid amide/1000 | FX9613/250 and FX5920A/250 |
| Ex. 35 | 15 | 35 | 30 | Aluminum silicate particles/6000 | Erucic acid amide/1000 | FX5911/750 and FX5920A/250 |
| Ex. 36 | 15 | 35 | 30 | Acrylic resin beads/4000 | Erucic acid amide/1000 | FX5911/1000 and FX5920A/500 |
| Ex. 37 | 15 | 35 | 30 | Silica particles/5000 | Stearic acid amide/1000 | FX5911/500 and FX5920A/250 |
| Ex. 38 | 15 | 35 | 30 | Silica particles/5000 | Behenic acid amide/1000 | FX5911/750 and FX5920A/750 |
| Comp. Ex. 10 | 15 | 35 | 30 | Silica particles/5000 | Erucic acid amide/2500 | — |

Example 34

A power storage device packaging material (molding packaging material) 1 having the configuration shown in FIG. 7 was obtained in the same manner as in Example 23 except that as a fluoropolymer-based lubricant to be contained in the first heat fusible resin unstretched film 7, instead of 50 ppm of a fluorine resin lubricant ("FX5911" produced by 3M Corporation), 250 ppm of a fluoroelastomer lubricant ("FX9613" produced by 3M Corporation) and 250 ppm of a fluoroelastomer lubricant ("FX5920A" produced by 3M Corporation) were used.

Example 35

A power storage device packaging material (molding packaging material) 1 having the configuration shown in FIG. 7 was obtained in the same manner as in Example 23 except that as an anti-blocking agent, instead of 5,000 ppm of silica particles, 6,000 ppm of aluminum silicate particles (mean particle size: 2 μm) was used, as a fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 250 ppm of a fluoroelastomer lubricant ("FX5920A" produced by 3M Corporation) were used.

Example 36

A power storage device packaging material (molding packaging material) 1 having the configuration shown in FIG. 7 was obtained in the same manner as in Example 23 except that as an anti-blocking agent, instead of 5,000 ppm of silica particles, 4,000 ppm of acrylic beads (mean particle size: 3 μm) was used, as the fluoropolymer-based lubricant to be contained in the first heat fusible resin unstretched film 7, instead of 50 ppm of a fluorine resin lubricant ("FX5911" produced by 3M Corporation), 1,000 ppm of a fluorine resin lubricant ("FX5911" produced by 3M Corporation) and 500 ppm of a fluoroelastomer lubricant ("FX5920A" produced by 3M Corporation) were used.

Example 37

A power storage device packaging material (molding packaging material) 1 having the configuration shown in FIG. 7 was obtained in the same manner as in Example 23 except that as a slip agent to be contained in the first heat fusible resin unstretched film 7 and the third heat fusible resin unstretched film 9, instead of 1,000 ppm of erucic acid amide, 1,000 ppm of stearic acid amide was used, as a slip agent to be contained in the second heat fusible resin unstretched film 8, instead of 2,000 ppm of erucic acid amide, 2,000 ppm of stearic acid amide was used, as a fluoropolymer-based lubricant to be contained in the first heat fusible resin unstretched film 7, instead of 50 ppm of a fluorine resin lubricant ("FX5911" produced by 3M Corporation), 500 ppm of a fluorine resin lubricant ("FX5911" produced by 3M Corporation) and 250 ppm of a fluoroelastomer lubricant ("FX5920A" produced by 3M Corporation) were used.

Example 38

A power storage device packaging material (molding packaging material) 1 having the configuration shown in FIG. 7 was obtained in the same manner as in Example 23 except that as a slip agent to be contained in the first heat fusible resin unstretched film 7 and the third heat fusible resin unstretched film 9, instead of 1,000 ppm of erucic acid amide, 1,000 ppm of behenic acid amide was used, as a slip agent to be contained in the second heat fusible resin unstretched film 8, instead of 2,000 ppm of erucic acid amide, 2,000 ppm of behenic acid amide was used, as a fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 750 ppm of a fluoroelastomer lubricant ("FX5920A" produced by 3M Corporation) were used.

Comparative Example 10

A power storage device packaging material (molding packaging material) 1 in the same manner as in Example 23 except that the content rate (concentration) of erucic acid amide to be contained in the first heat fusible resin unstretched film 7 was changed to 2,500 ppm, the content rate (concentration) of erucic acid amide to be contained in the second heat fusible resin unstretched film 8 was changed to 2,500 ppm, the fluoropolymer-based lubricant was not contained in the first heat fusible resin unstretched film 7.

TABLE 7

| | Obtained power storage device packaging material | | | | | | |
|---|---|---|---|---|---|---|---|
| | Formation amount of second lubricative layer (formation amount of slip agent layer) (μg/cm²) | Formation amount of first lubricative layer (fluoropolymer-based lubricative layer) (μg/cm²) | Coefficient of dynamic friction of inner surface of packaging material | Formation amount of third lubricative layer (formation amount of slip agent layer) (μg/cm²) | Coefficient of dynamic friction on the outer surface of the packaging material | Evaluation results | |
| | | | | | | Formability evaluation Maximum forming depth (mm) | Evaluation of presence or absence of white powder |
| Comp. EX. 6 | 0.23 | | 0.23 | 0.20 | 0.15 | 3.0 | ○ |
| Ex. 21 | 0.24 | 0.01 | 0.18 | 0.21 | 0.15 | 4.0 | ○ |
| Ex. 22 | 0.24 | 0.05 | 0.10 | 0.21 | 0.14 | 4.5 | ○ |
| Comp. EX. 7 | 0.23 | | 0.22 | 0.18 | 0.15 | 3.5 | ○ |
| Ex. 23 | 0.23 | 0.01 | 0.17 | 0.18 | 0.13 | 4.0 | ○ |
| Ex. 24 | 0.26 | 0.05 | 0.10 | 0.16 | 0.14 | 5.0 | ○ |
| Ex. 25 | 0.24 | 0.10 | 0.08 | 0.18 | 0.14 | 5.5 | ○ |
| Ex. 26 | 0.23 | 0.01 | 0.16 | 0.18 | 0.16 | 4.0 | ○ |
| Ex. 27 | 0.24 | 0.03 | 0.11 | 0.16 | 0.15 | 5.5 | ○ |
| Ex. 28 | 0.23 | 0.07 | 0.08 | 0.19 | 0.14 | 6.0 | ○ |
| Ex. 29 | 0.25 | 0.01 | 0.18 | 0.22 | 0.13 | 6.0 | ○ |
| Ex. 30 | 0.27 | 0.05 | 0.10 | 0.20 | 0.15 | 7.0 | ○ |
| Comp. EX. 8 | 0.29 | | 0.23 | 0.21 | 0.16 | 3.5 | ○ |
| Ex. 31 | 0.30 | 0.02 | 0.17 | 0.22 | 0.15 | 4.0 | ○ |
| Ex. 32 | 0.33 | 0.12 | 0.07 | 0.20 | 0.14 | 5.0 | ○ |
| Comp. EX. 9 | 0.3 | | 0.21 | 0.20 | 0.15 | 3.5 | ○ |
| Ex. 33 | 0.29 | 0.12 | 0.07 | 0.20 | 0.13 | 6.0 | ○ |

TABLE 8

| | Formation amount of second lubricative layer (formation amount of slip agent layer) (μg/cm²) | Formation amount of first lubricative layer (fluoropolymer-based lubricative layer) (μg/cm²) | Coefficient of dynamic friction of innermost surface | Formation amount of third lubricative layer (formation amount of slip agent layer) (μg/cm²) | Coefficient of dynamic friction on the outer surface of the packaging material | Evaluation results | |
|---|---|---|---|---|---|---|---|
| | | | | | | Formability evaluation Maximum forming depth (mm) | Evaluation of presence or absence of white powder |
| EX. 34 | 0.23 | 0.03 | 0.12 | 0.19 | 0.14 | 5.0 | ○ |
| Ex. 35 | 0.24 | 0.08 | 0.09 | 0.18 | 0.15 | 5.0 | ○ |
| Ex. 36 | 0.23 | 0.12 | 0.07 | 0.18 | 0.16 | 5.5 | ○ |
| EX. 37 | 0.24 | 0.06 | 0.10 | 0.17 | 0.15 | 5.0 | ○ |
| Ex. 38 | 0.24 | 0.10 | 0.07 | 0.18 | 0.14 | 5.5 | ○ |
| Comp. Ex. 10 | 0.66 | | 0.10 | 0.33 | 0.12 | 5.5 | X |

Example 41

A chemical conversion treatment liquid composed of phosphoric acid, polyacrylic acid (acrylic resin), chromium (III) salt compound, water, and alcohol was applied to both sides of the aluminum foil 4 having a thickness of 30 μm, and then dried at 180° C. to form a chemical coating film. The chromic deposition amount of this chemical coating film was 10 mg/m² per side.

Next, a biaxially stretched 6-nylon film (outer layer) 2 having a thickness of 15 μm was dry laminated (bonded) to one side of the chemical conversion treatment aluminum foil 4 via a two-part curing type urethane-based adhesive 5.

Next, a first heat fusible resin unstretched film 7 having a thickness of 3 μm, a second heat fusible resin unstretched film 8 having a thickness of 14 μm, and a third heat fusible resin unstretched film 9 having a thickness of 3 μm were coextruded using a T-die so as to be laminated in three layers in this order. The first heat fusible resin unstretched film 7 contained an ethylene-propylene random copolymer, 1,000 ppm of erucic acid amide (slip agent), 5.0 mass % of high density polyethylene resin powder A (mean particle diameter: 650 μm; roughening material), 50 ppm of a fluoropolymer-based lubricant A ("FX5911" produced by 3M Corporation), and 2,500 ppm of silica particles (mean particle diameter of 2 μm, anti-blocking agent). The second heat fusible resin unstretched film 8 contained an ethylene-propylene block copolymer and 1,000 ppm of erucic acid amide. The third heat fusible resin unstretched film 9 contained an ethylene-propylene random copolymer and 1,000 ppm of erucic acid amide. With this, a sealant film (a first heat fusible resin unstretched film layer 7/a second heat fusible resin unstretched film layer 8/a third heat fusible resin unstretched film layer 9) having a thickness of 20 μm in which the three layers are laminated was obtained. Thereafter, the third heat fusible resin unstretched film layer 9 surface of the sealant film 3 was superimposed on the other side of the aluminum foil 4 after the dry lamination via a two-part curing type maleic acid modified polypropylene adhesive 6, and dried laminated by interposing between the rubber nip roll and the laminate roll heated to 100° C. and wound it to the roll shaft. After aging (heated) at 33° C. for 13 days, the power storage device packaging material (molding packaging material) 1 of the configuration shown in FIG. 2 was obtained by pulling out of the roll shaft.

Note that as the two-part curing type maleic acid modified polypropylene adhesive, 100 parts by mass of maleic acid modified polypropylene (melting point: 80° C., acid value: 10 mgKOH/g) as the main agent, 8 parts by mass of isocyanurate (NOC content rate: 20 mass %) of hexamethylene diisocyanate as a curing agent, and an adhesive solution mixed with a solvent were used. The adhesive solution was applied to the other side of the aluminum foil 4 so that the solid content amount of the adhesive solution became 2 g/m², and the adhesive solution was heated to dry, and the adhesive solution was superimposed on the third unstretched film layer 9 of the sealant film 3.

The high density polyethylene resin A (roughening material) had an MFR of 0.2 g/10 min. at 190° C., density of 0.963 g/cm³, swell of 40%, and the high density polyethylene resin A was prepared by a slurry-loop method using a Phillips catalyst.

Example 42

A power storage device packaging material (molding packaging material) 1 having the configuration shown in FIG. 2 was obtained in the same manner as in Example 41 except that the content rate of a fluoropolymer-based lubricant A ("FX5911" produced by 3M Corporation) in the first heat fusible resin unstretched film 7 was changed to 500 ppm.

Comparative Example 11

The power storage device packaging material (molding packaging material) was obtained in the same manner as in Example 1 except that a fluoropolymer-based lubricant was not contained in the first heat fusible resin unstretched film 7.

Example 43

A power storage device packaging material (molding packaging material) 1 having the configuration shown in FIG. 2 was obtained in the same manner as in Example 41 except that the thickness of the aluminum foil 4 was changed to 35 μm, and a sealant film having a thickness of 30 μm (a first heat fusible resin unstretched film layer 7 having a thickness of 3 μm/a second heat fusible resin unstretched film layer 8 having a thickness of 24 μm/a third heat fusible resin unstretched film layer 9 having a thickness of 3 μm) in which only the thickness was changed (without changing the composition) was used.

Example 44

A power storage device packaging material (molding packaging material) 1 having the configuration shown in FIG. 2 was obtained in the same manner as in Example 42 except that the thickness of the aluminum foil 4 was changed to 35 μm, and a sealant film having a thickness of 30 μm (a first heat fusible resin unstretched film layer 7 having a thickness of 4.5 μm/a second heat fusible resin unstretched film layer 8 having a thickness of 21 μm/a third heat fusible resin unstretched film layer 9 having a thickness of 4.5 μm) in which only the thickness was changed was used as a sealant film.

Comparative Example 12

A power storage device packaging material (molding packaging material) 1 was obtained in the same manner as in Example 43 except that a fluoropolymer-based lubricant was not contained in the first heat fusible resin unstretched film 7.

Example 45

A power storage device packaging material (molding packaging material) 1 having the configuration shown in FIG. 2 was obtained in the same manner as in Example 43 except that the content rate of a fluoropolymer-based lubricant A ("FX5911" produced by 3M Corporation) in the first heat fusible resin unstretched film 7 was changed to 1,000 ppm.

Example 46

A power storage device packaging material (molding packaging material) 1 having the configuration shown in FIG. 2 was obtained in the same manner as in Example 43 except that as a fluoropolymer-based lubricant to be contained in the first heat fusible resin unstretched film 7, instead of 50 ppm of a fluorine resin lubricant ("FX5911" produced by 3M Corporation), 50 ppm of a fluorine resin lubricant ("FX5911" produced by 3M Corporation) and 50 ppm of a fluoroelastomer lubricant ("FX5920A" produced by 3M Corporation) were used.

Example 47

A power storage device packaging material (molding packaging material) 1 having the configuration shown in FIG. 2 was obtained in the same manner as in Example 43 except that as a fluoropolymer-based lubricant to be contained in the first heat fusible resin unstretched film 7, instead of 50 ppm of a fluorine resin lubricant ("FX5911" produced by 3M Corporation), 250 ppm of a fluorine resin lubricant ("FX5911" produced by 3M Corporation) and 250 ppm of a fluoroelastomer lubricant ("FX5920A" produced by 3M Corporation) were used.

Example 48

A power storage device packaging material (molding packaging material) 1 having the configuration shown in FIG. 2 was obtained in the same manner as in Example 43 except that as a fluoropolymer-based lubricant to be contained in the first heat fusible resin unstretched film 7, instead of 50 ppm of a fluorine resin lubricant ("FX5911" produced by 3M Corporation), 500 ppm of a fluorine resin lubricant ("FX5911" produced by 3M Corporation) and 500 ppm of a fluoroelastomer lubricant ("FX5920A" produced by 3M Corporation) were used.

Example 49

A power storage device packaging material (molding packaging material) 1 having the configuration shown in FIG. 2 was obtained in the same manner as in Example 41 except that the thickness of a biaxially stretched 6 nylon film 2 was changed to 25 μm, the thickness of the aluminum foil 4 was changed to 40 μm, a fluoropolymer-based lubricant tio be contained in the first heat fusible resin unstretched film 7 was changed to a fluoroelastomer lubricant ("FX5920A" produced by 3M Corporation), and a sealant film having a thickness of 40 μm (a first heat fusible resin unstretched film layer 7 having a thickness of 4 μm/a second heat fusible resin unstretched film layer 8 having a thickness of 32 μm/a third heat fusible resin unstretched film layer 9 having a thickness of 4 μm) was used as a sealant film.

Example 50

A power storage device packaging material (molding packaging material) 1 having the configuration shown in FIG. 2 was obtained in the same manner as in Example 42 except that the thickness of the biaxially stretched 6 nylon film 2 was changed to 25 μm, the thickness of the aluminum foil 4 was changed to 40 μm, the fluoropolymer-based lubricant to be contained in the first heat fusible resin unstretched film 7 was changed to 500 ppm of a fluoroelastomer lubricant ("FX5920A" produced by 3M Corporation), a sealant film 40 having a thickness of 40 μm (a first heat fusible resin unstretched film layer 7 having a thickness of 6 μm/a second heat fusible resin unstretched film layer 8 having a thickness of 28 μm/a third heat fusible resin unstretched film layer 9 having a thickness of 6 μm) was used as a sealant film.

Example 51

A power storage device packaging material (molding packaging material) 1 having the configuration shown in FIG. 2 was obtained in the same manner as in Example 41 except that instead of a biaxially stretched 6 nylon film, a polyethylene terephthalate film having a thickness of 12 μm was used, the thickness of the aluminum foil 4 was changed to 35 μm, a fluoropolymer-based lubricant to be contained in the first heat fusible resin unstretched film 7 was changed to 50 ppm of a fluoroelastomer lubricant ("FX9613" produced by 3M Corporation), a sealant film having a thickness of 80 μm (a first heat fusible resin unstretched film layer 7 having a thickness of 8 μm/a second heat fusible resin unstretched film layer 8 having a thickness of 64 μm/a third heat fusible resin unstretched film layer 9 having a thickness of 8 μm) was used as a sealant film.

Example 52

A power storage device packaging material (molding packaging material) 1 having the configuration shown in FIG. 2 was obtained in the same manner as in Example 41 except that instead of a biaxially stretched 6 nylon film, a polyethylene terephthalate film having a thickness of 12 μm was used, the thickness of the aluminum foil 4 was changed to 35 μm, a fluoropolymer-based lubricant to be contained in the first heat fusible resin unstretched film 7 was changed to 500 ppm of a fluoroelastomer lubricant ("FX9613" produced by 3M Corporation), and a sealant film having a thickness of 80 μm (a first heat fusible resin unstretched film layer 7 having a thickness of 12 μm/a second heat fusible resin unstretched film layer 8 having a thickness of 56 μm/a thick third heat fusible resin unstretched film layer 9 having a thickness of 12 μm) was used as a sealant film.

Comparative Example 13

A power storage device packaging material (molding packaging material) 1 was obtained in the same manner as in Example 51 except that a fluoropolymer-based lubricant was not contained in the first heat fusible resin unstretched film 7.

Example 53

A power storage device packaging material (molding packaging material) 1 having the configuration shown in FIG. 2 was obtained in the same manner as in Example 41 except that a laminated film having a thickness of 27 μm (a polyethylene terephthalate film having a thickness of 12 μm/a biaxially stretched 6 nylon film having a thickness of 15 μm) was used as the outer layer 2, the thickness of the aluminum foil 4 was changed to 40 μm, a fluoropolymer-based lubricant to be contained in the first heat fusible resin unstretched film 7 was changed to 500 ppm of a fluoroelastomer lubricant ("FX9613" produced by 3M Corporation), and a sealant film having a thickness of 80 μm (a first heat fusible resin unstretched film layer 7 having a thickness of 8 μm/a second heat fusible resin unstretched film layer 8 having a thickness of 64 μm/a third heat fusible resin unstretched film layer 9 having a thickness of 8 μm) was used as a sealant film.

Comparative Example 14

A power storage device packaging material (molding packaging material) 1 was obtained in the same manner as in Example 53 except that a fluoropolymer-based lubricant was not contained in the first heat fusible resin unstretched film 7.

Example 54

A power storage device packaging material (molding packaging material) 1 having the configuration shown in FIG. 2 was obtained in the same manner as in Example 43 except that as a fluoropolymer-based lubricant to be contained in the first heat fusible resin unstretched film 7, instead of a 50 ppm fluorine resin lubricant ("FX5911" produced by 3M Corporation), 250 ppm of a fluoroelastomer lubricant ("FX9613" produced by 3M Corporation) and 250 ppm of a fluoroelastomer lubricant ("FX5920A" produced by 3M Corporation) were used.

Example 55

A power storage device packaging material (molding packaging material) 1 having the configuration shown in FIG. 2 was obtained in the same manner as in Example 43 except that as a roughening material, instead of 5.0 mass % of the high density polyethylene resin powder A (mean particle size: 650 μm), 10.0 mass % of a high density polyethylene resin powder B (mean particle size: 1.1 mm) was used, as the fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 250 ppm of a fluoroelastomer lubricant ("FX5920A" produced by 3M Corporation) were used.

The above high density polyethylene resin B (roughening material) had an MFR of 0.2 g/10 min. at 190° C., density of 0.945 g/cm$^3$, swell of 35%, and the high density polyethylene resin B was produced by a slurry-loop method using a Phillips catalyst.

Example 56

A power storage device packaging material (molding packaging material) 1 having the configuration shown in FIG. 2 was obtained in the same manner as in Example 43 except that as a roughening material, instead of 5.0 mass % of the high density polyethylene resin powder A (mean particle size: 650 μm), 15.0 mass % of low density polyethylene resin powder C (mean particle size: 1.0 mm) was used, as a fluoropolymer-based lubricant to be contained in the first heat fusible resin unstretched film 7, instead of 50 ppm of fluorine resin lubricant ("FX5911" produced by 3M Corporation), 1,000 ppm of a fluorine resin lubricant ("FX5911" produced by 3M Corporation) and 500 ppm of a fluoroelastomer lubricant ("FX5920A" produced by 3M Corporation) were used.

The low density polyethylene resin C (roughening material) described above had a MFR of 2 g/10 min. and density of 0.921 g/cm$^3$ at 190° C. and swell of 20%, the low density polyethylene resin C was a linear low density polyethylene resin produced with a gas phase fluidized bed using a Ziegler catalyst.

Example 57

A power storage device packaging material (molding packaging material) 1 having the configuration shown in FIG. 2 was obtained in the same manner as in Example 43 except that as a slip agent to be contained in the first heat fusible resin unstretched film 7 and the third heat fusible resin unstretched film 9, instead of 1,000 ppm of erucic acid amide, 1,000 ppm of stearic acid amide was used, as a slip agent to be contained in the second heat fusible resin unstretched film 8, instead of 1,000 ppm of erucic acid amide, 1,000 ppm of stearic acid amide was used, and as a fluoropolymer-based lubricant to be contained in the first heat fusible resin unstretched film 7, instead of 50 ppm of a fluorine resin lubricant ("FX5911" produced by 3M Corporation), 500 ppm of a fluorine resin lubricant ("FX5911" produced by 3M Corporation) and 250 ppm of a fluoroelastomer lubricant ("FX5920A" produced by 3M Corporation) were used.

Example 58

A power storage device packaging material (molding packaging material) 1 having the configuration shown in FIG. 2 was obtained in the same manner as in Example 43 except that as a slip agent to be contained in the first heat fusible resin unstretched film 7 and the third heat fusible resin unstretched film 9, instead of 1,000 ppm of erucic acid amide, 1,000 ppm of behenic acid amide was used, as a slip agent to be contained in the second heat fusible resin unstretched film 8, instead of 1,000 ppm of erucic acid amide, 1,000 ppm of behenic acid amide was used, and as a fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 750 ppm of a fluoroelastomer lubricant ("FX5920A" produced by 3M Corporation) were used.

Example 59

A power storage device packaging material (molding packaging material) 1 having the configuration shown in FIG. 2 was obtained in the same manner as in Example 57 except that as a slip agent contained in the first heat fusible resin unstretched film 7 and the third heat fusible resin unstretched film 9, 500 ppm of ethylene bis-stearic acid amide was used with 1,000 ppm of erucic acid amide, as a slip agent to be contained in the second heat fusible resin unstretched film 8, instead of 1,000 ppm of erucic acid amide, 1,000 ppm of erucic acid amide and 500 ppm of ethylene bis-stearic acid amide were used.

Example 60

A power storage device packaging material (molding packaging material) 1 having the configuration shown in FIG. 2 was obtained in the same manner as in Example 41 except that a laminated film having a thickness of 27 μm (a polyethylene terephthalate film arranged at the outermost side and having a thickness of 12 μm/a biaxially stretched 6 nylon film having a thickness of 12 μm) was used as the outer layer 2, the thickness of the aluminum foil 4 was changed to 40 μm, the fluoropolymer-based lubricant to be contained in the first heat fusible resin unstretched film 7 was changed to 500 ppm of a fluoroelastomer lubricant ("FX9613" produced by 3M Corporation), the first heat fusible resin unstretched film 7 was configured to not contain silica particles (anti-blocking agent), as a sealant film (heat fusible resin layer 3), a sealing film having a thickness of 80 μm (a first heat fusible resin unstretched film layer 7 having a thickness of 8 μm/a second heat fusible resin unstretched film layer 8 having a thickness of 64 μm/a third heat fusible resin unstretched film layer 9 having a thickness of 8 μm) was used.

Comparative Example 15

A power storage device packaging material (molding packaging material) 1 was obtained in the same manner as in Example 43 except that the content rate (concentration) of erucic acid amide to be contained in the first heat fusible resin unstretched film 7 was changed to 2,500 ppm, the content rate (concentration) of erucic acid amide to be contained in the second heat fusible resin unstretched film 8 was changed to 2,500 ppm, a fluoropolymer-based lubricant was not contained in the first heat fusible resin unstretched film 7.

TABLE 9

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Comp. Ex. 11 | 15 | 30 | 20 | High density PE powder A/5.0 | Erucic acid amide/1000 | — |
| Ex. 41 | 15 | 30 | 20 | High density PE powder A/5.0 | Erucic acid amide/1000 | FX5911/50 |
| Ex. 42 | 15 | 30 | 20 | High density PE powder A/5.0 | Erucic acid amide/1000 | FX5911/500 |
| Comp. Ex. 12 | 15 | 35 | 30 | High density PE powder A/5.0 | Erucic acid amide/1000 | — |
| Ex. 43 | 15 | 35 | 30 | High density PE powder A/5.0 | Erucic acid amide/1000 | FX5911/50 |
| Ex. 44 | 15 | 35 | 30 | High density PE powder A/5.0 | Erucic acid amide/1000 | FX5911/500 |
| Ex. 45 | 15 | 35 | 30 | High density PE powder A/5.0 | Erucic acid amide/1000 | FX5911/1000 |
| Ex. 46 | 15 | 35 | 30 | High density PE powder A/5.0 | Erucic acid amide/1000 | FX5911/50 and FX5920A/50 |
| Ex. 47 | 15 | 35 | 30 | High density PE powder A/5.0 | Erucic acid amide/1000 | FX5911/250 and FX5920A/250 |
| Ex. 48 | 15 | 35 | 30 | High density PE powder A/5.0 | Erucic acid amide/1000 | FX5911/500 and FX5920A/500 |
| Ex. 49 | 25 | 40 | 40 | High density PE powder A/5.0 | Erucic acid amide/1000 | FX5920A/50 |
| Ex. 50 | 25 | 40 | 40 | High density PE powder A/5.0 | Erucic acid amide/1000 | FX5920A/500 |
| Comp. Ex. 13 | 12 | 35 | 80 | High density PE powder A/5.0 | Erucic acid amide/1000 | — |
| Ex. 51 | 12 | 35 | 80 | High density PE powder A/5.0 | Erucic acid amide/1000 | FX9613/50 |
| Ex. 52 | 12 | 35 | 80 | High density PE powder A/5.0 | Erucic acid amide/1000 | FX9613/500 |
| Comp. Ex. 14 | 27 | 40 | 80 | High density PE powder A/5.0 | Erucic acid amide/1000 | — |
| Ex. 53 | 27 | 40 | 80 | High density PE powder A/5.0 | Erucic acid amide/1000 | FX9613/500 |

TABLE 10

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Ex. 54 | 15 | 35 | 30 | High density PE powder A/5.0 | Erucic acid amide/1000 | FX9613/250 and FX5920A/250 |
| Ex. 55 | 15 | 35 | 30 | High density PE powder B/10.0 | Erucic acid amide/1000 | FX5911/750 and FX5920A/250 |
| Ex. 56 | 15 | 35 | 30 | High density PE powder C/15.0 | Erucic acid amide/1000 | FX5911/1000 and FX5920A/500 |

TABLE 10-continued

|  | Configuration of power storage device packaging material | | | Content of each additive agent in the innermost layer of the inner layer | | |
|---|---|---|---|---|---|---|
|  | Thickness of outer layer (μm) | Thickness of metal foil layer (μm) | Thickness of inner layer (μm) | Anti-blocking agent Type/Content (ppm) | Slip agent Type/Content (ppm) | Fluoropolymer-based lubricant Type/Content (ppm) |
| Ex. 57 | 15 | 35 | 30 | High density PE powder A/5.0 | Stearic acid amide/1000 | FX5911/500 and FX5920A/250 |
| Ex. 58 | 15 | 35 | 30 | High density PE powder A/5.0 | Behenic acid amide/1000 | FX5911/750 and FX5920A/750 |
| Ex. 59 | 15 | 35 | 30 | High density PE powder A/5.0 | Erucic acid amide/1000 EBSA/500 | FX5911/500 and FX5920A/250 |
| Ex. 60 | 27 | 40 | 80 | High density PE powder A/5.0 | Erucic acid amide/1000 | FX9613/500 |
| Comp. Ex. 15 | 15 | 35 | 30 | High density PE powder A/5.0 | Erucic acid amide/1000 | — |

EBSA: Ethylene bis-stearic acid amide

TABLE 11

| | Obtained power storage device packaging material | | | | | | |
|---|---|---|---|---|---|---|---|
| | Amount of slip agent present on the surface of the innermost layer (μg/cm$^2$) | Amount of fluoropolymer-based lubricative agent present on the surface of the innermost layer (μg/cm$^2$) | Coefficient of dynamic friction on innermost surface | Amount of slip agent present on the surface of the substrate material layer (μm/cm$^2$) | Coefficient of dynamic friction of the surface of the substrate layer | Evaluation results | |
| | | | | | | Formability evaluation Maximum forming depth (mm) | Evaluation of presence or absence of white powder |
| Comp. EX. 11 | 0.18 | | 0.25 | 0.14 | 0.16 | 3.0 | ○ |
| Ex. 41 | 0.19 | 0.01 | 0.17 | 0.15 | 0.16 | 4.5 | ○ |
| Ex. 42 | 0.19 | 0.05 | 0.08 | 0.15 | 0.15 | 5.0 | ○ |
| Comp. EX. 12 | 0.18 | | 0.24 | 0.12 | 0.16 | 3.5 | ○ |
| Ex. 43 | 0.18 | 0.01 | 0.16 | 0.12 | 0.14 | 4.5 | ○ |
| Ex. 44 | 0.21 | 0.05 | 0.09 | 0.10 | 0.14 | 6.0 | ○ |
| Ex. 45 | 0.19 | 0.10 | 0.06 | 0.11 | 0.15 | 6.5 | ○ |
| Ex. 46 | 0.18 | 0.01 | 0.15 | 0.11 | 0.17 | 4.5 | ○ |
| Ex. 47 | 0.19 | 0.03 | 0.10 | 0.10 | 0.16 | 6.0 | ○ |
| Ex. 48 | 0.18 | 0.07 | 0.06 | 0.13 | 0.15 | 6.5 | ○ |
| Ex. 49 | 0.20 | 0.01 | 0.16 | 0.16 | 0.14 | 7.0 | ○ |
| Ex. 50 | 0.22 | 0.05 | 0.08 | 0.14 | 0.16 | 8.0 | ○ |
| Comp. EX. 13 | 0.24 | | 0.23 | 0.15 | 0.17 | 3.5 | ○ |
| Ex. 51 | 0.25 | 0.02 | 0.15 | 0.16 | 0.16 | 4.5 | ○ |
| Ex. 52 | 0.28 | 0.12 | 0.06 | 0.14 | 0.15 | 5.5 | ○ |
| Comp. EX. 14 | 0.25 | | 0.06 | 0.14 | 0.16 | 4.0 | ○ |
| Ex. 53 | 0.24 | 0.12 | 0.05 | 0.14 | 0.14 | 6.5 | ○ |

TABLE 12

| | Obtained power storage device packaging material | | | | | | |
|---|---|---|---|---|---|---|---|
| | Amount of slip agent present on the surface of the innermost layer (μg/cm$^2$) | Amount of fluoropolymer-based resin lubricative agent present on the surface of the innermost layer (μg/cm$^2$) | Coefficient of dynamic friction on innermost surface | Amount of slip agent present on the surface of the substrate material layer (μm/cm$^2$) | Coefficient of dynamic friction on the surface of the substrate layer | Evaluation results | |
| | | | | | | Formability evaluation Maximum forming depth (mm) | Evaluation of presence or absence of white powder |
| EX. 54 | 0.18 | 0.03 | 0.14 | 0.17 | 0.15 | 6.0 | ○ |
| Ex. 55 | 0.19 | 0.08 | 0.11 | 0.16 | 0.16 | 6.0 | ○ |
| Ex. 56 | 0.18 | 0.12 | 0.09 | 0.16 | 0.17 | 6.5 | ○ |
| EX. 57 | 0.19 | 0.06 | 0.12 | 0.15 | 0.16 | 6.0 | ○ |
| Ex. 58 | 0.19 | 0.10 | 0.09 | 0.16 | 0.15 | 6.5 | ○ |

TABLE 12-continued

Obtained power storage device packaging material

|  | Amount of slip agent present on the surface of the innermost layer (μg/cm²) | Amount of fluoropolymer-based resin lubricative agent present on the surface of the innermost layer (μg/cm²) | Coefficient of dynamic friction on innermost surface | Amount of slip agent present on the surface of the substrate material layer (μm/cm²) | Coefficient of dynamic friction on the surface of the substrate layer | Evaluation results | |
|---|---|---|---|---|---|---|---|
|  |  |  |  |  |  | Formability evaluation Maximum forming depth (mm) | Evaluation of presence or absence of white powder |
| Ex. 59 | 0.36 | 0.06 | 0.09 | 0.11 | 0.16 | 6.0 | ◯ |
| Ex. 60 | 0.24 | 0.12 | 0.06 | 0.13 | 0.15 | 6.0 | ◯ |
| Comp. Ex. 15 | 0.63 |  | 0.09 | 0.24 | 0.13 | 6.5 | X |

Example 61

A chemical conversion treatment liquid composed of phosphoric acid, polyacrylic acid (acrylic resin), chromium (III) salt compound, water, and alcohol was applied to both sides of the aluminum foil 4 having a thickness of 30 μm, and then dried at 180° C. to form a chemical coating film. The chromic deposition amount of this chemical coating film was 10 mg/m² per side.

Next, a biaxially stretched 6 nylon film 2 having a thickness of 15 μm was dry laminated (bonded) to one side of the chemical conversion treated aluminum foil 4 via a two-part curing type urethane-based adhesive 5.

Next, a first heat fusible resin unstretched film 7 having a thickness of 3 μm, a second heat fusible resin unstretched film 8 having a thickness of 14 μm, and a third heat fusible resin unstretched film 9 having a thickness of 3 μm were coextruded using a T-die so as to be laminated in three layers in this order. The first heat fusible resin unstretched film 7 contained an ethylene-propylene random copolymer, 1,000 ppm of erucic acid amide (slip agent), 5.0 mass % of high density polyethylene resin powder A (mean particle diameter: 650 μm; roughening material), 50 ppm of a fluoropolymer-based lubricant A ("FX5911" produced by 3M Corporation), and 2,500 ppm of silica particles (mean particle diameter: 2 μm, anti-blocking agent). The second heat fusible resin unstretched film 8 contained an ethylene-propylene block copolymer and 2,000 ppm of erucic acid amide. The third heat fusible resin unstretched film 9 contained an ethylene-propylene random copolymer and 1,000 ppm of erucic acid amide. With this, a sealant film (a first heat fusible resin unstretched film layer 7/a second heat fusible resin unstretched film layer 8/a third heat fusible resin unstretched film layer 9) having a thickness of 20 μm in which the three layers are laminated was obtained. Thereafter, the third heat fusible resin unstretched film layer 9 surface of the sealant film 3 was superimposed on the other side of the aluminum foil 4 after the dry lamination via a tow-part curing type maleic acid modified polypropylene adhesive 6, and dried laminated by interposing between the rubber nip roll and the laminate roll heated to 100° C. and wound it to the roll shaft. After aging (heated) at 40° C. for 10 days, the power storage device packaging material (molding packaging material) 1 of the configuration shown in FIG. 7 was obtained by pulling out of the roll shaft.

Note that as the two-part curing type maleic acid modified polypropylene adhesive, 100 parts by mass of maleic acid modified polypropylene (melting point: 80° C., acid value: 10 mgKOH/g) as the main agent, 8 parts by mass of isocyanurate (NOC content rate: 20 mass %) of hexamethylene diisocyanate as a curing agent, and an adhesive solution made by mixing a solvent were used. The adhesive solution was applied to the other side of the aluminum foil 4 so that the solid distribution amount of the adhesive solution became 2 g/m², and the adhesive solution was heated to dry, and the adhesive solution was superimposed on the third unstretched film layer 9 of the sealant film 3.

The high density polyethylene resin A (roughening material) had an MFR of 0.2 g/10 min. at 190° C., a density of 0.963 g/cm³, swell of 40%, and a high density polyethylene resin A was prepared by a slurry-loop method using a Phillips catalyst.

Example 62

The power storage device packaging material (molding packaging material) 1 of the configuration shown in FIG. 7 was obtained in the same manner as Example 61 except that the content rate of fluoropolymer-based lubricant A ("FX5911" produced by 3M Corporation) in the first heat fusible resin unstretched film 7 was changed to 500 ppm.

Comparative Example 16

A power storage device packaging material (molding packaging material) 1 was obtained in the same manner as in Example 61 except that a fluoropolymer-based lubricant was not contained in the first heat fusible resin unstretched film 7.

Example 63

A power storage device packaging material (molding packaging material) 1 having the configuration shown in FIG. 7 was obtained in the same manner as in Example 61 except that the thickness of the aluminum foil 4 was changed to 35 μm, a sealant film (a first heat fusible resin unstretched film layer 7 having a thickness of 3 μm/a second heat fusible resin unstretched film layer 8 having a thickness of 24 μm/a third heat fusible resin unstretched film layer 9 having a thickness of 3 μm) having a thickness of 30 μm in which only the thickness as a sealant film was changed (without changing the composition) was used.

Example 64

A power storage device packaging material (molding packaging material) 1 having the configuration shown in FIG. 7 was obtained in the same manner as Example 62 except that the thickness of the aluminum foil 4 was changed to 35 μm and a sealant film having a thickness of 30 μm (a first heat fusible resin unstretched film layer 7 having a thickness of 4.5 μm/a second heat fusible resin unstretched film layer 8 having a thickness of 21 μm/a third heat fusible resin unstretched film layer 9 having a thickness of 4.5 μm) in which only the thickness as a sealant film was changed (without changing the composition) was used.

Comparative Example 17

A power storage device packaging material (molding packaging material) 1 was obtained in the same manner as in Example 63 except that a fluoropolymer-based lubricant was not contained in the first heat fusible resin unstretched film 7.

Example 65

A power storage device packaging material (molding packaging material) 1 having the configuration shown in FIG. 7 was obtained in the same manner as in Example 63 except that the content rate of a fluoropolymer-based lubricant A ("FX5911" produced by 3M Corporation) in the first heat fusible resin unstretched film 7 was changed to 1,000 ppm.

Example 66

A power storage device packaging material (molding packaging material) 1 having the configuration shown in FIG. 7 was obtained in the same manner as in Example 63 except that as the fluoropolymer-based lubricant to be contained in the first heat fusible resin unstretched film 7, instead of 50 ppm of fluorine resin lubricant ("FX5911" produced by 3M Corporation), 50 ppm of a fluorine resin lubricant ("FX5911" produced by 3M Corporation) and 50 ppm of a fluoroelastomer lubricant ("FX5920A" produced by 3M Corporation) were used.

Example 67

A power storage device packaging material (molding packaging material) 1 having the configuration shown in FIG. 7 was obtained in the same manner as in Example 63 except that as the fluoropolymer-based lubricant to be contained in the first heat fusible resin unstretched film 7, instead of 50 ppm of a fluorine resin lubricant ("FX5911" produced by 3M Corporation), 250 ppm of a fluorine resin lubricant ("FX5911" produced by 3M Corporation) and 250 ppm of a fluoroelastomer lubricant ("FX5920A" produced by 3M Corporation) were used.

Example 68

A power storage device packaging material (molding packaging material) 1 having the configuration shown in FIG. 7 was obtained in the same manner as in Example 63 except that as a fluoropolymer-based lubricant to be contained in the first heat fusible resin unstretched film 7, instead of 50 ppm of a fluorine resin lubricant ("FX5911" produced by 3M Corporation), and 500 ppm of a fluorine resin lubricant ("FX5911" produced by 3M Corporation) and 500 ppm of a fluoroelastomer lubricant ("FX5920A" produced by 3M Corporation) were used.

Example 69

A power storage device packaging material (molding packaging material) 1 having the configuration shown in FIG. 7 was obtained in the same manner as in Example 61 except that the thickness of the biaxially stretched 6 nylon film 2 was changed to 25 μm, the thickness of aluminum foil 4 was changed to 40 μm, the fluorine resin lubricant to be contained in the first heat fusible resin unstretched film 7 was changed to a fluoroelastomer lubricant ("FX5920A" produced by 3M Corporation), and a sealant film having a thickness of 40 μm (a first heat fusible resin unstretched film layer 7 having a thickness of 4 μm/a second heat fusible resin unstretched film layer 8 having a thickness of 32 μm/a third heat fusible resin unstretched film layer 9 having a thickness of 4 μm) was used as a sealant film.

Example 70

A power storage device packaging material (molding packaging material) 1 having the configuration shown in FIG. 7 was obtained in the same manner as in Example 62 except that the thickness of the biaxially stretched 6 nylon film 2 was changed to 25 μm, the thickness of the aluminum foil 4 was changed to 40 μm, the fluorine resin lubricant to be contained in the first heat fusible resin unstretched film 7 was changed to 500 ppm of a fluoroelastomer lubricant ("FX5920A" produced by 3M Corporation), and a sealant film having a thickness of 40 μm (a first heat fusible resin unstretched film layer 7 having a thickness of 6 μm/a second heat fusible resin unstretched film layer 8 having a thickness of 28 μm/a third heat fusible resin unstretched film layer 9 having a thickness of 6 μm) was used as a sealant film.

Example 71

A power storage device packaging material (molding packaging material) 1 having the configuration shown in FIG. 7 was obtained in the same manner as Example 61 except that instead of the biaxially stretched 6 nylon film, a polyethylene terephthalate film having a thickness of 12 μm was used, the thickness of aluminum foil 4 was changed to 35 μm, the fluorine resin lubricant to be contained in the first heat fusible resin unstretched film 7 was changed to 50 ppm of a fluoroelastomer lubricant ("FX9613" produced by 3M Corporation), a sealant film having a thickness of 80 μm (a first heat fusible resin unstretched film layer 7 having a thickness of 8 μm/a second heat fusible resin unstretched film layer 8 having a thickness of 64 μm/a third heat fusible resin unstretched film layer 9 having a thickness of 8 μm) was used as a sealant film.

Example 72

A power storage device packaging material (molding packaging material) 1 having the configuration shown in FIG. 7 was obtained in the same manner as Example 61 except that instead of the biaxially stretched 6 nylon film, a polyethylene terephthalate film having a thickness of 12 μm was used, the thickness of the aluminum foil 4 was changed to 35 μm, the fluorine resin lubricant to be contained in the first heat fusible resin unstretched film 7 was changed to 500 ppm of a fluoroelastomer lubricant ("FX9613" produced by 3M Corporation), and a sealant film having a thickness of 80 μm (a first heat fusible resin unstretched film layer 7 having a thickness of 12 μm/a second heat fusible resin unstretched film layer 8 having a thickness of 56 μm/a third heat fusible resin unstretched film layer 9 having a thickness of 12 μm) was used as a sealant film.

Comparative Example 18

A power storage device packaging material (molding packaging material) was obtained in the same manner as in Example 71 except that a fluorine resin lubricant was not contained in the first heat fusible resin unstretched film 7.

Example 73

A power storage device packaging material (molding packaging material) 1 having the configuration shown in FIG. 7 was obtained in the same manner as in Example 61 except that a laminated film having a thickness of 27 μm (a polyethylene terephthalate film having a thickness of 12 μm/a biaxially stretched 6 nylon film having a thickness of 15 μm) was used as the outer layer 2, the thickness of the aluminum foil 4 was changed to 40 μm, the fluorine resin lubricant to be contained in the first heat fusible resin unstretched film 7 was changed to 500 ppm of a fluoroelastomer lubricant ("FX9613" produced by 3M Corporation), and a sealant film having a thickness of 80 μm (a first heat fusible resin unstretched film layer 7 having a thickness of 8 μm/a second heat fusible resin unstretched film layer 8 having a thickness of 64 μm/a third heat fusible resin unstretched film layer 9 having a thickness of 8 μm) was used as a sealant film.

Comparative Example 19

A power storage device packaging material (molding packaging material) was obtained in the same manner as in Example 73 except that a fluorine resin lubricant was not contained in the first heat fusible resin unstretched film 7.

Example 74

A power storage device packaging material (molding packaging material) 1 having the configuration shown in FIG. 7 was obtained in the same manner as Example 63 except that as a fluoropolymer-based lubricant to be contained in the first heat fusible resin unstretched film 7, instead of 50 ppm of a fluorine resin lubricant ("FX5911" produced by 3M Corporation), 250 ppm of a fluoroelastomer lubricant ("FX9613" produced by 3M Corporation) and 250 ppm of a fluoroelastomer lubricant ("FX5920A" produced by 3M Corporation) were used.

Example 75

A power storage device packaging material (molding packaging material) 1 having the configuration shown in FIG. 7 was obtained in the same manner as Example 63 except that as a roughening material, instead of 5.0 wt % of dense polyethylene resin powder A (mean particle size: 650 μm), 10.0 wt % of dense polyethylene resin powder B (mean particle size: 1.1 mm) was used, as a fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 250 ppm of a fluoroelastomer lubricant ("FX5920A" produced by 3M Corporation) were used.

The high density polyethylene resin B (roughening material) had an MFR of 0.2 g/10 min. at 190° C., density of 0.945 g/cm$^3$, and swell of 35%, and the high density polyethylene resin B was produced by a slurry loop method using a Phillips catalyst.

Example 76

A power storage device packaging material (molding packaging material) 1 having the configuration shown in FIG. 7 was obtained in the same manner as Example 63 except that as an roughening material, instead of 5.0 wt % high density polyethylene resin powder A (mean particle size: 650 μm), 15.0 wt % low density polyethylene resin powder C (mean particle size: 1.0 mm) was used, and as a fluoropolymer-based lubricant to be contained in the first heat fusible resin unstretched film 7, instead of 50 ppm of a fluorine resin lubricant ("FX5911" produced by 3M Corporation), 1,000 ppm of a fluorine resin lubricant ("FX5911" produced by 3M Corporation) and 500 ppm of a fluoroelastomer lubricant ("FX5920A" produced by 3M Corporation) were used.

The low density polyethylene resin C (roughening material) was 2 g/10 min. of a MFR at 190° C., 0.921 g/cm$^3$ of density, and 20% of swell. The low density polyethylene resin C is a linear low density polyethylene resin produced with a gas phase fluidized bed using a Ziegler catalyst.

Example 77

A power storage device packaging material (molding packaging material) 1 having the configuration shown in FIG. 7 was obtained in the same manner as Example 63 except that as a slipping agent to be contained in the first heat fusible resin unstretched film 7 and the third heat fusible resin unstretched film 9, instead of 1,000 ppm of erucic acid amide, 1,000 ppm of stearic acid amide was used, as a slip agent to be contained in the second heat fusible resin unstretched film 8, instead of 2,000 ppm of erucic acid amide, 2,000 ppm of stearic acid amide was used, and as a fluoropolymer-based lubricant to be contained in the first heat fusible resin unstretched film 7, instead of a 50 ppm of a fluorine resin lubricant ("FX5911" produced by 3M Corporation), 500 ppm of a fluorine resin lubricant ("FX5911" produced by 3M Corporation) and 250 ppm of a fluoroelastomer lubricant ("FX5920A" produced by 3M Corporation) were used.

Example 78

A power storage device packaging material (molding packaging material) 1 having the configuration shown in FIG. 7 was obtained in the same manner as Example 63 except that as a slipping agent to be contained in the first heat fusible resin unstretched film 7 and the third heat fusible resin unstretched film 9, instead of 1,000 ppm of erucic acid amide, 1,000 ppm of behenic acid amide was used, as a slip agent to be contained in the second heat fusible resin unstretched film 8, instead of 2,000 ppm of erucic acid amide, 2,000 ppm of behenic acid amide was used, and as a fluoropolymer-based lubricant to be contained in the first heat fusible resin unstretched film 7, instead of 50 ppm of a fluorine resin lubricant ("FX5911" produced by 3M Corporation), 750 ppm of a fluorine resin lubricant ("FX5911" produced by 3M Corporation) and 750 ppm of a fluoroelastomer lubricant ("FX5920A" produced by 3M Corporation) were used.

Example 79

A power storage device packaging material (molding packaging material) 1 having the configuration shown in FIG. 7 was obtained in the same manner as in Example 77 except that as a slipping agent to be contained in the first heat fusible resin unstretched film 7 and the third heat fusible resin unstretched film 9, 500 ppm of ethylene bis-stearic acid amide was used with 1,000 ppm of erucic acid amide, and as a slip agent to be contained in the second heat fusible resin unstretched film 8, instead of 1,000 ppm of erucic acid amide, 2,000 ppm of erucic acid amide and 500 ppm of ethylene bis-stearic acid amide were used.

Example 80

A power storage device packaging material (molding packaging material) 1 having the configuration shown in FIG. 7 was obtained in the same manner as in Example 61 except that as the outer layer 2, a laminated film having a thickness of 27 μm (a polyethylene terephthalate film having a thickness of 12 μm/a biaxially stretched 6 nylon film having a thickness of 15 μm) was used, the thickness of the aluminum foil 4 was changed to 40 μm, the fluorine resin lubricant to be contained in the first heat fusible resin unstretched film 7 was changed to 500 ppm of a fluoroelastomer lubricant ("FX9613" produced by 3M Corporation), and contain silica particles (anti-blocking agents) was not contained in the first heat fusible resin unstretched film 7, and a sealant film having a thickness of 80 μm (a first heat fusible resin unstretched film layer 7 having a thickness of 8 μm/a second heat fusible resin unstretched film layer 8 having a thickness of 64 μm/a third heat fusible resin unstretched film layer 9 having a thickness of 8 μm) was used a sealant film (heat fusible resin layer 3).

Comparative Example 20

A power storage device packaging material (molding packaging material) was obtained in the same manner as in Example 63 except that the content rate (concentration) of erucic acid amide to be contained in the first heat fusible resin unstretched film 7 was changed to 2,500 ppm, the content rate (concentration) of erucic acid amide to be contained in the second heat fusible resin unstretched film 8 was changed to 2,500 ppm, and a fluorine resin lubricant was not contained in the first heat fusible resin unstretched film 7.

TABLE 13

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Rougheing agent Type/Content (mass %) | Slip agent Type/Content (ppm) | Fluoropolymer-based lubricative agent Type/Content (ppm) |
| Comp. Ex. 16 | 15 | 30 | 20 | High density PE powder A/5.0 | Erucic acid amide/1000 | — |
| Ex. 61 | 15 | 30 | 20 | High density PE powder A/5.0 | Erucic acid amide/1000 | FX5911/50 |
| Ex. 62 | 15 | 30 | 20 | High density PE powder A/5.0 | Erucic acid amide/1000 | FX5911/500 |
| Comp. Ex. 72 | 15 | 35 | 30 | High density PE powder A/5.0 | Erucic acid amide/1000 | — |
| Ex. 63 | 15 | 35 | 30 | High density PE powder A/5.0 | Erucic acid amide/1000 | FX5911/50 |
| Ex. 64 | 15 | 35 | 30 | High density PE powder A/5.0 | Erucic acid amide/1000 | FX5911/500 |
| Ex. 65 | 15 | 35 | 30 | High density PE powder A/5.0 | Erucic acid amide/1000 | FX5911/1000 |
| Ex. 66 | 15 | 35 | 30 | High density PE powder A/5.0 | Erucic acid amide/1000 | FX5911/50 and FX5920A/50 |
| Ex. 67 | 15 | 35 | 30 | High density PE powder A/5.0 | Erucic acid amide/1000 | FX5911/250 and FX5920A/250 |
| Ex. 68 | 15 | 35 | 30 | High density PE powder A/5.0 | Erucic acid amide/1000 | FX5911/500 and FX5920A/500 |
| Ex. 69 | 25 | 40 | 40 | High density PE powder A/5.0 | Erucic acid amide/1000 | FX5920A/50 |
| Ex. 70 | 25 | 40 | 40 | High density PE powder A/5.0 | Erucic acid amide/1000 | FX5920A/500 |
| Comp. Ex. 18 | 12 | 35 | 80 | High density PE powder A/5.0 | Erucic acid amide/1000 | — |
| Ex. 71 | 12 | 35 | 80 | High density PE powder A/5.0 | Erucic acid amide/1000 | FX9613/50 |
| Ex. 72 | 12 | 35 | 80 | High density PE powder A/5.0 | Erucic acid amide/1000 | FX9613/500 |
| Comp. Ex. 19 | 27 | 40 | 80 | High density PE powder A/5.0 | Erucic acid amide/1000 | — |
| Ex. 73 | 27 | 40 | 80 | High density PE powder A/5.0 | Erucic acid amide/1000 | FX9613/500 |

TABLE 14

| | Configuration of power storage device packaging material | | | Content of each additive agent in the innermost layer of the inner layer | | |
|---|---|---|---|---|---|---|
| | Thickness of outer layer (μm) | Thickness of metal foil layer (μm) | Thickness of inner layer (μm) | Rougheing agent Type/Content (mass %) | Slip agent Type/Content (ppm) | Fluoropolymer-based lubricative agent Type/Content (ppm) |
| Ex. 74 | 15 | 35 | 30 | High density PE powder A/5.0 | Erucic acid amide/1000 | FX9613/250 and FX5920A/250 |
| Ex. 75 | 15 | 35 | 30 | High density PE powder B/10.0 | Erucic acid amide/1000 | FX5911/750 and FX5920A/250 |
| Ex. 76 | 15 | 35 | 30 | Low density PE powder C/15.0 | Erucic acid amide/1000 | FX5911/1000 and FX5920A/500 |
| Ex. 77 | 15 | 35 | 30 | High density PE powder A/5.0 | Stearic acid amide/1000 | FX5911/500 and FX5920A/250 |
| Ex. 78 | 15 | 35 | 30 | High density PE powder A/5.0 | Behenic acid amide/1000 | FX5911/750 and FX5920A/750 |
| Ex. 79 | 15 | 35 | 30 | High density PE powder A/5.0 | Erucic acid amide/1000 EBSA/500 | FX5911/500 and FX5920A/250 |
| Ex. 80 | 27 | 40 | 80 | High density PE powder A/5.0 | Erucic acid amide/1000 | FX9613/500 |
| Comp. Ex. 20 | 15 | 35 | 30 | High density PE powder A/5.0 | Erucic acid amide/2500 | — |

EBSA: Ethylene bis-stearic acid amide

TABLE 15

Obtained power storage device packaging material

| | Formation amount of second lubricative layer (formation amount of slip agent layer) (μg/cm²) | Formation amount of first lubricative layer (fluoropolymer-based lubricative layer) (μg/cm²) | Coefficient of dynamic friction of inner surface of packaging material | Formation amount of third lubricative layer (formation amount of slip agent layer) (μg/cm²) | Coefficient of dynamic friction on the outer surface of the packaging material | Evaluation results Formability evaluation Maximum forming depth (mm) | Evaluation of presence or absence of white powder |
|---|---|---|---|---|---|---|---|
| Comp. EX. 16 | 0.23 | | 0.17 | 0.05 | 0.15 | 3.0 | ○ |
| Ex. 61 | 0.24 | 0.01 | 0.12 | 0.06 | 0.15 | 4.5 | ○ |
| Ex. 62 | 0.24 | 0.05 | 0.05 | 0.06 | 0.14 | 5.0 | ○ |
| Comp. EX. 17 | 0.23 | | 0.16 | 0.03 | 0.15 | 3.5 | ○ |
| Ex. 63 | 0.23 | 0.01 | 0.11 | 0.03 | 0.13 | 4.5 | ○ |
| Ex. 64 | 0.26 | 0.05 | 0.05 | 0.01 | 0.14 | 6.0 | ○ |
| Ex. 65 | 0.24 | 0.10 | 0.05 | 0.03 | 0.14 | 6.5 | ○ |
| Ex. 66 | 0.23 | 0.01 | 0.10 | 0.03 | 0.16 | 4.5 | ○ |
| Ex. 67 | 0.24 | 0.03 | 0.05 | 0.01 | 0.15 | 6.0 | ○ |
| Ex. 68 | 0.23 | 0.07 | 0.05 | 0.04 | 0.14 | 6.5 | ○ |
| Ex. 69 | 0.25 | 0.01 | 0.12 | 0.07 | 0.13 | 7.0 | ○ |
| Ex. 70 | 0.27 | 0.05 | 0.05 | 0.05 | 0.15 | 8.5 | ○ |
| Comp. EX. 18 | 0.29 | | 0.17 | 0.06 | 0.16 | 3.5 | ○ |
| Ex. 71 | 0.30 | 0.02 | 0.11 | 0.07 | 0.15 | 4.5 | ○ |
| Ex. 72 | 0.33 | 0.12 | 0.05 | 0.05 | 0.14 | 5.5 | ○ |
| Comp. EX. 19 | 0.3 | | 0.15 | 0.05 | 0.15 | 4.0 | ○ |
| Ex. 73 | 0.29 | 0.12 | 0.05 | 0.05 | 0.13 | 7.0 | ○ |

TABLE 16

Obtained power storage device packaging material

| | Formation amount of second lubricative layer (formation amount of slip agent layer) (μg/cm²) | Formation amount of first lubricative layer (fluoropolymer-based lubricative layer) (μg/cm²) | Coefficient of dynamic friction of inner surface of packaging material | Formation amount of third lubricative layer (formation amount of slip agent layer) (μg/cm²) | Coefficient of dynamic friction on the outer surface of the packaging material | Evaluation results Formability evaluation Maximum forming depth (mm) | Evaluation of presence or absence of white powder |
|---|---|---|---|---|---|---|---|
| EX. 74 | 0.23 | 0.03 | 0.06 | 0.04 | 0.14 | 6.0 | ○ |
| Ex. 75 | 0.24 | 0.08 | 0.05 | 0.03 | 0.15 | 6.0 | ○ |
| Ex. 76 | 0.23 | 0.12 | 0.05 | 0.03 | 0.16 | 6.5 | ○ |
| EX. 77 | 0.24 | 0.06 | 0.05 | 0.02 | 0.15 | 6.0 | ○ |
| Ex. 78 | 0.24 | 0.10 | 0.05 | 0.03 | 0.14 | 6.5 | ○ |
| Ex. 79 | 0.40 | 0.06 | 0.05 | 0.01 | 0.16 | 6.0 | ○ |
| Ex. 80 | 0.29 | 0.12 | 0.07 | 0.05 | 0.14 | 6.5 | ○ |
| Comp. Ex. 20 | 0.66 | | 0.05 | 0.18 | 0.12 | 6.5 | X |

Each power storage device packaging material (molding packaging material) obtained as described above was evaluated based on the following evaluation method. The results are shown in Table 2. Note that the dynamic friction coefficient of the innermost layer surface described in Tables 3, 4, 7, 8, 11, 12, 15, and 16 is a dynamic coefficient of friction measured for the surface 7a of the innermost layer of each packaging material according to JIS K7125-1995. Also note that the dynamic friction coefficient of the surface 2a of the base material layer described in Tables 3, 4, 7, 8, 11, 12, 15, and 16 was based on the surface of the base material layer of each exterior material in accordance with JIS K7125-1995 is a dynamic friction coefficient measured for the surface 2a of each packaging material.

<Evaluation Method of the Amount of Slip Agent Present on the Surface of the Innermost Layer of the Packaging Material (Examples 1-18 and 41-60, Comparative Examples 1-5 and 11-15)>

After two sheets of rectangular specimens of 110 mm in length and 110 mm in width were cut out from each power storage device packaging material, the two specimens were superimposed to heat-seal the periphery of each heat fusible resin layer (inner layer) innermost layer at heat sealing temperature of 200° C. to form a bag with the seal width of 5 mm. 1 mL of acetone was injected into the interior space of the bag using a syringe, the acetone was left in contact with the surface 7a of the innermost layer 7 for 3 minutes, and then the acetone in the bag was extracted. The amount of the slip agent (μg/cm²) present on the surface 7a of the innermost layer 7 of the packaging material was determined by analyzing the content amount of the ingredients contained in the extract using a gas chromatograph. That is, the amount of the slip agent per 1 cm² of the surface 7a of the innermost layer was determined.

<Evaluation Method of the Amount of Fluorine Polymer-Based Lubricant Present on the Surface of the Innermost Layer of the Packaging Material (Examples 1 to 18 and 41 to 60, Comparative Examples 1 to 5 and 11 to 15)>

After cutting out a rectangular test piece of 101 mm in length×100.5 mm in width from each outer packaging material for electricity storage devices, the test pieces were folded in half and stacked and a bag was made by heat-sealing the peripheral edges of the inner layer at a heat seal temperature of 200° C. with a seal width of 5 mm. 100 mL of acetone was injected into the interior space of the bag using a syringe, and after standing for 3 minutes at room temperature with the surface 7a of the innermost layer 7 of the inner layer in contact with the acetone, the acetone inside the bag was extracted. A slip agent was removed by repeating this operation twice. Next, 100 mL of acetone was injected into the inner space of the bag using a syringe, and left in a 50° C. oven for 30 minutes with the surface 7a of the innermost layer 7 of the inner layer in contact with the acetone, and then extracted the acetone in the bag. The extracted liquid was concentrated with a rotary evaporator and then vacuum drying was performed at 140° C. for 6 hours. Then, the amount of the residue was measured to determine the amount of the fluorine polymer lubricant present on the surface 7a of the innermost layer of the packaging material (μg/cm$^2$). That is, the amount of the fluorine polymer lubricant per 1 cm$^2$ of the innermost surface was calculated.

<Evaluation Method of the Amount of Slip Agent Present on the Surface of the Substrate Layer of the Packaging Material (Examples 1-18 and 41-60, Comparative Examples 1-5 and 11-15)>

After two rectangular specimens of 110 mm in length and 110 mm in width were cut out from each power storage device packaging material, the two specimens were superimposed and the surface (surface of the outermost layer) of each other's substrate layer (outer layer) 2a (surface of the outermost layer) was heat-sealed at a heat sealing temperature of 250° C. to form a bag with a seal width of 5 mm. 1 mL of acetone was injected into the interior space of the bag, and the acetone was left in contact with the surface 2a of the substrate layer 2 for 3 minutes. The acetone in the bag was extracted, and the amount of the slip agent (μg/cm$^2$) present on the surface 2a of the packaging material substrate layer 2 was determined by analyzing the content of the ingredients contained in the extracted liquid by gas chromatography. That is, the amount of the slip agent (μg/cm$^2$) per 1 cm$^2$ of the surface of substrate layer 2 was determined.

<Evaluation Method of the Amount of Slip Agent Present on the Inner Surface of the Packaging Material (Examples 21-38 and 61-80, Comparative Examples 6-10 and 16-20)>

After two rectangular specimens of 110 mm in length and 110 mm in width were cut out from each power storage device packaging material, the two specimens were superimposed and the inner periphery of each other's heat fusible resin layer (inner layer) was heat-sealed at a heat-seal temperature of 200° C. with a 5 mm of a seal width. 1 mL of acetone was injected into the interior space of the bag, the acetone in the bag was left in contact with the inner surface of the bag for 3 minutes, and the acetone in the bag was removed. The amount of slipperiness (μg/cm$^2$) of the second lubricative layer 12 (μg/cm$^2$) of the outer sheath material was determined by analyzing the content of the ingredients in the bag using a gas chromatograph. That is, the amount of slipperiness (μg/cm$^2$) of the second lubricative layer 12 per 1 cm$^2$ was determined.

<Evaluation Method of Fluoropolymer-Based Lubricant Content Present on the Inner Surface of Packaging Material (Examples 21-38 and 61-80, Comparative Examples 6-10 and 16-20)>

One rectangular test piece of 101 mm in length×100.5 mm in width was cut from the power storage packaging material. Then, the test piece was folded halfway and the test piece was overlaid and the periphery of the innermost layer of each heat fusible resin layer (inner layer) was heat-sealed at a heat sealing temperature of 200° C. with a sealing width of 5 mm to make the bag. 100 mL of acetone was injected into the interior space of the bag using a syringe, left at room temperature for 3 minutes in contact with the inner surface of the bag, and the acetone in the bag was extracted. This procedure was repeated twice to remove the slipping agent (second lubricative layer 12), then 100 mL of acetone was injected into the interior space of the bag using a syringe, left in an oven at 50° C. for 30 minutes with the inner surface of the bag in contact with acetone, and then the acetone in the bag was extracted. The extracted liquid was concentrated in a rotary evaporator, then vacuum dried at 140° C. for 6 hours, and the mass of the residue was weighed to determine the amount of fluoropolymer-based lubricant (μg/cm$^2$) of the first lubricative layer 11 of the packaging material. That is, the amount (μg/cm$^2$) of the first lubricative layer 11 formed per 1 cm$^2$ was determined.

<Evaluation of the Amount of Slip Agent Present on the Surface of the Substrate Layer of the Packaging Material (Examples 21-38 and 61-80, Comparative Examples 6-10 and 16-20)>

Two rectangular specimens of 110 mm in length×110 mm in width were cut from the power storage packaging material. Then, the two specimens were superimposed and the periphery of each outer surface was heat-sealed at a heat sealing temperature of 250° C. with a sealing width of 5 mm to make the bag. 1 mL of acetone was injected into the interior space of the bag using a syringe, left in contact with the inner surface of the bag with acetone for 3 minutes, and then the acetone in the bag was extracted. The amount of the slip agent (μg/cm$^2$) of the third lubricative layer 13 on the outer side of the packaging material was determined by measuring and analyzing with a gas chromatography. That is, the amount (μg/cm$^2$) of the third lubricative layer 13 formed per 1 cm$^2$ was determined.

<Formability Assessment Method>

The depth-free straight molding die was used to form a single-stage deep drawing on the packaging material under the following molding conditions. The formability was evaluated for each molding depth (9.0 mm, 8.5 mm, 8.0 mm, 7.5 mm, 7.0 mm, 6.5 mm, 6.0 mm, 5.5 mm, 5.0 mm, 4.5 mm, 4.0 mm, 3.5 mm, 3.0 mm, 2.5 mm, 2.0 mm), and the maximum molding depth (mm) at which molding could be formed without causing any pinholes at the corners was examined. Table 2 shows the maximum molding depth (mm). The presence or absence of pinholes was examined by visual observation of the presence or absence of transmitted light transmitted through the pinholes.

(Molding Conditions)

Molding die: Punch: 33.3 mm×53.9 mm, die: 80 mm×120 mm, corner R: 2 mm, punch R: 1.3 mm, die R: 1 mm, Die holding pressure: gauge pressure of 0.475 MPa, actual pressure (calculated value) of 0.7 MPa Material: SC (carbon steel) material, chromium plating only on the punch R <Method for Evaluating the Presence of White Powder>

A rectangular specimen of 600 mm in length×100 mm in width was cut from each power storage packaging material.

The resulting specimen was then placed on the test table with the inner layer 3 (i.e., innermost layer surface 7a) facing upward. A weight was pulled horizontally parallel to the top surface of the specimen at a tensile speed of 4 cm/s with a black waste cloth wrapped over the top surface of the specimen with the SUS weight (mass of 1.3 kg, grounding surface size of 55 mm×50 mm) having a black surface on the top surface of the specimen, and the weight was pulled over 400 mm in contact with the top surface of the specimen. A waste cloth (black) on the contact surface of the weight after tension transfer was visually observed. A waste cloth (black) with a marked white powder on its surface is designated as "×", a waste cloth with only a slight white powder is designated as "Δ", and a waste cloth with little or no white powder is designated as "○". The above black waste cloth was made from "Static Electricity Removal Sheet S SD2525 3100" produced by TRUSCO Corporation As is apparent from the table, the power storage device packaging material (molding packaging material) of Examples 1 to 18, and 21 to 38 of the present invention has a maximum molding depth of 4.0 mm or more, and even with deeper molding, a good molded article could be obtained, and it was less likely to cause white powder on the surface of the packaging material.

On the other hand, in Comparative Examples 1 to 4, and 6 to 9 in which no fluoropolymer-based lubricant was added despite addition of an slip agent and an anti-blocking agent on the innermost layer of the heat fusible resin layer, the maximum molding depth when the deep-drawing forming was performed was lower than in Examples 1 to 18, and 21 to 38. In Comparative Examples 5 and 10, white powder was markedly caused on the surface of the packaging material.

As is apparent from the table, the power storage device packaging material (molding packaging material) of Examples 41 to 80 of the present invention had a maximum molding depth of 4.5 mm or more, and even with deeper molding, good molding could be obtained, and it was less likely to cause white powder on the surface of the packaging material.

On the other hand, in Comparative Examples 11 to 14, and 16 to 19, in which no fluoropolymer-based lubricant was added despite addition of a slip agent and a roughening material on the innermost layer of the heat fusible resin layer, the maximum molding depth when the deep-drawing forming was performed was lower than in Examples 41 to 80, and white powder was prominently caused on the surface of the outer packaging material in Comparative Examples 15 and 20.

INDUSTRIAL APPLICABILITY

The molding packaging material according to the present invention is preferably used as a battery case for notebook PCs, mobile phones, automobiles, or stationary equipment, and also preferably used as a packaging material for foods and pharmaceutical products, but is not particularly limited. Among them, it is particularly suitable for use in battery cases.

This application claims the following four Japanese applications, and the contents of the disclosure are incorporated as it is as a part of the present application.

Japanese Patent Application No. 2017-170957, filed Sep. 6, 2017

Japanese Patent Application No. 2017-170958, filed Sep. 6, 2017

Japanese Patent Application No. 2017-179875, filed Sep. 20, 2017

Japanese Patent Application No. 2017-180007, filed Sep. 20, 2017

The terms and descriptions used herein are used to illustrate the embodiment of the present invention and are not limited thereto, and the present invention is intended to permit any design changes as long as they are within the scope of the claims and do not deviate from the spirit thereof.

DESCRIPTION OF SYMBOLS

1: molding packaging material
2: substrate layer (outer layer)
2a: substrate layer surfaces
3: heat fusible resin layer (inner layer)
4: metal foil layer
7: innermost layer (heat fusible resin layer innermost layer; heat fusible resin layer 1)
7a: packaging material innermost layer surfaces
8: second heat fusible resin layer
9: third heat fusible resin layer
10: exterior case for storage device
15: external material
30: power storage device
31: power storage device main parts

The invention claimed is:

1. A molding packaging material comprising:
a substrate layer as an outer layer;
a heat fusible resin layer as an inner layer; and
a metal foil layer arranged between the substrate layer and the heat fusible resin layer,
wherein the heat fusible resin layer is composed of a multi-layer, and
wherein an innermost layer of the heat fusible resin layer is made of a resin composition containing a heat fusible resin, an anti-blocking agent, a slip agent, and a fluoropolymer-based lubricant.

2. A molding packaging material comprising:
a substrate layer as an outer layer;
a heat fusible resin layer as an inner layer; and
a metal foil layer arranged between the substrate layer and the heat fusible resin layer,
wherein the heat fusible resin layer is composed of a multi-layer,
wherein an innermost layer of the heat fusible resin layer is made of a resin composition containing a heat fusible resin, a roughening material, a slip agent, and a fluoropolymer-based lubricant, and
wherein a first lubricative layer containing a fluoropolymer-based lubricant in a content rate greater than 50 mass % is formed on an inner surface of the innermost layer.

3. A molding packaging material comprising:
a substrate layer as an outer layer;
a heat fusible resin layer as an inner layer; and
a metal foil layer arranged between the substrate layer and the heat fusible resin layer,
wherein the heat fusible resin layer is composed of a multi-layer,
wherein an innermost layer of the heat fusible resin layer is made of a resin composition containing a heat fusible resin, a roughening material, a slip agent, and a fluoropolymer-based lubricant, and
wherein the roughening material contains a thermoplastic resin.

4. A molding packaging material comprising:
a substrate layer as an outer layer;
a heat fusible resin layer as an inner layer; and
a metal foil layer arranged between the substrate layer and the heat fusible resin layer,
wherein the heat fusible resin layer is composed of a multi-layer,
wherein an innermost layer of the heat fusible resin layer is made of a resin composition containing a heat fusible resin, a roughening material, a slip agent, and a fluoropolymer-based lubricant,
wherein the roughening material contains a thermoplastic resin, and
wherein a first lubricative layer containing a fluoropolymer-based lubricant in a content rate greater than 50 mass % is formed on an inner surface of the innermost layer.

5. The molding packaging material as recited in claim 3, wherein the thermoplastic resin composing the roughening material is a high density polyethylene resin.

6. The molding packaging material as recited in claim 1, wherein a part of the slip agent and a part of the fluoropolymer-based lubricant are both adhered to an inner surface of the innermost layer.

7. The molding packaging material as recited in claim 1, wherein the slip agent is adhered to an outer surface of the substrate layer.

8. The molding packaging material as recited in claim 2, wherein a second lubricative layer containing the slip agent in a content rate greater than 50 mass % is formed on an inner surface of the first lubricative layer.

9. The molding packaging material as recited in claim 2, wherein a third lubricative layer containing the slip agent is formed on an outer surface of the substrate layer.

10. The molding packaging material as recited in claim 1, wherein a content rate of the fluoropolymer-based lubricant in the innermost layer is 5 ppm to 5,000 ppm.

11. The molding packaging material as recited in claim 1, wherein a fluorine content rate in the fluoropolymer-based lubricant is 50 mass % or more.

12. The molding packaging material as recited in claim 1, wherein the fluoropolymer-based lubricant is one or two fluoropolymer-based lubricants selected from the group consisting of a tetrafluoroethylene-hexafluoropropylene-vinylidene fluoride copolymer and a hexafluoropropylene-vinylidene fluoride copolymer.

13. The molding packaging material as recited in claim 1, wherein the slip agent is a fatty acid amide.

14. The molding packaging material as recited in claim 1, wherein a dynamic friction coefficient of an outer surface of the packaging material is 0.5 or less.

15. The molding packaging material as recited in claim 1, wherein a dynamic friction coefficient of an inner surface of the packaging material is 0.5 or less.

* * * * *